(12) United States Patent
Ogawa

(10) Patent No.: US 7,158,460 B2
(45) Date of Patent: Jan. 2, 2007

(54) METHOD AND APPARATUS FOR ADJUSTING CONDITIONS FOR RECORDING AND REPRODUCING INFORMATIONS

(75) Inventor: Masatsugu Ogawa, Tokyo (JP)

(73) Assignee: NEC Corporation, Tokyo (JP)

(*) Notice: Subject to any disclaimer, the term of this patent is extended or adjusted under 35 U.S.C. 154(b) by 653 days.

(21) Appl. No.: 10/233,615

(22) Filed: Sep. 4, 2002

(65) Prior Publication Data

US 2003/0053388 A1    Mar. 20, 2003

(30) Foreign Application Priority Data

Sep. 4, 2001 (JP) ............... 2001-266765
Nov. 13, 2001 (JP) ............... 2001-347405

(51) Int. Cl.
   *G11B 7/00* (2006.01)
(52) U.S. Cl. .................. 369/53.34; 369/116
(58) Field of Classification Search ........... 369/53.34, 369/116
   See application file for complete search history.

(56) References Cited

U.S. PATENT DOCUMENTS

| | | | |
|---|---|---|---|
| 5,353,270 A | 10/1994 | Iimura | |
| 5,490,127 A * | 2/1996 | Ohta et al. .......... | 369/47.51 |
| 6,115,351 A | 9/2000 | Utsunomiya et al. | |
| 6,411,579 B1 * | 6/2002 | Nobukuni et al. .... | 369/59.12 |

FOREIGN PATENT DOCUMENTS

| | | |
|---|---|---|
| JP | 6-44565 | 2/1994 |
| JP | 8-50772 | 2/1996 |
| JP | A 9-7176 | 1/1997 |
| JP | A 9-282661 | 10/1997 |
| JP | 10-55540 | 2/1998 |
| JP | A 2000-30254 | 1/2000 |
| JP | A 2000-67435 | 3/2000 |
| JP | A 2000-137916 | 5/2000 |
| JP | A 2000-155945 | 6/2000 |
| JP | A 2000-182244 | 6/2000 |
| JP | A 2000-207742 | 7/2000 |
| JP | 2001-126254 | 5/2001 |
| JP | 2001-143263 | 5/2001 |
| JP | 2001-148140 | 5/2001 |
| JP | 2001-167437 | 6/2001 |
| JP | A 2001-155340 | 6/2001 |
| JP | 2003-85755 | 3/2003 |

* cited by examiner

Primary Examiner—Wayne Young
Assistant Examiner—Van T. Pham
(74) Attorney, Agent, or Firm—Young & Thompson

(57) ABSTRACT

A method of adjusting a condition for at least one of a recording operation and a reproducing operation includes the following steps. At least first and second asymmetry values is found. The first asymmetry value is defined based on a first signal combination selected from at least three signals different in cycle from each other. The second asymmetry value is defined based on a second signal combination selected from the at least three signals. The second signal combination is different from the first signal combination. The condition is set with reference to the at least first and second asymmetry values.

62 Claims, 45 Drawing Sheets

Tmp = 0.70

DVD-R

DVD-RW

DVD+RW

Tmp = 0.6

Tmp = 0.7

Tmp = 0.8

Tmp = 0.70

FIG. 8

| Tmp (T) | Pw (%) | | | | |
|---|---|---|---|---|---|
| | -30 | -15 | 0 | +15 | +30 |
| -0.1 | ▨ | ▨ | ▨ | | |
| 0 | | ▨ | ▨ | ▨ | |
| +0.1 | | | ▨ | ▨ | ▨ |

Second Stage

FIG. 16

| Tmp (T) | Pw (%) | | | | |
|---|---|---|---|---|---|
| | -30 | -15 | 0 | +15 | +30 |
| 0 | ///// | ///// | ///// | ///// | ///// |

FIG. 18

| Tmp (T) | Pw (%) | | | | |
|---|---|---|---|---|---|
| | −30 | −15 | 0 | +15 | +30 |
| 0 | | | | | |

Ttop=1.1T

Ttop=1.3T

Ttop=1.5T

Ttop=1.7T

FIG. 25

| Ttop (T) | Pw (%) | | | | |
|---|---|---|---|---|---|
| | -30 | -15 | 0 | +15 | +30 |
| -0.2 | | | ▓ | ▓ | ▓ |
| 0 | | ▓ | ▓ | ▓ | |
| +0.2 | ▓ | ▓ | ▓ | | |

Tmp = 0.6

Tmp = 0.7

Tmp = 0.8

METHOD AND APPARATUS FOR ADJUSTING CONDITIONS FOR RECORDING AND REPRODUCING INFORMATIONS

BACKGROUND OF THE INVENTION

1. Field of the Invention

The present invention relates to a method of adjusting conditions for recording and reproducing optical informations into and from an optical information storage medium as well as an apparatus for recording and reproducing optical informations.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

A variety of optical disk is one of typical examples of optical information storage mediums for storing informations. The optical disk may, for example, include DVD-R, DVD-RW and DVD+RW, which have been developed, and some of which have been commercially available. The optical disk stores various informations by utilizing a multi-pulse method, wherein a set of plural laser pulse is used for storing one mark onto the disk. FIG. 1A is a schematic view illustrative of a set of plural laser pulses used for storing one mark onto a DVD-R in the prior art. FIG. 1B is a schematic view illustrative of a set of plural laser pulses used for storing one mark onto a DVD-RW in the prior art. FIG. 1C is a schematic view illustrative of a set of plural laser pulses used for storing one mark onto a DVD+RW in the prior art. In the multi-pulse methods shown in FIGS. 1A, 1B and 1C, a 6T-signal, which means a mark with a length "6T" being six times of a channel clock cycle "T", is used for record so called as record strategy. A width of the each laser pulse generally depends on the kind of the optical disk and a maker. There are different regulations for each laser pulse, depending upon the kinds of the optical disk. Informations of the regulations such as a laser pulse width adjusted to the disk are written into the disk in the maker side. In FIGS. 1A, 1B and 1C, "Pw" represents a record power level, "Pe" represents an erase power level, and "Pb" represents a bottom power level. "Tcl" represents a cycle which represents a time period of the bottom power level "Pb" appearing after a last pulse included in the set of plural laser pulses. "Ttop" represents a pulse width of a top pulse included in the set of plural laser pulses. "Tmp" also represents a pulse width of remaining pulses subsequent to the top pulse included in the set of plural laser pulses. Usually, adjustments to the above parameters are made to minimize a fluctuation or a jitter.

In the cases shown in FIGS. 1A, 1B and 1C, the remaining pulses subsequent to the top pulse have a uniform pulse width "Tmp", for which reason the remaining pulses subsequent to the top pulse are uniformly adjusted in pulse width "Tmp". In rear case, it may be possible that the last pulse has a specific pulse width which is different from the uniform pulse width "Tmp" of the remaining pulses subsequent to the top pulse and prior to the last pulse.

Each of the above described optical disks has an area in which a recommend record strategy is buried for allowing adjustment to the record power. There are two methods for adjustment to the record power. One of a β-method, wherein an asymmetry of long and short marks is checked to find a β-value. Another is a γ-method, wherein the need for the adjustment is decided depending upon a degree of saturation of amplitude of the record mark. Generally, the β-method is used for DVD-R, while the γ-method is used for DVD-RW, DVD+RW. The record strategy relies upon only the informations buried in the disk.

Japanese laid-open patent publication No. 2000-182244 discloses a first conventional method of adjusting the record strategy, wherein some power levels are assigned to parameters for the record power and the record strategy so that tests in cases of all combinations are comprehensively made to select an optimum combination of the levels.

Japanese laid-open patent publication No. 2000-30254 discloses a second conventional method of adjusting the record strategy, wherein an adjustment to the record strategy and another adjustment to the record power are made separately from each other, and the record power level is decided depending on the length of the mark.

Japanese laid-open patent publication No. 2001-155340 discloses a third conventional recording method under a simple control, which is available to CAV, ZCAV, or CLV at any speeds. The method is to form recording marks over an optical storage medium with variable record line speeds in accordance with the multi-pulse method, wherein a laser pulse emission pattern and a pulse length are optimized at the highest one of available record line speeds. In accordance with the kind of pulse, the record power is assigned to a series of plural laser pulses for forming the record mark, wherein at least two different record power levels are included in the series of the plural laser pulses. Each of the different record power levels is controlled in accordance with either the record line speed or a record position over the optical storage medium. The control of the record power in accordance with the record line speed or the record position allows the recording with a low fluctuation or a low jitter in the range of practical line speed even the length of the emitted pulse of the record strategy is fixed constant.

In general, however, the optimum record strategy is slightly variable depending on a state of an optical head, and a setting of a driver circuit, for which reason it is preferable to adjust the record strategy obtained from the disk with reference to a driver.

The above-described conventional techniques have the following problems and disadvantages.

The first conventional method making a large number of the tests is not suitable for a desired quick adjustment.

The third conventional method making the setting of the recording strategy responsible to any recording line speed and any recording positions need to measure the fluctuation or the jitter and further measure the length of the mark, for which reason the third conventional method not suitable for the desired quick adjustment.

Further, the second conventional method making separate adjustment processes for the recording strategy and the parameters is also not suitable for the desired quick adjustment.

The above first to third conventional methods are not efficient adjustment methods for adjusting the recording strategy.

In addition, accomplishment of a large number of the tests need a large specific area for adjustments. Particularly if the disk is a medium allowing one-time writing such as DVD-R, then the limited specific area for adjustment may be insufficient.

In the first conventional method, practically, the first adjustment needs to carry out 63 tests, and further the second adjustment also needs to carry out 27 tests, and in total, the completion of the adjustment needs 90 tests which comprises the 63 tests and the 27 tests. For which reason, a large specific area of the disk is needed for adjustment for wiring or recording information onto the disk. The need of the large specific area for adjustment means that re-write operation and/or additional write operation makes the limited specific area for adjustment insufficient. Namely, there is a limitation of the number of available re-writing operations.

In the above circumstances, the development of a novel method of adjusting conditions for recording informations onto an information storage medium free from the above problems is desirable.

SUMMARY OF THE INVENTION

Accordingly, it is an object of the present invention to provide a novel method of adjusting conditions for recording informations onto an information storage medium free from the above problems.

It is a further object of the present invention to provide a novel method of adjusting conditions with reference to recording powers and recording strategy for recording informations onto an information storage medium for allowing a quick adjustment with use of a relatively small specific area for adjustment.

It is a still further object of the present invention to provide a novel method of adjusting conditions for reproducing informations from an information storage medium free from the above problems.

It is yet a further object of the present invention to provide a novel computer program to be executed for adjusting conditions for recording informations onto an information storage medium free from the above problems.

It is further more object of the present invention to provide a novel computer program to be executed for adjusting conditions for reproducing informations from an information storage medium free from the above problems.

It is further more object of the present invention to provide a novel storage medium storing adjusted conditions for recording informations onto an information storage medium free from the above problems.

It is moreover object of the present invention to provide a novel storage medium storing adjusted conditions for reproducing informations from an information storage medium free from the above problems.

It is still more object of the present invention to provide a novel apparatus for adjusting conditions for recording and/or reproducing informations onto and/or from an information storage medium free from the above problems.

It is yet more object of the present invention to provide a novel method apparatus for conditions with reference to recording powers and recording strategy for recording informations onto an information storage medium for allowing a quick adjustment with use of a relatively small specific area for adjustment.

The present invention provides a method of adjusting a condition for at least one of a recording operation and a reproducing operation. The method includes the following steps. At least first and second asymmetry values is found. The first asymmetry value is defined based on a first signal combination selected from at least three signals different in cycle from each other. The second asymmetry value is defined based on a second signal combination selected from the at least three signals. The second signal combination is different from the first signal combination. The condition is set with reference to the at least first and second asymmetry values.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

Figure 8:
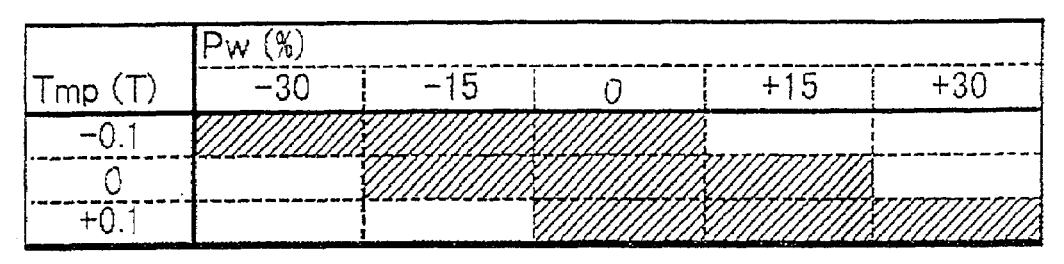

FIG. 8 is a table of the recording conditions adjusted in accordance with the novel method shown in FIG. 2 in accordance with the present invention.

FIG. 16 is a table of the recording conditions adjusted in accordance with the novel method shown in FIG. 14 in accordance with the present invention.

Figure 18:
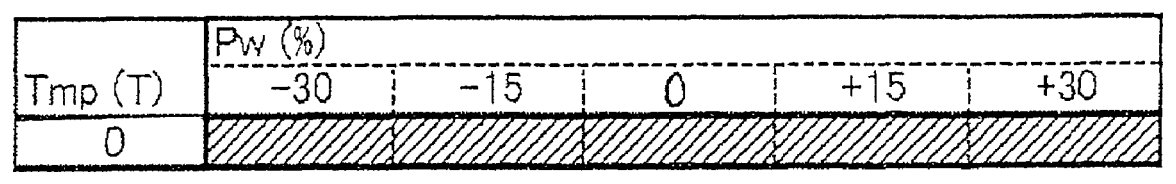

FIG. 18 is a table of the recording conditions adjusted in accordance with the novel method shown in FIG. 2 in the third embodiment in accordance with the present invention.

FIG. 25 is a table of the recording conditions adjusted in accordance with the novel method in the fifth embodiment in accordance with the present invention.

DETAILED DESCRIPTION OF THE PREFERRED EMBODIMENTS

Figure 1A:
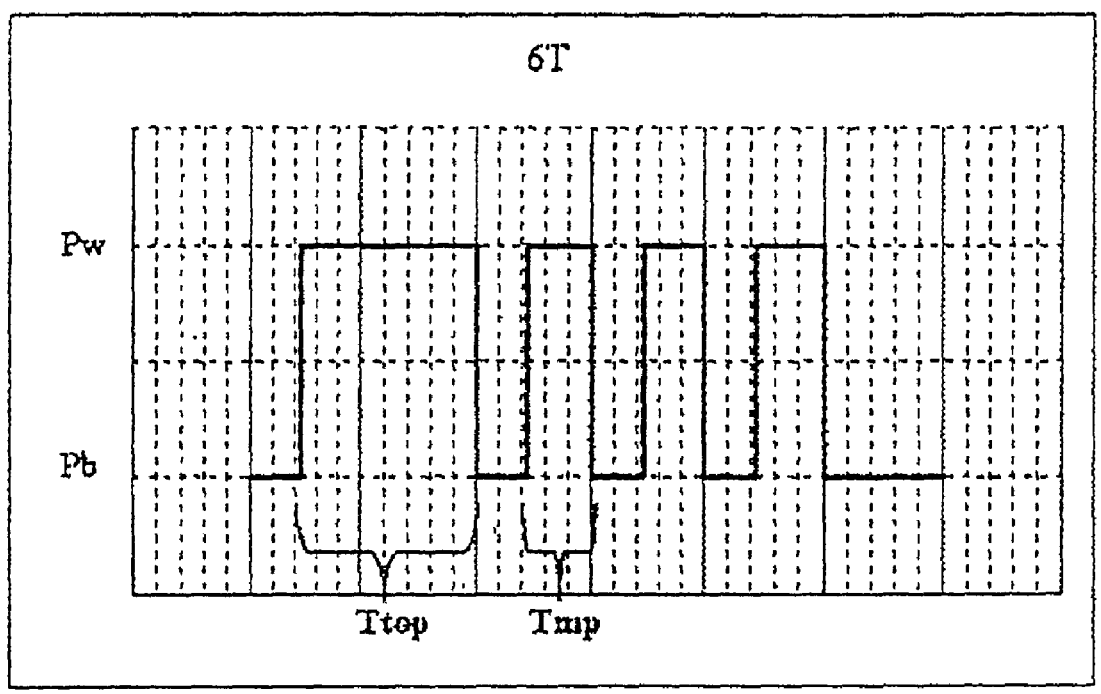
FIG. 1A is a schematic view illustrative of a set of plural laser pulses used for storing one mark onto a DVD-R in the prior art.

A first primary aspect of the present invention is a method of adjusting a condition for at least one of a recording operation and a reproducing operation. The method includes the following steps. At least first and second asymmetry values is found. The first asymmetry value is defined based on a first signal combination selected from at least three signals different in cycle from each other. The second asymmetry value is defined based on a second signal combination selected from the at least three signals. The second signal combination is different from the first signal combination. The condition is set with reference to the at least first and second asymmetry values.

It is available that the condition is adjusted without measuring any jitter value.

It is also available that the step of setting the condition comprises a step of comparing the at least first and second asymmetry values to each other, to find desired values where the at least first and second asymmetry values have a difference from each other, and the difference is smaller than a predetermined reference value, and the at least first and second asymmetry values take the desired values.

It is also available that the step of setting the condition includes: comparing the at least first and second asymmetry values to each other, to find a zero-cross value where the at least first and second asymmetry values are substantially equal to each other and takes the zero-cross value.

It is also available that the step of setting the condition includes: comparing the at least first and second asymmetry values to each other, to find a zero-cross value where the at least first and second asymmetry values are substantially equal to each other and takes the zero-cross value; and evaluating whether the zero-cross value is within a predetermined zero-cross value range. In this case, it is further available that the step of setting the condition further includes: changing at least one of a recording power, a reproducing power, and parameters of the at least three signals, if the zero-cross value is out of the predetermined zero-cross value range; and repeating the finding, comparing, evaluating and changing steps, until it is verified that the zero-cross value is within a predetermined zero-cross value range.

It is also available that the step of setting the condition includes: comparing the at least first and second asymmetry values to each other, to find a zero-cross parameter of the condition and a zero-cross value where the at least first and second asymmetry values are substantially equal to each other and takes the zero-cross value; and setting the condition with the zero-cross parameter only independent from the zero-cross value.

It is also available that the condition includes at least one of a recording power, a reproducing power, parameters of the at least three signals, a defocus, a radial tilt and a tangential tilt.

It is also available to further include: reproducing the at least three signals as reproducing signals from an information storage medium which is an object for the at least one of the recording operation and the reproducing operation before the step of finding the at least first and second asymmetry values.

It is also available that each of the at least first and second asymmetry values is found with reference to at least minimum and maximum voltage levels of corresponding one of the first and second signal combinations.

It is also available that each of the at least first and second asymmetry values is found with reference to averaged voltage levels and amplitudes of corresponding one of the first and second signal combinations.

It is also available to further include the steps of: making variable at least one of a recording power, a reproducing power, and parameters of the at least three signals, while fixing remainders of the recording power, the reproducing power, and the parameters; and finding a desired value of the at least one being variable so that a difference between the at least first and second asymmetry values is smaller than a predetermined reference value.

It is also available to further include the steps of: making variable at least one of a recording power, a reproducing power, and parameters of the at least three signals, while fixing remainders of the recording power, the reproducing power, and the parameters; and finding an optimum value of the at least one being variable so that the at least first and second asymmetry values are substantially equal to each other.

It is also available that the step of setting the condition comprises the steps of: finding a first desired value of first one of a recording power, a reproducing power, and parameters of the at least three signals with reference to a first asymmetry value of the at least first and second asymmetry values; and finding a second desired value of second one of the recording power, the reproducing power, and the parameters of the at least three signals with reference to a second asymmetry value of the at least first and second asymmetry values. In this case, it is also available that the first desired value is found so that the first asymmetry value takes a first predetermined value, and the second desired value is found so that the second asymmetry value takes a second predetermined value, and the first and second predetermined values have a difference from each other within a predetermined range. In this case, it is also available that the difference between the first and second predetermined values is zero.

It is also available that the step of finding the at least first and second asymmetry values comprises the step of finding the first asymmetry value, the second asymmetry value and a third asymmetry value being defined based on a third signal combination, and the step of setting the condition comprises setting the condition with reference to the first, second and third asymmetry values. In this case, it is also available that the step of setting the condition further includes: finding a first zero-cross value where the first and second asymmetry values are substantially equal to each other and take the first zero-cross value; finding a second zero-cross value where the second and third asymmetry values are substantially equal to each other and take the second zero-cross value; and comparing the first and second zero-cross values to each other to find desired values where the first and second zero-cross values have a difference from each other, and the difference is smaller than a predetermined reference value, and the first, second and third asymmetry values take the desired values.

It is also available that the step of setting the condition further includes: finding a first zero-cross value where the first and second asymmetry values are substantially equal to each other and take the first zero-cross value; finding a second zero-cross value where the second and third asymmetry values are substantially equal to each other and take the second zero-cross value; and comparing the first and second zero-cross values to each other to find an optimum value where the first and second zero-cross values are substantially equal to each other, and the first, second and third asymmetry values take the optimum value.

It is also available to further include: evaluating whether the first and second zero-cross values are within a predetermined zero-cross value range. In this case, it is available to further include: changing at least one of a recording power, a reproducing power, and parameters of the at least three signals, if at least one of the first and second zero-cross values is out of the predetermined zero-cross value range; and repeating the finding, comparing, evaluating and changing steps, until it is verified that both the first and second zero-cross values are within a predetermined zero-cross value range.

It is also available to further include the steps of: making variable at least one of a recording power, a reproducing power, and parameters of the at least three signals, while fixing remainders of the recording power, the reproducing power, and the parameters; and finding a desired value of the at least one being variable so that a difference between the first and second zero-cross values is smaller than a predetermined reference value.

It is also available to further include the steps of: making variable at least one of a recording power, a reproducing power, and parameters of the at least three signals, while fixing remainders of the recording power, the reproducing power, and the parameters; and finding an optimum value of the at least one being variable so that the first and second zero-cross values are substantially equal to each other.

It is also available that the step of setting the condition comprises the steps of: finding a first desired value of first one of a recording power, a reproducing power, and parameters of the at least three signals with reference to the first zero-cross value; and finding a second desired value of second one of the recording power, the reproducing power, and the parameters of the at least three signals with reference to the second zero-cross value. In this case, it is also available that the first desired value is found so that the first zero-cross value takes a first predetermined value, and the second desired value is found so that the second zero-cross value takes a second predetermined value, and the first and second predetermined values have a difference from each other within a predetermined range. In this case, it is also available that the difference between the first and second predetermined values is zero.

It is also available that the first and second signal combinations include: a first shortest signal which has a shortest mark and a shortest space; and a second shortest signal which has a second shorter mark and a second shorter space.

It is also available that the first and second signal combinations include: a first longest signal which has a longest mark and a longest space; and a second longest signal which has a second longer mark and a second longer space.

It is also available that the condition is for recording an information into an information storage medium.

It is also available that the condition is for reproducing an information from an information storage medium.

A second aspect of the present invention provides an apparatus for adjusting a condition for at least one of a recording operation and a reproducing operation. The apparatus includes the following function blocks. A finding function block is provided for finding at least first and second asymmetry values. The first asymmetry value is defined based on a first signal combination selected from at least three signals different in cycle from each other. The second asymmetry value is defined based on a second signal combination selected from the at least three signals. The second signal combination is different from the first signal combination. A setting function block is provided for setting the condition with reference to the at least first and second asymmetry values.

It is available that the condition is adjusted without measuring any jitter value.

It is also available that the setting function block includes: a comparing function block for comparing the at least first and second asymmetry values to each other, to find desired values where the at least first and second asymmetry values have a difference from each other, and the difference is smaller than a predetermined reference value, and the at least first and second asymmetry values take the desired values.

It is also available that the setting function block includes: a comparing function block for comparing the at least first and second asymmetry values to each other, to find a zero-cross value where the at least first and second asymmetry values are substantially equal to each other and takes the zero-cross value.

It is also available that the setting function block includes: a comparing function block for comparing the at least first and second asymmetry values to each other, to find a zero-cross value where the at least first and second asymmetry values are substantially equal to each other and takes the zero-cross value; and an evaluating function block for evaluating whether the zero-cross value is within a predetermined zero-cross value range.

It is also available that the setting function block further includes: a changing function block for changing at least one of a recording power, a reproducing power, and parameters of the at least three signals, if the zero-cross value is out of the predetermined zero-cross value range; and a repeating function block for repeating the finding, comparing, evaluating and changing operations, until it is verified that the zero-cross value is within a predetermined zero-cross value range.

It is also available that the setting function block includes: a comparing function block for comparing the at least first and second asymmetry values to each other, to find a zero-cross parameter of the condition and a zero-cross value where the at least first and second asymmetry values are substantially equal to each other and takes the zero-cross value; and a setting function sub-block for setting the condition with the zero-cross parameter only independent from the zero-cross value.

It is also available that the condition includes at least one of a recording power, a reproducing power, parameters of the at least three signals, a defocus, a radial tilt and a tangential tilt.

It is also available to further include: a reproducing function block for reproducing the at least three signals as reproducing signals from an information storage medium which is an object for the at least one of the recording operation and the reproducing operation before finding the at least first and second asymmetry values.

It is also available that each of the at least first and second asymmetry values is found with reference to at least minimum and maximum voltage levels of corresponding one of the first and second signal combinations.

It is also available that each of the at least first and second asymmetry values is found with reference to averaged voltage levels and amplitudes of corresponding one of the first and second signal combinations.

It is also available to further include: a making function block for making variable at least one of a recording power, a reproducing power, and parameters of the at least three signals, while fixing remainders of the recording power, the reproducing power, and the parameters; and a finding function sub-block for finding a desired value of the at least one being variable so that a difference between the at least first and second asymmetry values is smaller than a predetermined reference value.

It is also available to further include: a making function block for making variable at least one of a recording power, a reproducing power, and parameters of the at least three signals, while fixing remainders of the recording power, the reproducing power, and the parameters; and a finding function sub-block for finding an optimum value of the at least one being variable so that the at least first and second asymmetry values are substantially equal to each other.

It is also available that the setting function block includes: a first finding function sub-block for finding a first desired value of first one of a recording power, a reproducing power, and parameters of the at least three signals with reference to a first asymmetry value of the at least first and second asymmetry values; and a second finding function sub-block for finding a second desired value of second one of the recording power, the reproducing power, and the parameters of the at least three signals with reference to a second asymmetry value of the at least first and second asymmetry values.

It is also available that the first desired value is found so that the first asymmetry value takes a first predetermined value, and the second desired value is found so that the second asymmetry value takes a second predetermined value, and the first and second predetermined values have a difference from each other within a predetermined range. It is also available that the difference between the first and second predetermined values is zero.

It is also available that the finding function block finds the first asymmetry value, the second asymmetry value and a third asymmetry value being defined based on a third signal combination, and the setting function block sets the condition with reference to the first, second and third asymmetry values.

It is also available that the setting function block further includes: a first finding function sub-block for finding a first zero-cross value where the first and second asymmetry values are substantially equal to each other and take the first zero-cross value; a second finding function sub-block for finding a second zero-cross value where the second and third asymmetry values are substantially equal to each other and take the second zero-cross value; and a comparing function block for comparing the first and second zero-cross values to each other to find desired values where the first and second zero-cross values have a difference from each other, and the difference is smaller than a predetermined reference value, and the first, second and third asymmetry values take the desired values.

It is also available that the setting function block further includes: a first finding function sub-block for finding a first zero-cross value where the first and second asymmetry values are substantially equal to each other and take the first zero-cross value; a second finding function sub-block for finding a second zero-cross value where the second and third asymmetry values are substantially equal to each other and take the second zero-cross value; and a comparing function block for comparing the first and second zero-cross values to each other to find an optimum value where the first and second zero-cross values are substantially equal to each other, and the first, second and third asymmetry values take the optimum value.

It is also available to further include: an evaluating function block for evaluating whether the first and second zero-cross values are within a predetermined zero-cross value range. It is also available to further include: a changing function block for changing at least one of a recording power, a reproducing power, and parameters of the at least three signals, if at least one of the first and second zero-cross values is out of the predetermined zero-cross value range; and a repeating function block for repeating the finding, comparing, evaluating and changing operations, until it is verified that both the first and second zero-cross values are within a predetermined zero-cross value range.

It is also available to further include: a making function block for making variable at least one of a recording power, a reproducing power, and parameters of the at least three signals, while fixing remainders of the recording power, the reproducing power, and the parameters; and a finding function sub-block for finding a desired value of the at least one being variable so that a difference between the first and second zero-cross values is smaller than a predetermined reference value.

It is also available to further include: a making function block for making variable at least one of a recording power, a reproducing power, and parameters of the at least three signals, while fixing remainders of the recording power, the reproducing power, and the parameters; and a finding function sub-block for finding an optimum value of the at least one being variable so that the first and second zero-cross values are substantially equal to each other.

It is also available that the setting function block includes: a first finding function sub-block for finding a first desired value of first one of a recording power, a reproducing power, and parameters of the at least three signals with reference to the first zero-cross value; and a second finding function sub-block for finding a second desired value of second one of the recording power, the reproducing power, and the parameters of the at least three signals with reference to the second zero-cross value.

It is also available that the first desired value is found so that the first zero-cross value takes a first predetermined value, and the second desired value is found so that the second zero-cross value takes a second predetermined value, and the first and second predetermined values have a difference from each other within a predetermined range.

It is also available that the difference between the first and second predetermined values is zero.

It is also available that the first and second signal combinations include: a first shortest signal which has a shortest mark and a shortest space; and a second shortest signal which has a second shorter mark and a second shorter space.

It is also available that the first and second signal combinations include: a first longest signal which has a longest mark and a longest space; and a second longest signal which has a second longer mark and a second longer space.

It is also available that the condition is for recording an information into an information storage medium.

It is also available that the condition is for reproducing an information from an information storage medium.

A third aspect of the present invention is a recording/reproducing apparatus including a recording unit for recording an information into an information storage medium; a reproducing unit for reproducing an information from the information storage medium; and an adjusting unit for adjusting a condition for at least one of a recording operation by the recording unit and a reproducing operation by the reproducing unit in accordance with the above novel method defined in the first primary aspect of the present invention.

A fourth aspect of the present invention is a computer program to be executed for implementing the above novel method defined in the first primary aspect of the present invention.

Figure 2:
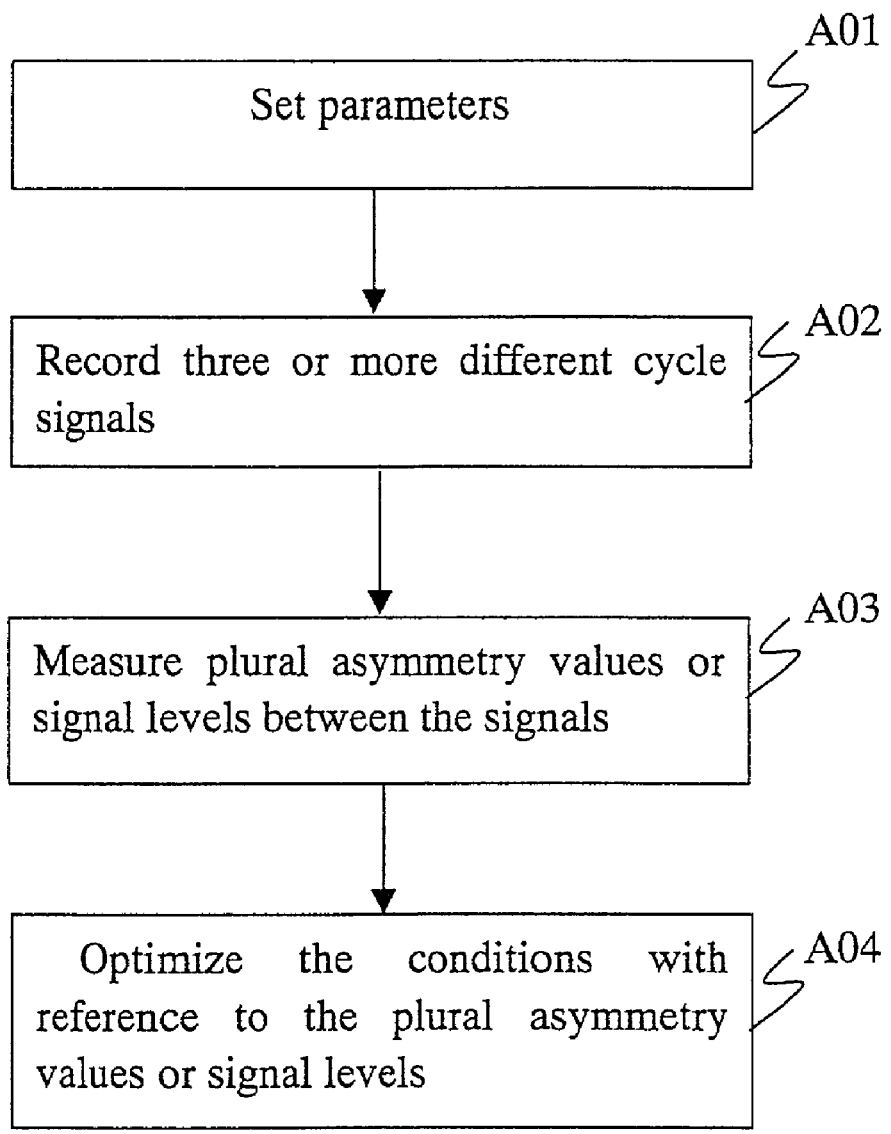
FIG. 2 is a flow chart of a novel method of adjusting conditions for recording informations onto an information storage medium in a first embodiment in accordance with the present invention.

FIG. 2 is a flow chart of a novel method of adjusting conditions for recording informations onto an information storage medium in a typical embodiment in accordance with the present invention. The novel adjustment method includes the following four steps A01, A02, A03 and A04.

Figure 1B:
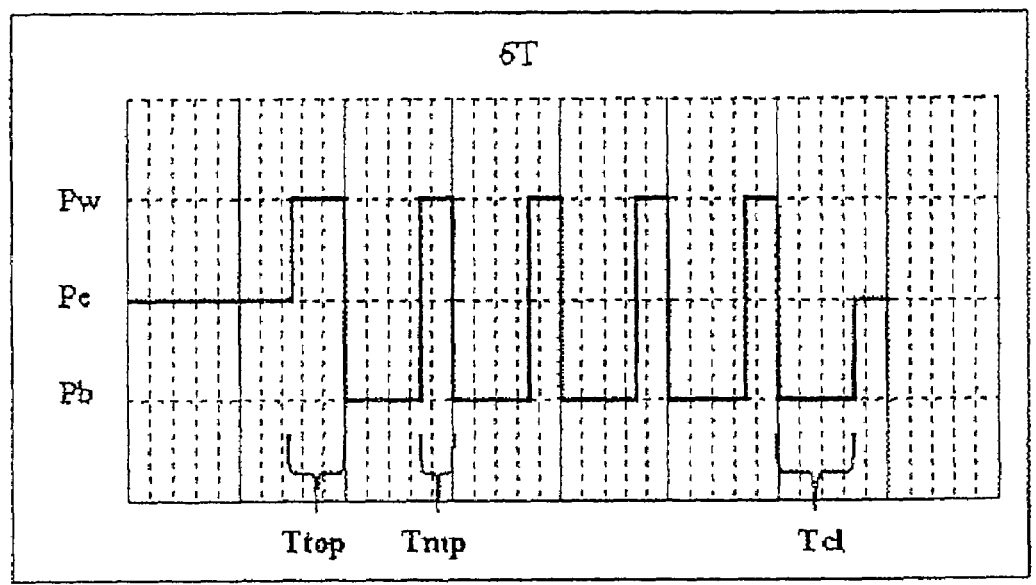
FIG. 1B is a schematic view illustrative of a set of plural laser pulses used for storing one mark onto a DVD-RW in the prior art.
Figure 1C:
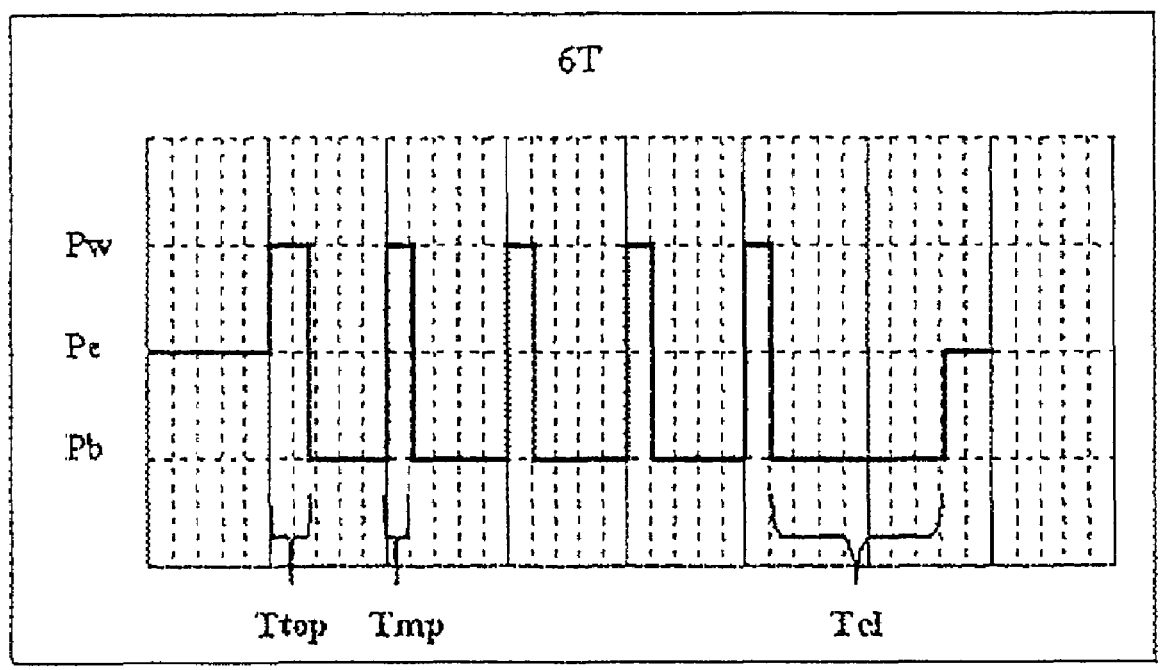
FIG. 1C is a schematic view illustrative of a set of plural laser pulses used for storing one mark onto a DVD+RW in the prior art.

In the first step A01, parameters are set, wherein a recording power and other parameters other than the pulse width "Tmp" shown in FIGS. 1A, 1B, and 1C are set similarly to disk informations buried into the disk.

In the second step A02, cycle signals are recorded, wherein at least two kinds of cycle signals are recorded, for example, per one half of one cync-frame.

In the third step A03, a signal level is measured, wherein a β-value or an asymmetry value of the each cync-frame is measured.

In the fourth step A04, an optimum recording power "Pw" and an optimum pulse width "Tmp" are derived.

Figure 3A:
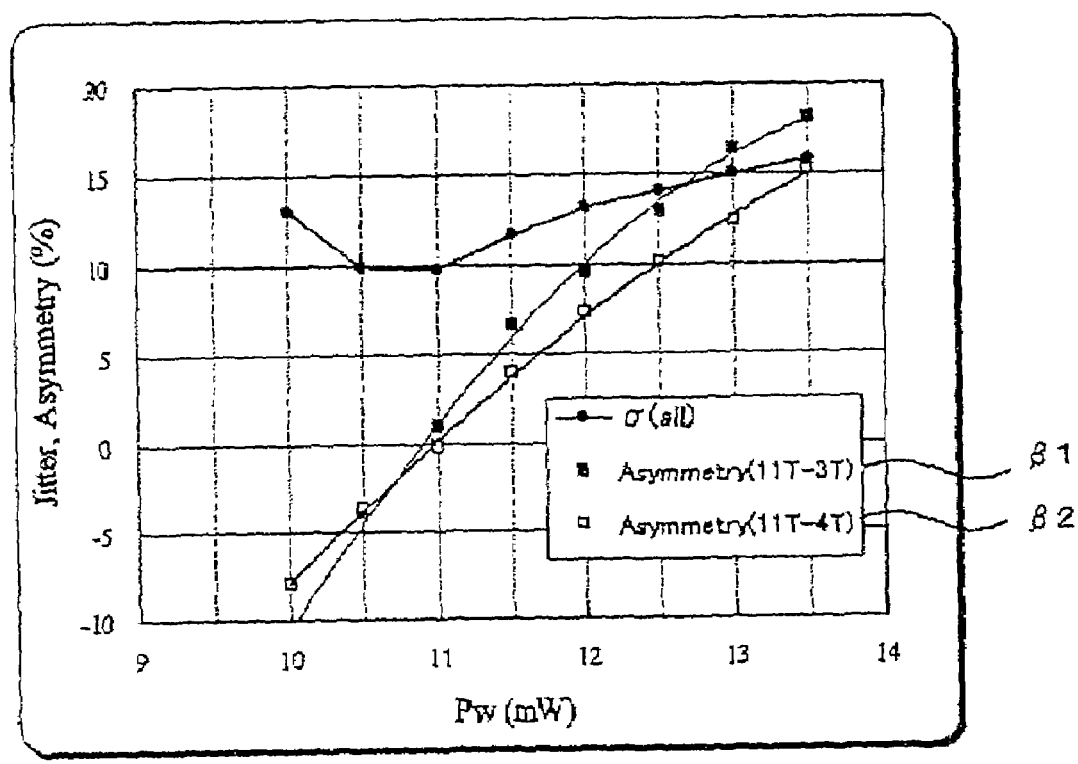
FIG. 3A is a diagram of variations of jitter "σ", a first asymmetry value "β1" between 11T and 3T, a second asymmetry value "β2" between 11T and 4T over recording power "Pw" at a pulse width "Tmp" of 0.6 in case of DVD-R.
Figure 3B:
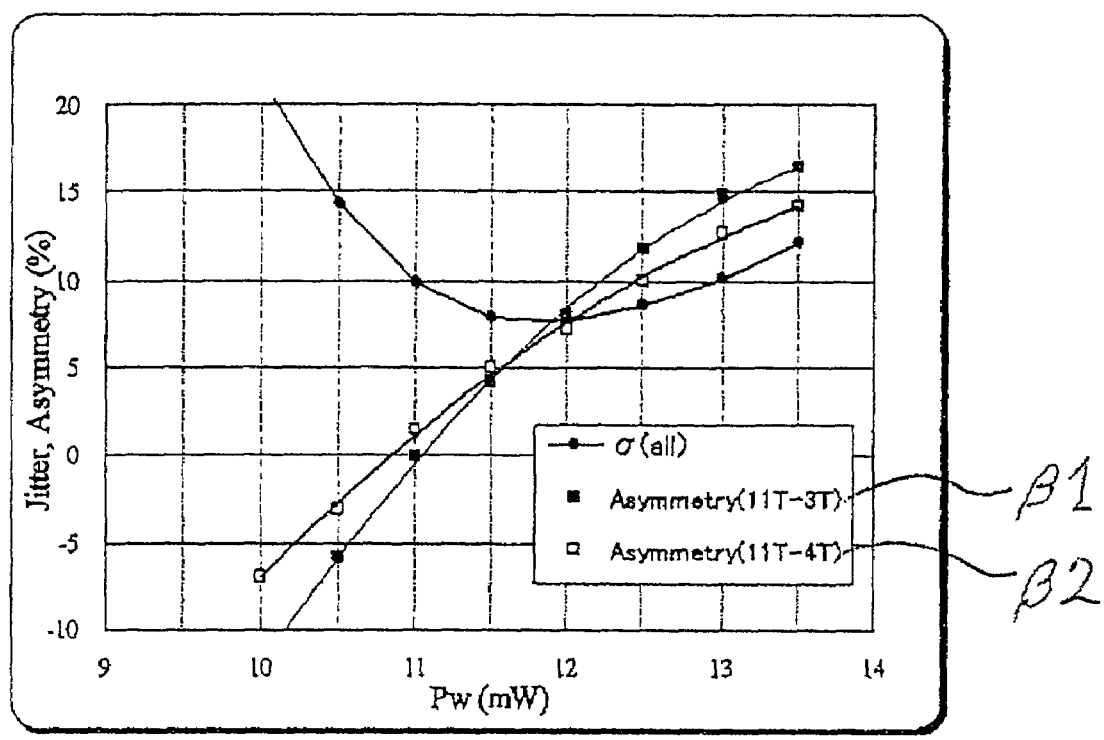
FIG. 3B is a diagram of variations of jitter "σ", a first asymmetry value "β1" between 11T and 3T, a second asymmetry value "β2" between 11T and 4T over recording power "Pw" at a pulse width "Tmp" of 0.7 in case of DVD-R.
Figure 3C:
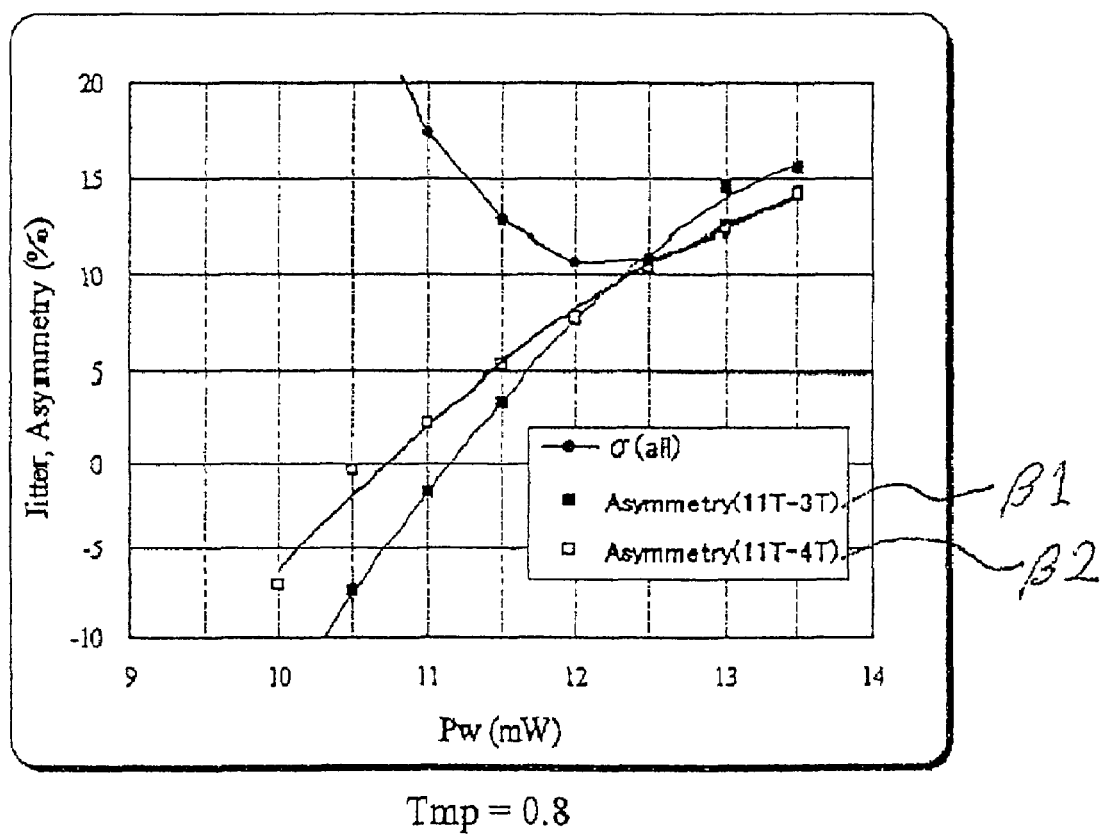
FIG. 3C is a diagram of variations of jitter "σ", a first asymmetry value "β1" between 11T and 3T, a second asymmetry value "β2" between 11T and 4T over recording power "Pw" at a pulse width "Tmp" of 0.8 in case of DVD-R.

FIG. 3A is a diagram of variations of jitter "σ", a first asymmetry value "β1" between 11T and 3T, a second asymmetry value "β2" between 11T and 4T over recording power "Pw" at a pulse width "Tmp" of 0.6T and a top pulse width "Ttop" of 1.4T in case of DVD-R. FIG. 3B is a diagram of variations of jitter "σ", a first asymmetry value "β1" between 11T and 3T, a second asymmetry value "β2" between 11T and 4T over recording power "Pw" at a pulse width "Tmp" of 0.7T and a top pulse width "Ttop" of 1.4T in case of DVD-R. FIG. 3C is a diagram of variations of jitter "σ", a first asymmetry value "β1" between 11T and 3T, a second asymmetry value "β2" between 11T and 4T over recording power "Pw" at a pulse width "Tmp" of 0.8T and a top pulse width "Ttop" of 1.4T in case of DVD-R.

"11T" means a cycle signal which has a space length of 11 times of a channel clock "T" and a mark length of 11 times of the channel clock "T". "3T" means a cycle signal which has a space length of 3 times of a channel clock "T" and a mark length of 3 times of the channel clock "T". "4T" means a cycle signal which has a space length of 4 times of a channel clock "T" and a mark length of 4 times of the channel clock "T". The channel clock "T" means a reference clock or a reference cycle for recording and reproducing operations.

Subsequently described are concerned with the important regularity which may be obtained from a relationship among the recording strategy parameters, the recording power "Pw", the jitter "σ" and various analog characteristic values. As shown in FIGS. 3A, 3B, and 3C, it can be estimated that if the conditions that the first asymmetry value "β1" and the second asymmetry value "β2" are equal to each other are satisfied, then the jitter "σ" takes a minimum value.

In general, if the jitter "σ" is above 15%, then it is difficult to correct errors. It is, therefore, necessary that the jitter "σ" is not higher than 15%. The presently available drive is capable of reducing or suppressing the jitter "σ" to 8%, but any further reduction or suppression under 8% can not be obtained. The factors for increasing the jitter "σ" may include an error in setting the recording power "Pw", an error in setting the recording strategy, an error in setting focus, and an error in setting tilt angle. The allowable maximum jitter "σ" due to the error in setting the recording power "Pw" and the error in setting the recording strategy would be estimated to be only approximately 2%. Accordingly, it is preferable to so adjust the recording power "Pw" and the recording strategy that the jitter "σ" is not higher than 10%.

Figure 4:
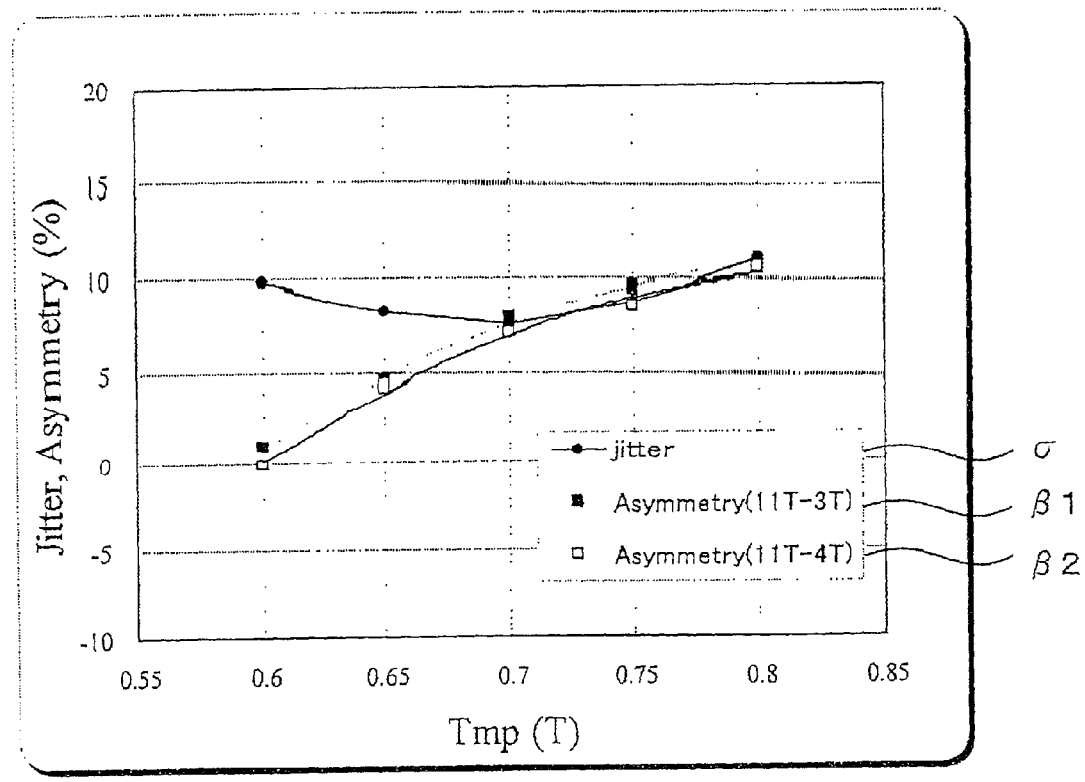
FIG. 4 is a diagram of variations of the minimum jitter value "σ", the first asymmetry value "β1" between 11T and 3T, and the second asymmetry value "β2" between 11T and 4T over pulse width "Tmp" at the recording power "Pw" where the jitter value "σ" takes the minimum value under various recording strategies in FIGS. 3A, 3B and 3C.

FIG. 4 is a diagram of variations of the minimum jitter value "σ", the first asymmetry value "β1" between 11T and 3T, and the second asymmetry value "β2" between 11T and 4T over pulse width "Tmp" at the recording power "Pw" where the jitter value "σ" takes the minimum value under various recording strategies in FIGS. 3A, 3B and 3C Namely, in order to make it more easy to understand the results shown in FIGS. 3A, 3B and 3C.

FIG. 4 shows that as the jitter value "σ" takes the minimum value, the first and second asymmetry values "β1" and "β2" are substantially equal to each other. FIG. 4 also shows that if the first and second asymmetry values "β1" and "β2" are in the range of 0~10%, then the minimum value of the jitter "σ" is not higher than 10%.

From the above results, it can be understood that if the conditions that the first and second asymmetry values "β1" and "β2" are substantially equal to each other and in the range of 0~10% could be found by varying the recording power "Pw" and the recording strategy parameters, the acceptable small jitter "σ" of not higher than 10% can be obtained. The utilization of this phenomenon allows optimizations of the recording power "Pw" and the recording strategy by use of only the asymmetry values "β", which is easily measurable, without measuring the jitter "σ" itself, measurement of which is time-consuming and needs a large specific area over the disk. The novel adjustment method in accordance with the present invention utilizes the above phenomenon.

It should be noted that in the prior art, it has been well known that either the asymmetry value between 11T (the fourth single cycle signal) and 3T or the asymmetry value between 14T (the third single cycle signal) and 3T is used for adjustment to the recording power "Pw". By contrast to the prior art, however, in accordance with the present invention, the other cycle signal than 3T, for example, 4T which has the short mark and the short space is utilized for using the at least two asymmetry values. The novel method could be derived by the present inventors based on many experimental results.

Figure 5:
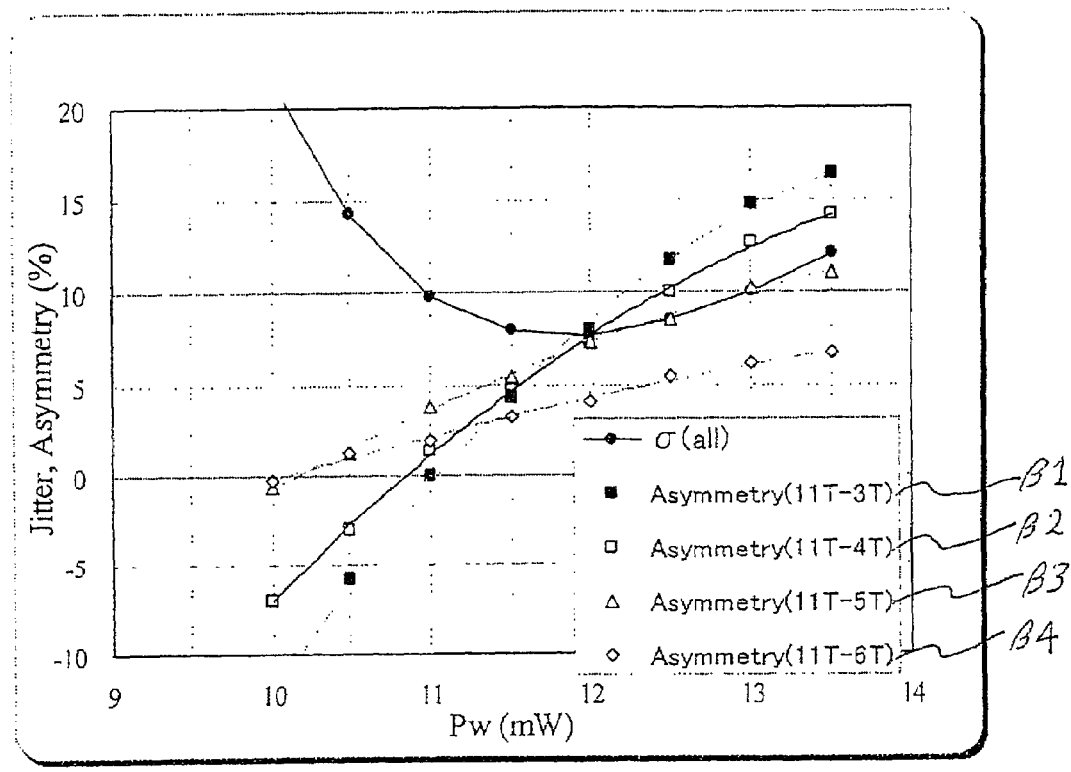
FIG. 5 is a diagram of variations of jitter "σ", a first asymmetry value "β1" between 11T and 3T, a second asymmetry value "β2" between 11T and 4T, a third asymmetry value "β3" between 11T and 5T, and a fourth asymmetry value "β4" between 11T and 6T, over recording power "Pw" at a pulse width "Tmp" of 0.70 in case of DVD-R.

FIG. 5 is a diagram of variations of jitter "σ", a first asymmetry value "β1" between 11T and 3T, a second asymmetry value "β2" between 11T and 4T, a third asymmetry value "β3" between 11T and 5T, and a fourth asymmetry value "β4" between 11T and 6T, over recording power "Pw" at a pulse width "Tmp" of 0.70 in case of DVD-R, wherein the recording strategy is optimum. FIG. 5 shows that the jitter "σ" takes a minimum value at the recording power "Pw" of 12 mW. It should be noted that in the vicinity of the recording power "Pw" at 12 mW, the first asymmetry value "β1" between 11T and 3T, the second asymmetry value "β2" between 11T and 4T and the third asymmetry value "β3" between 11T and 5T are substantially equal to each other, but the fourth asymmetry value "β4" between 11T and 6T is different from the above first, second and third asymmetry values. It is, therefore, no sense to use the cycle signal longer than 6T. The reason why the fourth asymmetry value "β4" between 11T and 6T is different from the above first, second and third asymmetry values should be that the 6T signal is substantially equal to a diameter of laser beam, whereby the amplitude of the reproducing signal is saturated. This tendency is common to the longer cycle signals such as 7T signal or 8T signal. Further, the mark length and the space length become further longer, the amplitude of the reproducing signal becomes closer to that of the 11T signal, whereby the asymmetry becomes small and closer to 0%. In this state, the present invention could never be used. In case of DVD-R, the short mark and short space cycle signal may effectively be 3T signal, 4T signal or 5T signal. In the other words, the present invention can be applied as long as the record mark length and space length are so short as to cause any interference between the forward and subsequent marks adjacent to each other. This means that the increase in the recording density of the disk may make available the longer signals such as 6T.

For modulation, EFM pulse may be available. The present invention is, however, applicable to other modulation methods such as 1-7 modulation, and 2-7 modulation. In case of the 1-7 modulation, the shortest mark is 2T, while the longest mark is 8T. Namely, one asymmetry between 8T and 2T and another asymmetry between 8T and 3T are utilized.

Figure 6:
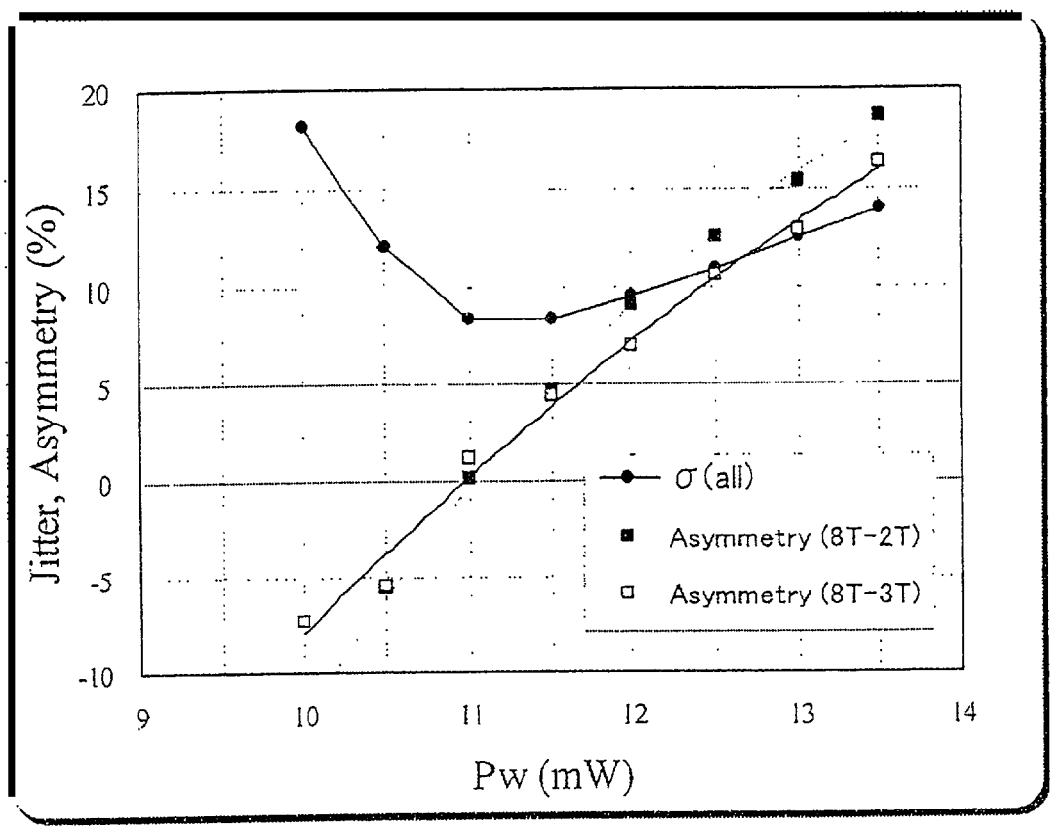
FIG. 6 is a diagram of variations of jitter "σ", a first asymmetry value "β1" between 8T and 2T, and a second asymmetry value "β2" between 8T and 3T over recording power "Pw" in the 1-7 modulation.

Experimental results of the optimizations in case of the 1-7 modulation are shown in FIG. 6 which is a diagram of variations of jitter "σ", a first asymmetry value "β1" between 8T and 2T, and a second asymmetry value "β2" between 8T and 3T over recording power "Pw" in the 1-7 modulation. In case of the 1-7 modulation, cycle signals 2T–8T only are available. The results are similarly to what is shown in FIGS. 3A, 3B and 3C in case of the EFM pulse. Accordingly, the results of FIG. 6 demonstrate that the novel method of the present invention is applicable to any modulation methods.

Figure 7:
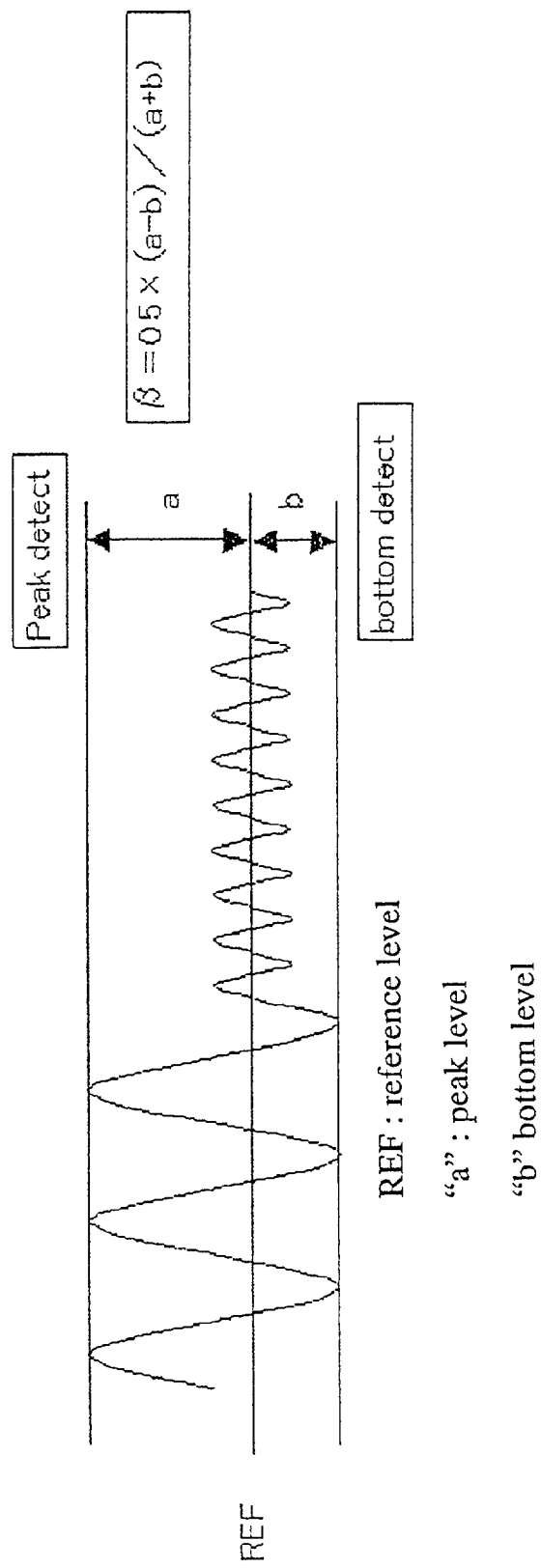
FIG. 7 is a view illustrative of the calculation method for calculating the asymmetry values "β3" shown in FIGS. 3A, 3B and 3C.

FIG. 7 is a view illustrative of the calculation method for calculating the asymmetry values "β" shown in FIGS. 3A, 3B and 3C.

As shown in FIG. 7, based on a reproduced waveform from either 11T and 3T or 11T and 4T, a peak level "a" of 11T and a bottom level "b" of 11T are found for finding the asymmetry values "β" in accordance with the following equation.

$$\beta = 0.5 \times (a-b)/(a+b)$$

As shown in FIG. 7, a reference level "REF" is set at a center of 3T or 4T. As can be seen from the definition of asymmetry value "β", the presence of any inter-relationship between the asymmetry values "β" means the presence of any inter-relationship in signal level among 11T, 4T and 3T. A minimum value, a maximum value and an averaged level of each signal pattern are used for adjustments similarly to the above, provided that the inter-relationship between the asymmetry values "β" and the values themselves should be considered in view of the signal level.

For example, an averaged voltage "Va" of 3T or 4T and an averaged voltage "Vp" of 11T as well as an amplitude of "Vpp" are set to find the asymmetry value "β" in accordance with the following equation.

$$\beta = (Vp-Va)/Vpp$$

The above two equations are available in case that the signal recording causes falling the averaged voltage of the reproducing signal.

The following two equations are also available but in other case that the signal recording causes rising the averaged voltage of the reproducing signal.

$$\beta = 0.5 \times (b-a)/(a+b)$$

$$\beta = (Va-Vp)/Vpp$$

The above issue depends only on the polarity or pulse or minus value of the asymmetry value "β". Any one set of the equations may be available by optionally changing the polarity of the asymmetry value "β", for example, changing +5% into -5%. In general, the asymmetry value is represented in percents, for which reason the obtained asymmetry value "β" from the above equations should be converted into percentage representation.

In the above typical example, the asymmetry value is calculated from the output level of the reproducing signal. It is also possible as alternatively available method that the averaged level of the signal is integrated or the averaged level is extracted in view of frequency for realizing the present invention.

In the above typical example, also the 11T single cycle signal, the 3T single cycle signal, and 4T single cycle signal are used. It is also possible as alternatively available method that a random pattern is used for sampling the signal levels in each cycle in order to calculate the asymmetry value or any substantially equivalent value thereto for realizing the present invention.

It is preferable as described above that the plural asymmetry values are substantially equal to each other for minimizing the jitter. This is the optimum conditions. It is, of course, available that the plural asymmetry values have a small difference even this is not optimum conditions but may be better or acceptable conditions.

The nature of the present invention is to adjust the recording conditions based on the relationship of the plural asymmetry values or any substantially equivalent values thereto. In the above-described typical example, the recording conditions to be adjusted include the recording power and the recording pulse (write pulse) waveform. In the light of this nature, it is also available to adjust defocus, radial tilt and tangential tilt. It is also available that the waveform on the recording is extracted for adjustment to the recording conditions during the recording operation. Further, the adjustments to defocus, radial tilt and tangential tilt may be available not only for recording operation but also for reproducing operation.

In other available example, the adjustment to the recording conditions may be made with reference to a first asymmetry value of either 11T and 3T or 11T and 4T and a second asymmetry value of 3T and 4T. In this case, the preferable or acceptable conditions are that the first asymmetry value of either 11T and 3T or 11T and 4T is in the range of 0~10%, and the second asymmetry value of 3T and 4T is in the range of 0%.

In the present specification, the "3T single cycle signal (first single cycle signal)" represents the signal which has a mark with a 3T length and a space with the 3T length, wherein the "mark" corresponds "1" in binary digit, while the "space" corresponds "0" in binary digit. The "4T single cycle signal (second single cycle signal)" represents the signal which has a mark with a 4T length and a space with the 4T length.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

First Embodiment:

A first embodiment according to the present invention will be described in detail with reference to the drawings. The sequential processes to the DVD-R will be described in detail with reference again to FIG. 2. FIG. 8 is a table of the recording conditions adjusted in accordance with the novel method shown in FIG. 2 in accordance with the present invention.

In the first step A01, the parameters are set, wherein the recording power "Pw" and other parameters other than the pulse width "Tmp" shown in FIGS. 1A, 1B, and 1C are set similarly to the disk informations buried in the disk. As shown in FIG. 8, nine combinations of the recording power "Pw" and the pulse width "Tmp" are set, which are represented by nine hatched-regions. The combinations shown in FIG. 8 is mere example, but which may be variable optionally.

Five levels of the recording powers "Pw" are set in the range of −30% to +30% of the disk information value. Three levels of the pulse width "Tmp" are set in the range of −0.1T to +0.1T of the disk information value. The reason why the different recording pulse is used for each pulse width "Tmp" is that the increase in the pulse width "Tmp" increases the recording power "Pw" where the jitter "σ" takes the minimum value.

In the second step A02, cycle signals are recorded, wherein at least two kinds of cycle signals are recorded, for example, per one half of one cync-frame. In a specific pattern recording, 11T and 3T as well as 11T and 4T are recorded in one cync-frame. At least three cycle signals are, for example, 11T single cycle signal, 4T single cycle signal, and 3T single cycle signal. The cycle signals are recorded into a PCA area (power calibration area) of the disk. Since the nine combinations of the recording power "Pw" and the pulse width "Tmp", the record is made to 18 sync-frames in total.

Figure 9:
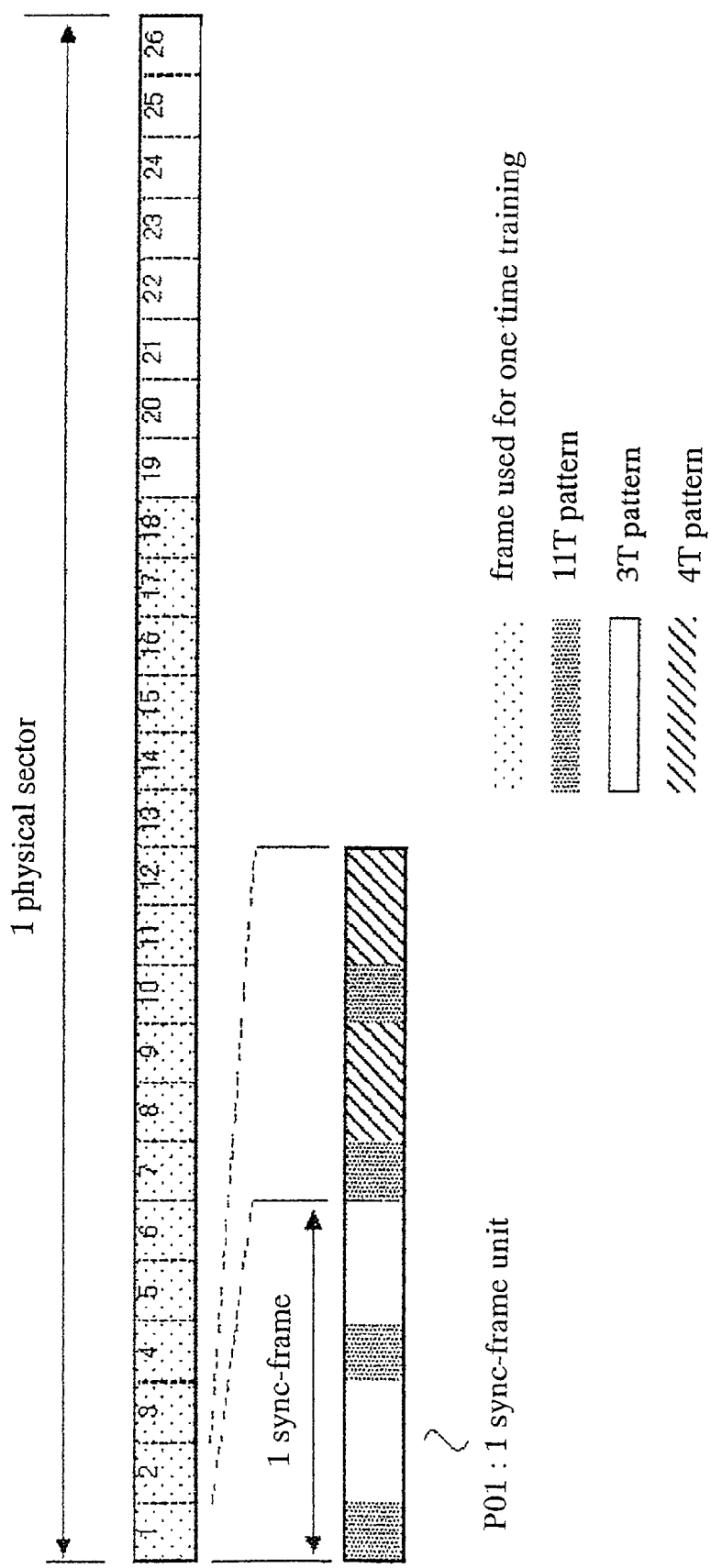
FIG. 9 is a diagram illustrative of one typical example of one physical sector including twenty six sync-frames.

FIG. 9 is a diagram illustrative of one typical example of one physical sector including twenty six sync-frames. One physical sector includes twenty six sync-frames. First to eighteenth sync-frames are used for one time training. A rear dotted region represents the sync-frames to be used for one time training. A dense dotted region represents a continuous pattern P02 of 11T. P01 represents a single sync-frame unit. A white region represents a continuous pattern P03 of 3T. A hatched region represents a continuous pattern P04 of 4T. A first combination of 11T and 3T and a second combination of 11T and 4T appear alternatively in adjacent two sync-frames. This alternating appearances of the first and second combinations are not essential. The essential conditions are that 18 cases of the recordings are available under the 9 conditions.

In the third step A03, a signal level is measured, wherein a β-value or an asymmetry value of the each cync-frame is measured. Nine cases of the first asymmetry value "β1" and nine cases of the second asymmetry value "β2" are measured respectively. The measured first and second asymmetry values "β1" and "β2" will be used for the subsequent condition-optimization process.

Figure 10:
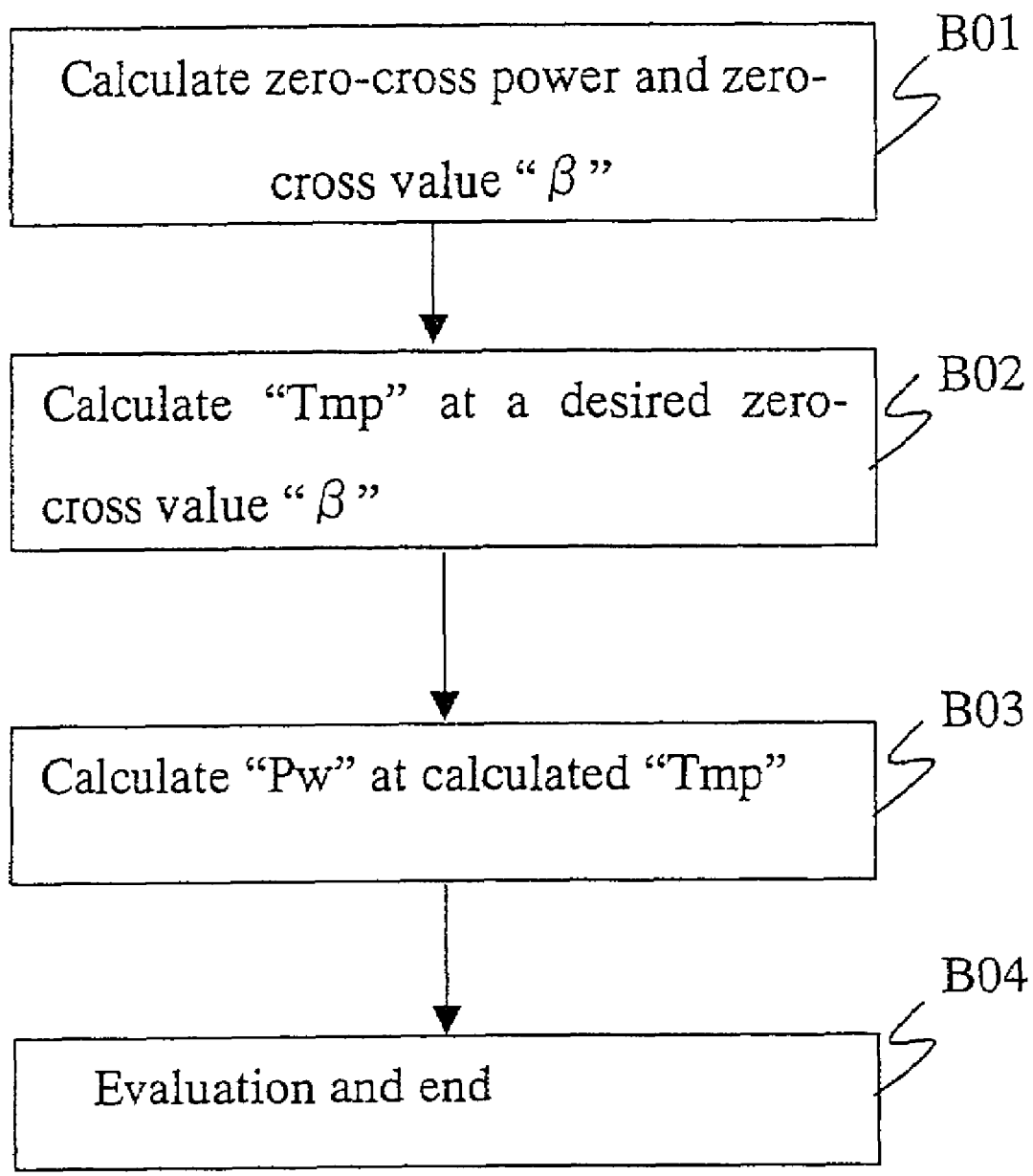
FIG. 10 is a flow chart illustrative of a process for derivation of the optimum recording condition included in the series of the processes shown in FIG. 2.
Figure 11:
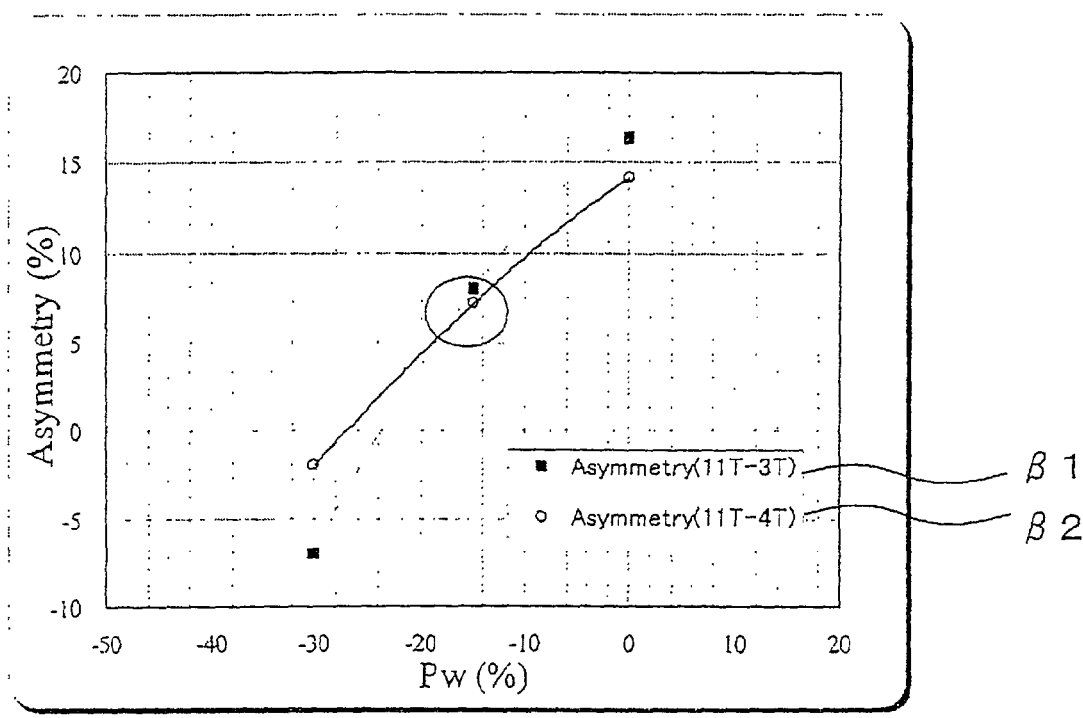
FIG. 11 is a diagram illustrative of one example of dependency of each of the first and second asymmetry values "β1" and "β2" upon the recording power "Pw" with reference to the recording strategy shown in FIG. 10.
Figure 12:
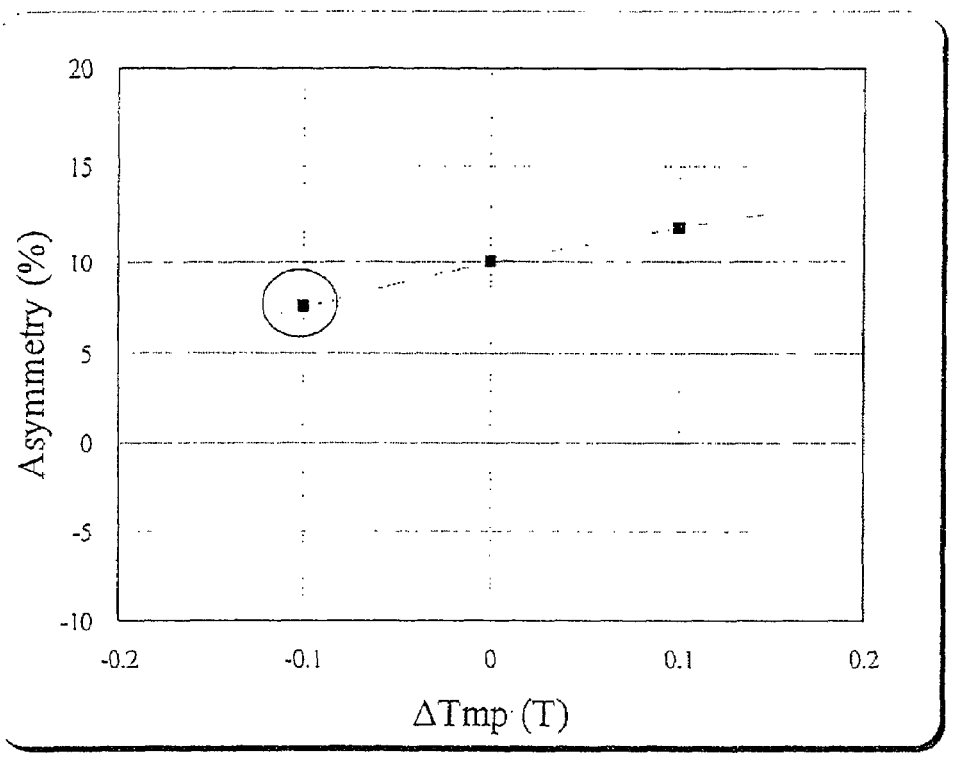
FIG. 12 is a diagram illustrative of one example of dependency of zero-cross value "β" upon the pulse width "Tmp" in connection with the optimization process shown in FIG. 10.
Figure 13:
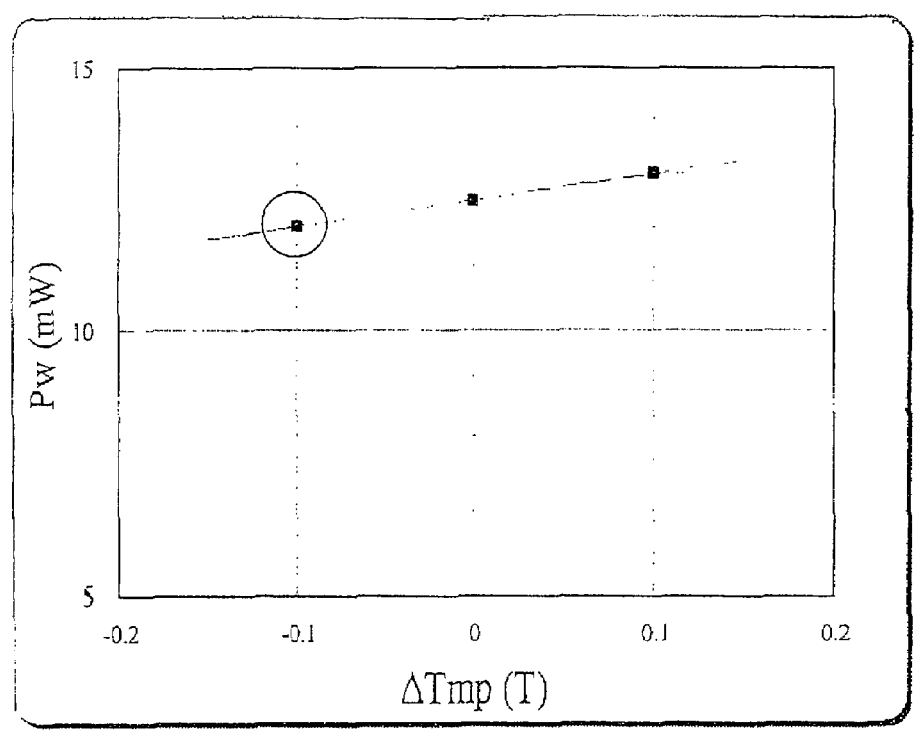
FIG. 13 is a diagram illustrative of one example of dependency of zero-cross power "β" upon the pulse width "Tmp" in connection with the optimization process shown in FIG. 10.

In the fourth step A04, an optimum recording power "Pw" and an optimum pulse width "Tmp" are derived for setting the optimum conditions. FIG. 10 is a flow chart illustrative of a process for derivation of the optimum recording condition included in the series of the processes shown in FIG. 2. FIG. 11 is a diagram illustrative of one example of dependency of each of the first and second asymmetry values "β1" and "β2" upon the recording power "Pw" with reference to the recording strategy shown in FIG. 10. FIG. 12 is a diagram illustrative of one example of dependency of zero-cross value "β" upon the pulse width "Tmp" in connection with the optimization process shown in FIG. 10. FIG. 13 is a diagram illustrative of one example of dependency of zero-cross power "β" upon the pulse width "Tmp" in connection with the optimization process shown in FIG. 10.

In the first step B01, for each pulse width "Tmp", the recording power as the zero-cross power and a corresponding zero-cross value "β" are calculated, wherein the first and second asymmetry values "β1" and "β2" are equal to each other.

The graph of FIG. 11 is made from the above measured values with reference to each pulse width "Tmp", for which reason the zero-cross power and the zero-cross value "β" are derived. Three sets of the zero-cross power and the zero-cross value "β" are obtained for each pulse width "Tmp". It is preferable to obtain the zero-cross power and the zero-cross value "β" by connecting measured points in accordance with the minimum mean-square approximation method and estimation based on the connection line. Alternatively, it is also available to so select the recording conditions that the difference in the zero-cross value "β" between the measured points is within the range of a predetermined range without making any estimation. Both the above former and later methods may also be applicable to the later process for optimization of the condition.

In the second step B02, based on the above obtained zero-cross values "β" for the respective pulse widths "Tmp", a pulse width "Tmp", where the zero-cross value "β" takes a desired value, is calculated by using the graph of FIG. 12.

In this first embodiment, the desired zero-cross value "β" is set at 7.5%. The optimum zero-cross value "β" varies depending upon the recording and reproducing apparatus. As shown in FIG. 4, if the value "β" is 7.5%, then the optimum jitter "σ" is obtained. For this reason, in this embodiment, the desired zero-cross value "β" is set at 7.5%. Namely, it is preferable to previously estimate the value "β". If the storage medium has a recommend value "β", then it is reasonably preferable to accord to the recommend value "β".

From FIG. 12, it is possible to estimate a desired pulse value "Tmp", where the zero-cross value "β" is 7.5%. The estimated width is the optimum pulse width value "Tmp". The optimum condition is marked by a circle.

In the third step B03, the zero-cross power as the optimum recording power "Pw"-at the optimum pulse width value "Tmp" is found from the graph of FIG. 13.

In the fourth step B04, the evaluation on the obtained conditions was made as follows. Through the above processes, the optimum recording power "Pw" and the optimum pulse width value "Tmp" have been estimated.

The recording and reproducing operations were made under the above-obtained conditions including the optimum recording power "Pw" and the optimum pulse width value "Tmp". The jitter "σ" was about 8.5%. For comparison, the inter-relationship between the first and second asymmetry values "β1" and "β2" was investigated. It was confirmed that the first and second asymmetry values "β1" and "β2" were almost equal to each other and at about 7.2%. The evaluation on the conditions and the calculation processes were completed.

The above-described novel method for adjusting the conditions for recording and reproducing operations to the information storage medium provides the following effects and advantages.

The novel method allows the batch adjustments to both the recording power "Pw" and the recording strategy by taking a short time which corresponds to two cycles of the disk for the batch recording operation and the batch reproducing operation.

The used or necessary area is only the 18 sync-frames which is less than one physical sector which comprises the 26 sync-frames. Generally, In order to measure the jitter "σ" directly, at least 1 ECC block which comprises 16 physical sectors even for one recording condition. By contrast to this direct measurement method, however, in accordance with the present invention, the novel method needs less area. In the prior art, the first adjustment is made by carrying out 63 tests and the subsequent adjustment is made by carrying out 27 tests, namely, 90 tests were needed in total. The necessary area is tremendously larger, for example, 63+27=90 ECC block, as compared to the present invention.

The novel method in accordance with the present invention allows the quick and batch adjustments to the recording power "Pw" and the recording strategy by use of the small area.

As a more preferable modification to the above first embodiment, it is also available that any one of the recording power "Pw" and the pulse width "Tmp" is fixed, while the remainder is varied into plural levels, for example, five levels for re-investigation of the relationship between the first and second asymmetry values "β1" and "β2" in order to obtain a higher accurate result.

In the above-first embodiment, the top pulse width "Ttop" is fixed, while the pulse width "Tmp" is varied. It is also available as a modification that the pulse width "Tmp" is fixed, while the top pulse width "Ttop" is varied for realizing the same adjustment.

In the above first embodiment, 11T signal was used. Needless to say, however, it was also confirmed that 14T signal having almost the same width as 11T is available for obtaining the same results.

Further, it was confirmed that 8T, 9T and 10T are also available instead of 11T, for the above-adjustment, even 8T, 9T and 10T are smaller in amplitude than 11T and 14T. The use of 11T or 14T is more preferable than use of 8T, 9T or 10T because a larger difference in amplitude from 3T or 4T makes it easy to detect the same.

In addition, it is also available as a modification to the first embodiment that a first single cycle signal comprising a 3T mark and a 4T space, and a second single cycle signal comprising a 4T mark and a 3T space are used for realizing the novel method of the present invention.

Moreover, it is also available as a modification to the first embodiment that in order to increase the accuracy, the method described in the later embodiment is used.

Figure 14:
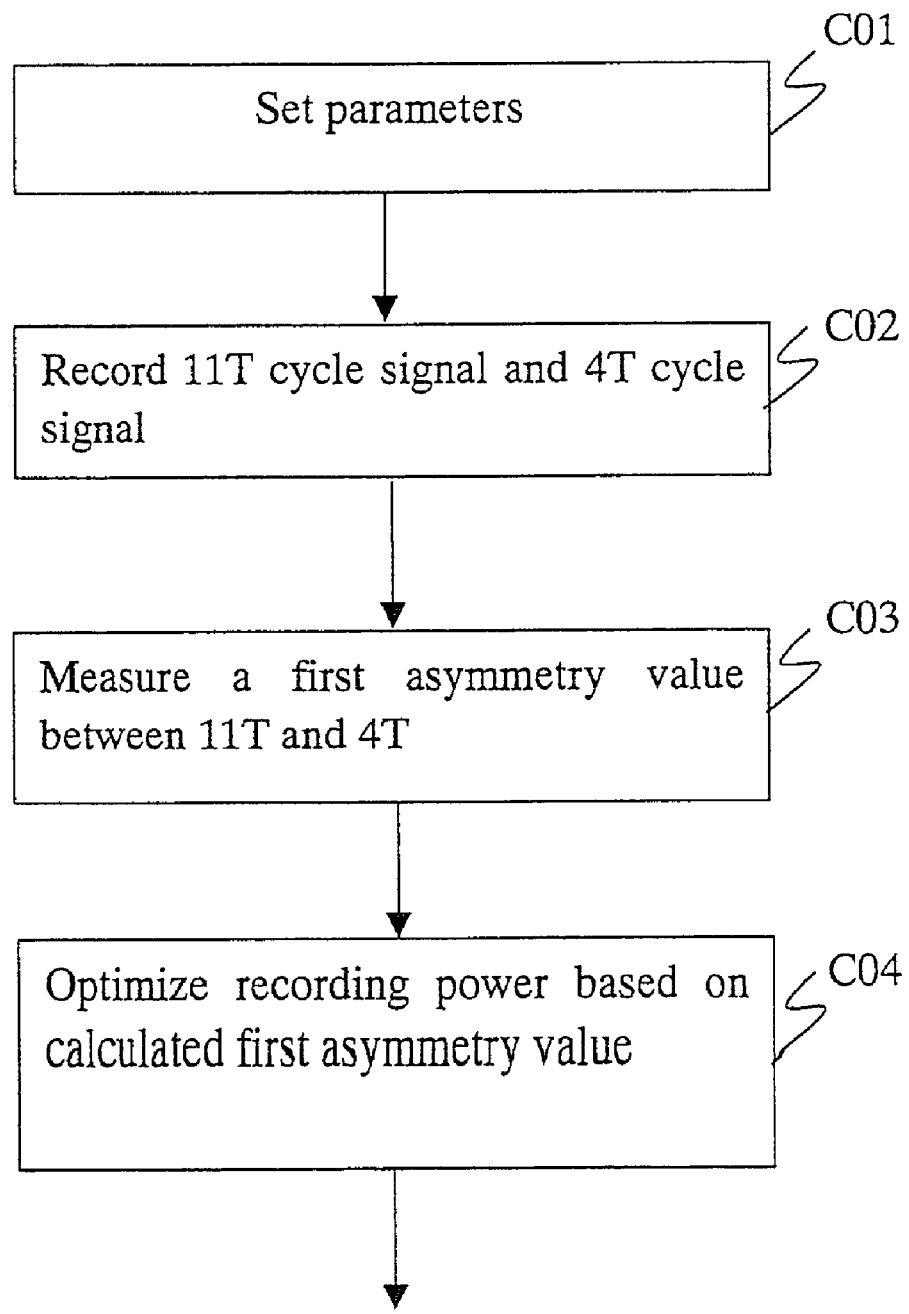
FIG. 14 is a flow chart of a first stage of a novel method of adjusting conditions for recording informations onto an information storage medium in a second embodiment in accordance with the present invention.
Figure 15:
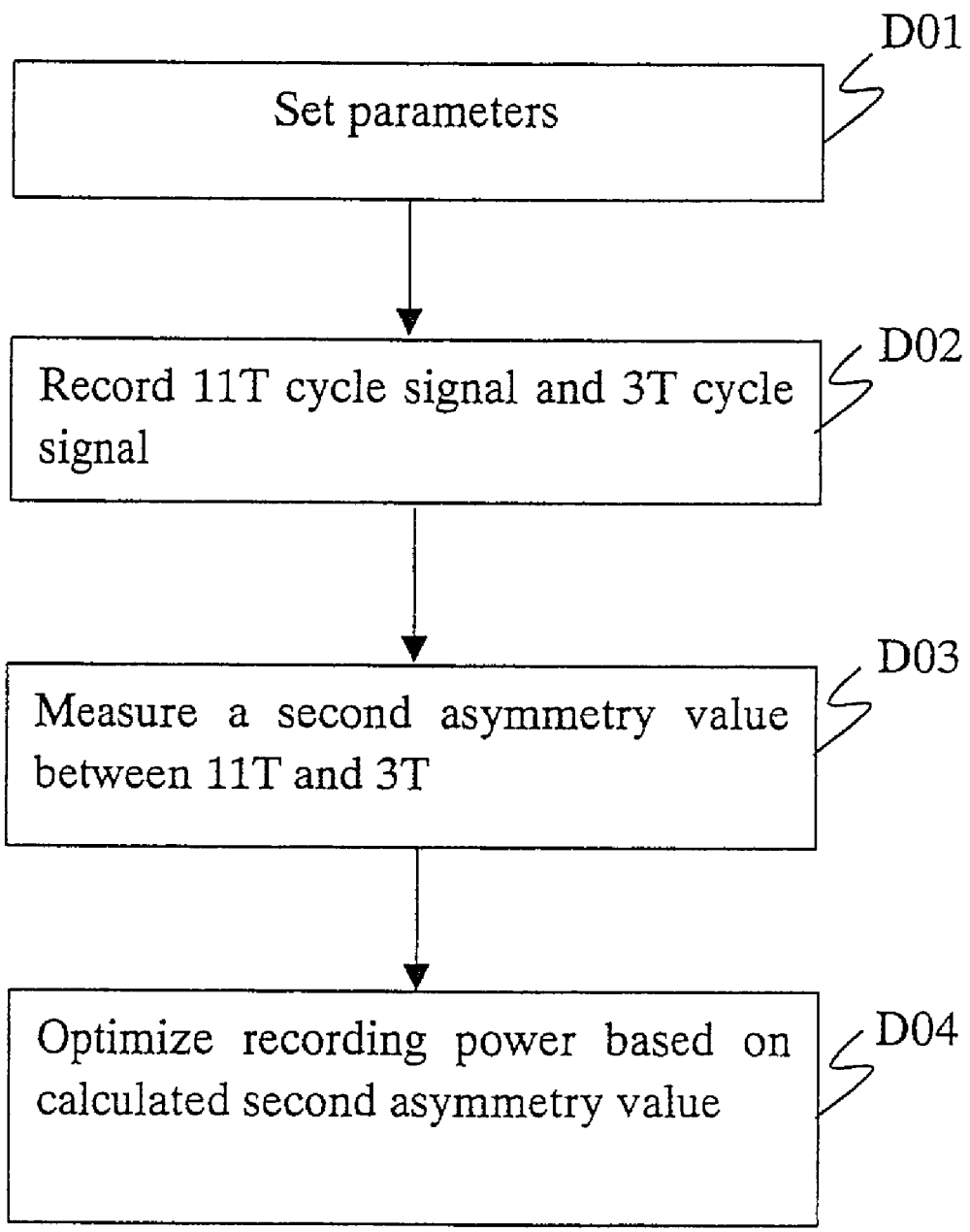
FIG. 15 is a flow chart of a second stage subsequent to the first stage of FIG. 14 of the novel method of adjusting conditions for recording informations onto an information storage medium in the second embodiment in accordance with the present invention.

Second Embodiment:

A second embodiment according to the present invention will be described in detail with reference to the drawings. FIG. 14 is a flow chart of a first stage of a novel method of adjusting conditions for recording informations onto an information storage medium in a second embodiment in accordance with the present invention. The first stage of the novel adjustment method includes the following four steps C01, C02, C03 and C04. FIG. 15 is a flow chart of a second stage subsequent to the first stage of FIG. 14 of the novel method of adjusting conditions for recording informations onto an information storage medium in the second embodiment in accordance with the present invention. The second stage of the novel adjustment method includes the following four steps D01, D02, D03 and D04.

With reference again to FIGS. 3A, 3B, 3C and 3D, the second asymmetry value "β2" is fixed at a specific value of the recording power "Pw" over variations of the pulse width "Tmp". This means that the single measurement of the second asymmetry value "β2" only allows finding out the optimum recording power "Pw". The novel method of the second embodiment is to utilize this fact that the single measurement of the second asymmetry value "β2" only allows finding out the optimum recording power "Pw". The novel method of the second embodiment may be classified into two stages, for example, the first and second stages shown in FIGS. 14 and 15 respectively.

Figure 16:
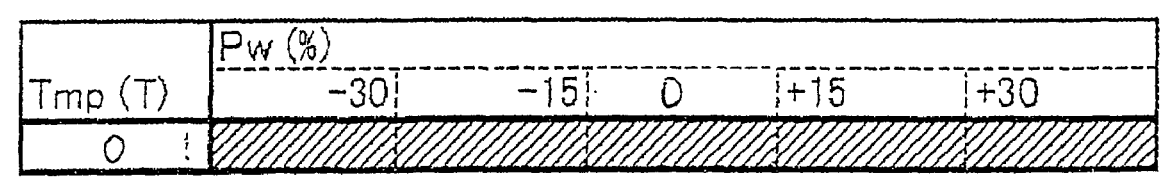
Figure 17:
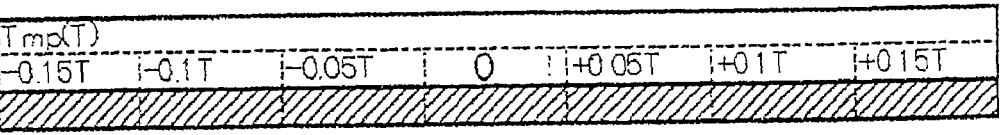
FIG. 17 is a table of the recording conditions adjusted in accordance with the novel method shown in FIG. 15 in accordance with the present invention.

FIG. 16 is a table of the recording conditions adjusted in accordance with the novel method shown in FIG. 14 in accordance with the present invention. FIG. 17 is a table of the recording conditions adjusted in accordance with the novel method shown in FIG. 15 in accordance with the present invention.

In the first step C01 included in the first stage, parameters are set, wherein other parameters other than the recording power are set similarly to disk informations buried in the disk. As shown in FIG. 16, five levels of the recording powers "Pw" are set in the range of −30% to +30% of the disk information value.

In the second step C02 included in the first stage, cycle signals are recorded, wherein at least two kinds of cycle signals are recorded, for example, per one cync-frame. In a specific pattern recording, 11T and 4T are recorded in one cync-frame. The cycle signals are recorded into a PCA area (power calibration area) of the disk. Since the five levels of the recording power "Pw" are present, the record of 11T and 4T is made to 5 sync-frames in total.

In the third step C03 included in the first stage, a signal level is measured, wherein a β2-value or an asymmetry value of the each cync-frame is measured. Five values of the second asymmetry "β2" are measured. The measured second asymmetry values "β2" will be used for the subsequent condition-optimization process.

In the fourth step C04 included in the first stage, an optimum recording power is derived by plotting the recording powers "Pw" on the horizontal axis and also plotting the measured second asymmetry value "β2" on the vertical axis, so that an optimum recording power, where the second asymmetry value "β2" takes 7.5%, is estimated.

In the first step D01 included in the second stage subsequent to the first stage, parameters are set, wherein the recording power is fixed at the above-obtained optimum recording power level. As shown in FIG. 17, seven values of the pulse widths "Tmp" are set in the range of −0.5T to +0.5T of the disk information value.

In the second step D02 included in the second stage, cycle signals are recorded, wherein at least two kinds of cycle signals are recorded, for example, per one cync-frame. In a specific pattern recording, 11T and 3T are recorded in one cync-frame. The cycle signals are recorded into a PCA area (power calibration area) of the disk. Since the seven values of the pulse widths "Tmp" are present, the record of 11T and 3T is made to 7 sync-frames in total.

In the third step D03 included in the second stage, a signal level is measured, wherein a β1-value or an asymmetry value of the each cync-frame is measured. Seven values of the first asymmetry "β1" are measured. The measured first asymmetry values "β1" will be used for the subsequent condition-optimization process.

In the fourth step D04 included in the second stage, an optimum recording power is derived by plotting the pulse width "Tmp" on the horizontal axis and also plotting the measured first asymmetry values "β1" on the vertical axis, so that an optimum pulse width "Tmp", where the first asymmetry value "β1" takes 7.5%, is estimated.

As a result, the estimations of the optimum recording power "Pw" and the optimum pulse width "Tmp" has been completed.

The recording and reproducing operations were made under the above-obtained conditions including the optimum recording power "Pw" and the optimum pulse width value "Tmp". The jitter "σ" was about 8.0%. For comparison, the inter-relationship between the first and second asymmetry values "β1" and "β2" was investigated. It was confirmed that the first and second asymmetry values "β1" and "β2" were almost equal to each other and at about 7.5%.

The novel method of the second embodiment allows the adjustments to both the recording power "Pw" and the recording strategy by taking a short time which corresponds to four cycles of the disk.

Third Embodiment:

A third embodiment according to the present invention will be described in detail with reference to the drawings. FIG. 18 is a table of the recording conditions adjusted in accordance with the novel method shown in FIG. 2 in the third embodiment in accordance with the present invention. In this third embodiment, the processes shown in FIG. 2 are carried out as follows.

In the first step A01, parameters are set, wherein other parameters other than the recording power arc set similarly to disk informations buried in the disk. As shown in FIG. 18, five levels of the recording powers "Pw" are set in the range of −30% to +30% of the disk information value.

In the second step A02, cycle signals are recorded, wherein at least two kinds of cycle signals are recorded, for example, per one cync-frame. In a specific pattern recording, 11T and 3T as well as 11T and 4T are recorded in one cync-frame. At least three cycle signals are, for example, 11T single cycle signal, 4T single cycle signal, and 3T single cycle signal. The cycle signals are recorded into a PCA area (power calibration area) of the disk. Since the five levels of the recording power "Pw" are present, the record of 11T and 4T is made to 5 sync-frames and the record of 11T and 3T is made to 5 sync-frames, and thus in total, the records are made to 10 sync-frames.

With reference again to FIG. 9 illustrative of one typical example of one physical sector including twenty six sync-frames. One physical sector includes twenty six sync-frames. First to eighteenth sync-frames are used for one time training. A rear dotted region represents the sync-frames to be used for one time training. A dense dotted region represents a continuous pattern P02 of 11T. P01 represents a single sync-frame unit. A white region represents a continuous pattern P03 of 3T. A hatched region represents a continuous pattern P04 of 4T. A first combination of 11T and 3T and a second combination of 11T and 4T appear alternatively in adjacent two sync-frames. This alternating appearances of the first and second combinations are not essential. The essential conditions are that 10 cases of the recordings are available under the 5 conditions.

In the third step A03, a signal level is measured, wherein a β-value or an asymmetry value of the each cync-frame is measured. Five cases of the first asymmetry value "β1" and five cases of the second asymmetry value "β2" are measured respectively. The measured first and second asymmetry values "β1" and "β2" will be used for the subsequent condition-optimization process.

Figure 19:
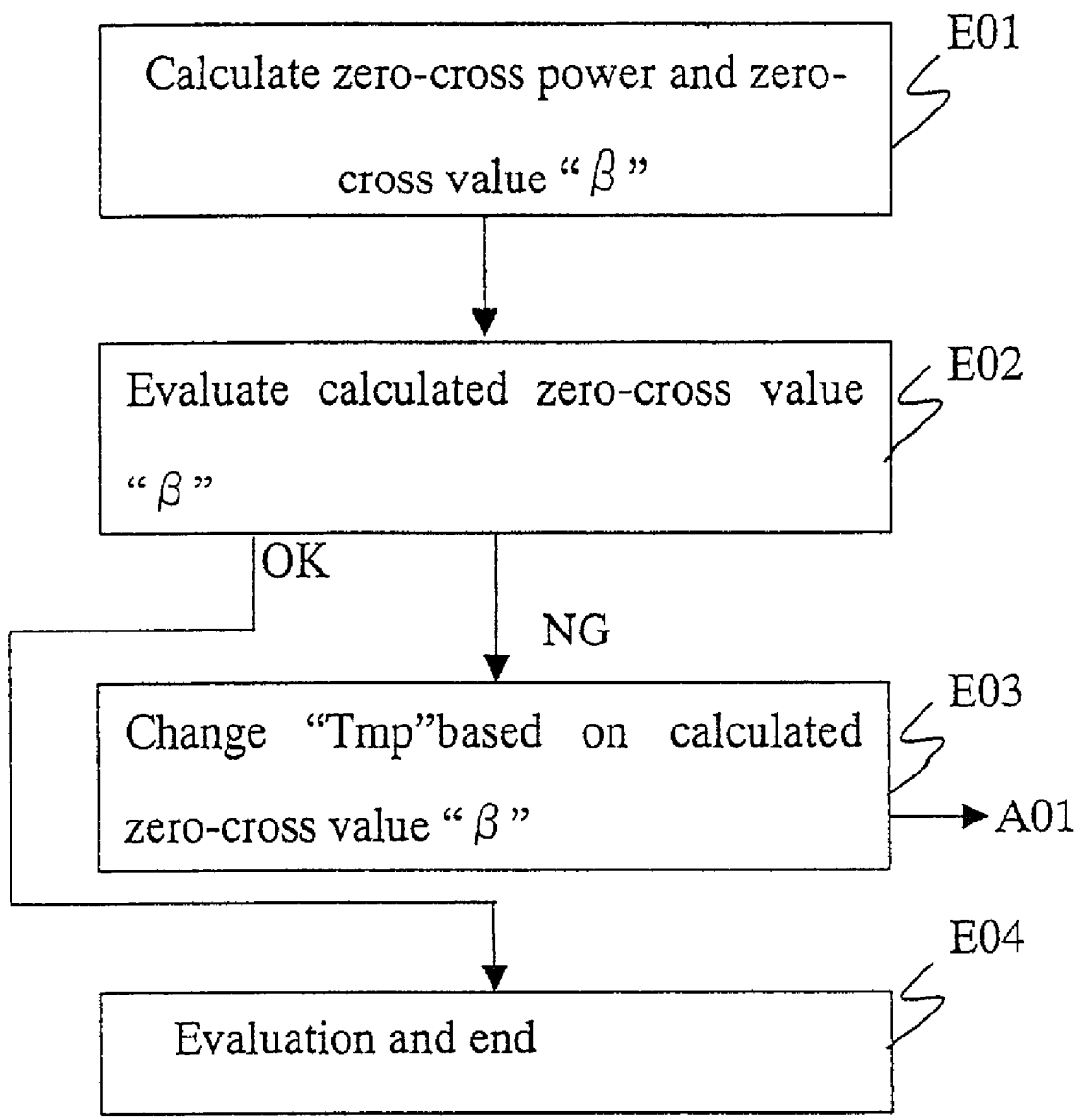
FIG. 19 is a flow chart illustrative of a process for derivation of the optimum recording condition included in the series of the processes shown in FIG. 2.

In the fourth step A04, an optimum recording power "Pw" and an optimum pulse width "Tmp" are derived for setting the optimum conditions. FIG. 19 is a flow chart illustrative of a process for derivation of the optimum recording condition included in the series of the processes shown in FIG. 2. The processes include the following four steps E01, E02, E03 and E04.

In the first step E01, for the single pulse width "Tmp" which is not parameter, the recording power as the zero-cross power and a corresponding zero-cross value "β" are calculated, wherein the first and second asymmetry values "β1" and "β2" are equal to each other. Only one set of the zero-cross power and the corresponding zero-cross value "β" is obtained.

In the second step E02, the evaluation on the zero-cross value "β" is subsequently made under a predetermined criteria in order to suppress the jitter value "σ" within 10%. If the zero-cross value "β" is in the range of 0~10%, then there is no problem. If the zero-cross value "β" is out of the range of 0~10%, then there is a problem. If the result of the evaluation is "no problem", then the process will enter into the fourth step E04. If the result of the evaluation is "a problem", then the process will enter into the third step E03.

In the third step E03, the fixed pulse width "Tmp" is changed based on the unacceptable zero-cross value "β". If the zero-cross value "β" is less than 0%, then the fixed pulse width "Tmp" is too low, for which reason the pulse width "Tmp" is increased by a predetermined increment, for example, 0.05T for back to the first step A01 and subsequent steps A02, A03, A04, E01 and E02 as described above. If the zero-cross value "β" is more than 10%, then the fixed pulse width "Tmp" is too high, for which reason the pulse width "Tmp" is decreased by a predetermined decrement, for example, 0.05T for back to the first step A01 and subsequent steps A02, A03, A04, E01 and E02 as described above. The above sequential processes will be repeated until the result of the evaluation in the step E02 becomes no problem.

In the step E04, the current recording power and the current pulse width are used as the recording conditions because the evaluation result is no problem in the second step E02. It is optionally possible to confirm the evaluation result by accomplishing the recording and reproducing operations under the given conditions. The recording and reproducing operations were made under the obtained conditions. It was confirmed that the jitter "σ" was about 8.7%. The evaluation on the conditions and the calculation processes were completed.

The above-described novel method for adjusting the conditions for recording and reproducing operations to the information storage medium provides the following effects and advantages.

The novel method allows the batch adjustments to both the recording power "Pw" and the recording strategy by taking a short time which corresponds to two cycles of the disk for the recording operation and the reproducing operation.

The used or necessary area in this third embodiment is only 10 sync-frames which is less by 8 sync-frames than the 18 sync-frames used in the first embodiment, and of course 10 sync-frames are much less than one physical sector which comprises the 26 sync-frames.

Fourth Embodiment:

A fourth embodiment according to the present invention will be described in detail with reference to the drawings. In this fourth embodiment, the first, second and third steps A01, A02 and A03 are the same as described in the third embodiment, but the fourth step A04 is different from the third embodiment.

In the first step A01, parameters are set, wherein other parameters other than the recording power are set similarly to disk informations buried in the disk. As shown in FIG. 18, five levels of the recording powers "Pw" are set in the range of −30% to +30% of the disk information value.

In the second step A02, cycle signals are recorded, wherein at least two kinds of cycle signals are recorded, for example, per one cync-frame. In a specific pattern recording, 11T and 3T as well as 11T and 4T are recorded in one cync-frame. At least three cycle signals are, for example, 11T single cycle signal, 4T single cycle signal, and 3T single cycle signal. The cycle signals are recorded into a PCA area (power calibration area) of the disk. Since the five levels of the recording power "Pw" are present, the record of 11T and 4T is made to 5 sync-frames and the record of 11T and 3T is made to 5 sync-frames, and thus in total, the records are made to 10 sync-frames.

In the third step A03, a signal level is measured, wherein a β-value or an asymmetry value of the each cync-frame is measured. Five cases of the first asymmetry value "β1" and five cases of the second asymmetry value "β2" are measured respectively. The measured first and second asymmetry values "β1" and "β2" will be used for the subsequent condition-optimization process.

Figure 20:
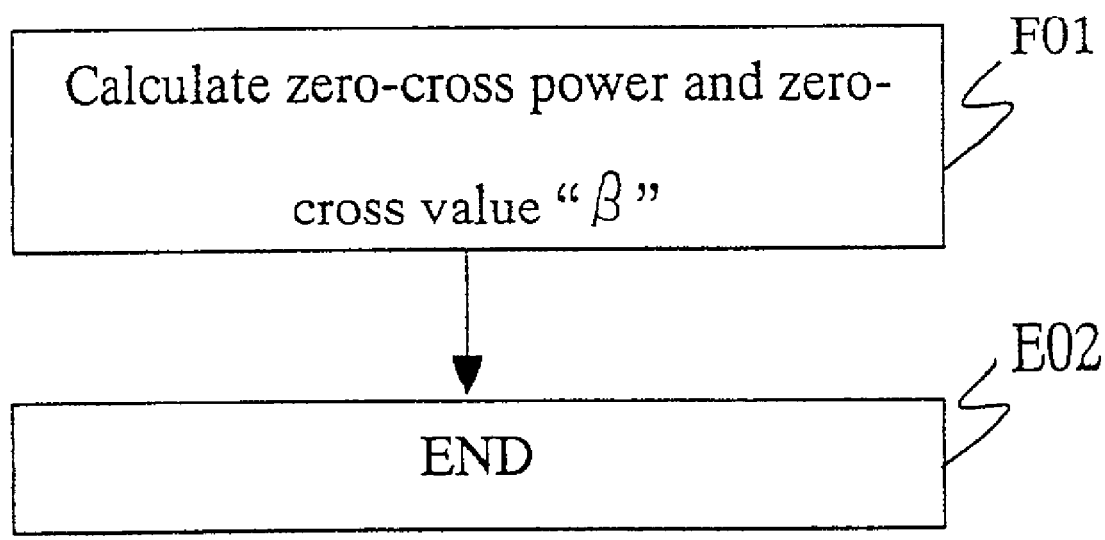
FIG. 20 is a flow chart illustrative of a process for derivation of the optimum recording condition included in the series of the processes shown in FIG. 2.

In the fourth step A04, an optimum recording power "Pw" only is derived for setting the optimum conditions. No optimization to the pulse width "Tmp" is, however, made. FIG. 20 is a flow chart illustrative of a process for derivation of the optimum recording condition included in the series of the processes shown in FIG. 2. The processes include the following four steps F01 and F02.

In the first step F01, the recording power as the zero-cross power and a corresponding zero-cross value "β" are calculated, wherein the first and second asymmetry values "β1" and "β2" are equal to each other. Only one set of the zero-cross power and the corresponding zero-cross value "β" is obtained.

In the second step F02, without any evaluation on the zero-cross value "β", the above-obtained zero-cross power is used as the recording condition. The process is thus finished without any optimization to the pulse width "Tmp".

The above-described novel method for adjusting the conditions for recording and reproducing operations to the information storage medium provides the following effects and advantages.

The novel method allows the batch adjustment to the recording power "Pw" by taking a short time which corresponds to two cycles of the disk for the recording operation and the reproducing operation.

The used or necessary area in this fourth embodiment is only 10 sync-frames which is less by 8 sync-frames than the 18 sync-frames used in the first embodiment, and of course 10 sync-frames are much less than one physical sector which comprises the 26 sync-frames.

Figure 21:
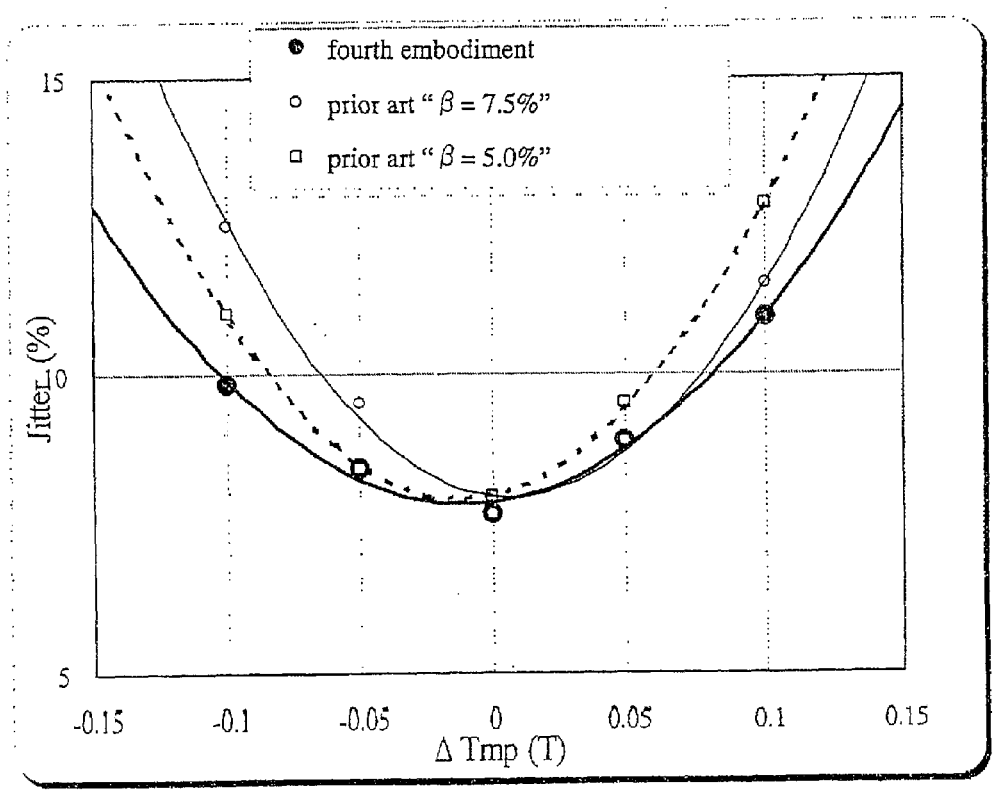
FIG. 21 is a diagram illustrative of variations of the jitter "σ" over a variation in the pulse width "Tmp" from the optimum pulse width in connection with the novel adjustment method of the fourth embodiment in accordance with the present invention, the two β-methods as the prior arts, wherein β=7.5% and 5.0%.

Even the adjustment is made only to the recording power "Pw", the following effects and advantages can be obtained. FIG. 21 is a diagram illustrative of variations of the jitter "σ" over a variation in the pulse width "Tmp" from the optimum pulse width value in connection with the novel adjustment method of the fourth embodiment in accordance with the present invention, the two β-methods as the prior arts, wherein β=7.5% and 5.0%. FIG. 21 shows relationships of the increase in the jitter "σ" and the amount of variation in the pulse width "Tmp" from the optimum pulse width value. ● represents the jitter "σ" in case of the novel adjustment method of the fourth embodiment. ○ represents the jitter "σ" in case of the conventional adjustment method, where the target asymmetry value β=7.5%. □ represents the jitter "σ" in case of the conventional adjustment method, where the target asymmetry value β=5.0%. The jitter "σ" in case of the novel adjustment method of the fourth embodiment is always lower than the jitters "σ" in case of the both conventional adjustment methods. This means that finding the zero-cross power only may suppress the jitter "σ" upon variations in the pulse width "Tmp" from the optimum pulse width value.

The above result of the fourth embodiment demonstrate that the single adjustment to the recording power only without any adjustment to recording pulse waveform would be effective to suppress the jitter "σ" and realize the highly accurate and highly reliable recording operation.

It should, however, be noted that the recording power and the recording pulse waveform are compatible to each other. Namely, it is also available as a modification to the fourth embodiment that the recording power is fixed, while the adjustment is made to only the recording pulse waveform so that the zero-cross power appears at the fixed recording power to suppress the jitter "σ" and realize the highly accurate and highly reliable recording operation. In this modification, the same effects as described above can be obtained.

Figure 22A:
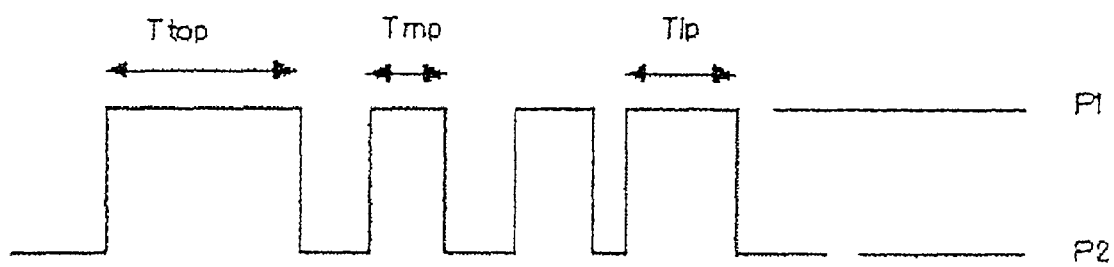
FIG. 22A is a diagram of a recording pulse waveform which includes plural pulses, wherein top and last pulses have specific pulse widths "Ttop" and "Tlp" respectively which are different from a pulse width "Tmp" of the remaining intermediate pulses, provided that the recording powers are uniform.
Figure 22B:
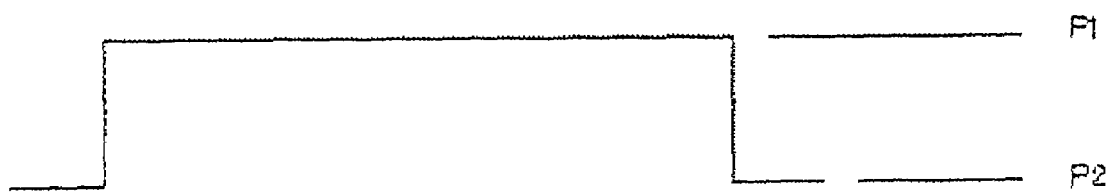
FIG. 22B is another diagram of a recording pulse waveform which includes a single pulse which has a constant recording power.
Figure 22C:
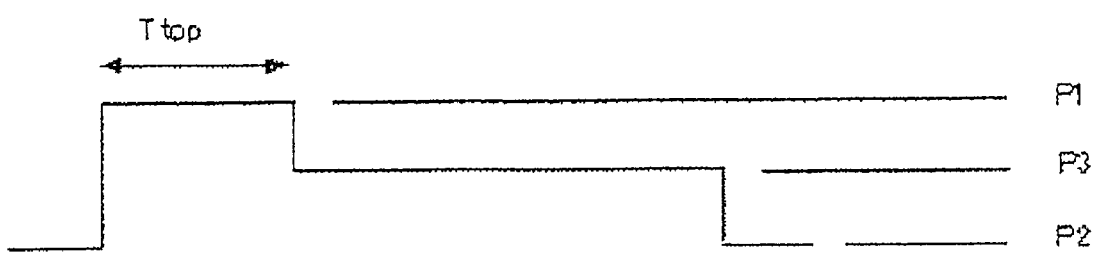
FIG. 22C is a diagram of still another recording pulse waveform which includes a modified pulse, wherein a recording power is emphasized at top.
Figure 22D:
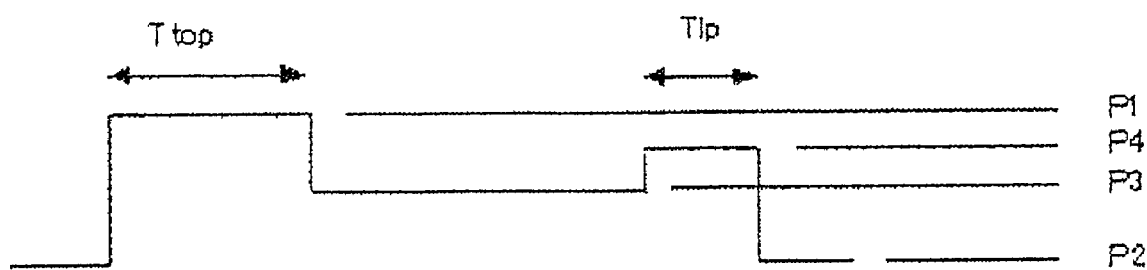
FIG. 22D is a diagram of yet another recording pulse waveform which includes another modified pulse, wherein a recording power is emphasized at top and last.
Figure 22E:
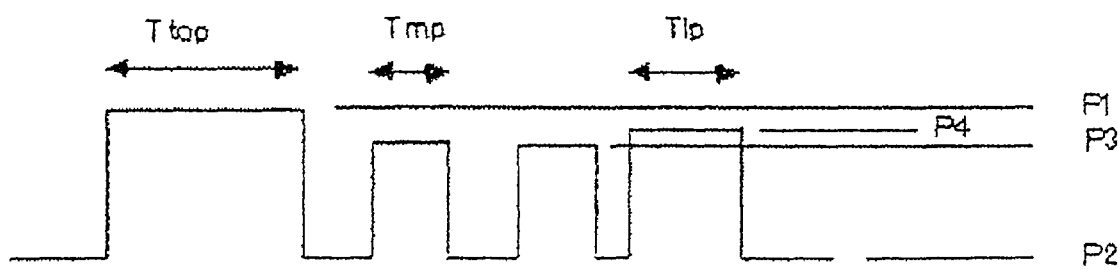
FIG. 22E is a diagram of a recording pulse waveform which includes plural pulses, wherein top and last pulses have specific pulse widths "Ttop" and "Tlp" respectively which are different from a pulse width "Tmp" of the remaining intermediate pulses, provided that the recording powers are also different from each other.

The present invention as described above is basically applicable to a variety of recording pulse waveform as shown in FIGS. 22A, 22B, 22C, 22D and 22E. FIG. 22A is a diagram of a recording pulse waveform which includes plural pulses, wherein top and last pulses have specific pulse widths "Ttop" and "Tlp" respectively which are different from a pulse width "Tmp" of the remaining intermediate pulses, provided that the recording powers are uniform. FIG. 22B is another diagram of a recording pulse waveform which includes a single pulse which has a constant recording power. FIG. 22C is a diagram of still another recording pulse waveform which includes a modified pulse, wherein a recording power is emphasized at top. FIG. 22D is a diagram of yet another recording pulse waveform which includes another modified pulse, wherein a recording power is emphasized at top and last. FIG. 22E is a diagram of a recording pulse waveform which includes plural pulses, wherein top and last pulses have specific pulse widths "Ttop" and "Tlp" respectively which are different from a pulse width "Tmp" of the remaining intermediate pulses, provided that the recording powers are also different from each other. It is, however, not so easy to apply the present invention to a variety of recording pulse waveform. In this case, the method of the fourth embodiment is convenient and effective to suppress the jitter "σ".

Fifth Embodiment:

A fifth embodiment according to the present invention will be described in detail with reference to the drawings. In this fifth embodiment, the pulse width "Tmp" is fixed, while the top pulse width "Ttop" is varied.

In the first step, parameters are set, wherein a recording power and other parameters other than the top pulse width "Ttop" are set similarly to disk informations buried into the disk.

In the second step, cycle signals are recorded, wherein at least two kinds of cycle signals are recorded, for example, per one half of one cync-frame.

In the third step, a signal level is measured, wherein a β-value or an asymmetry value of the each cync-frame is measured.

In the fourth step, an optimum recording power and an optimum pulse "Pw" width "Tmp" are derived.

Figure 23A:
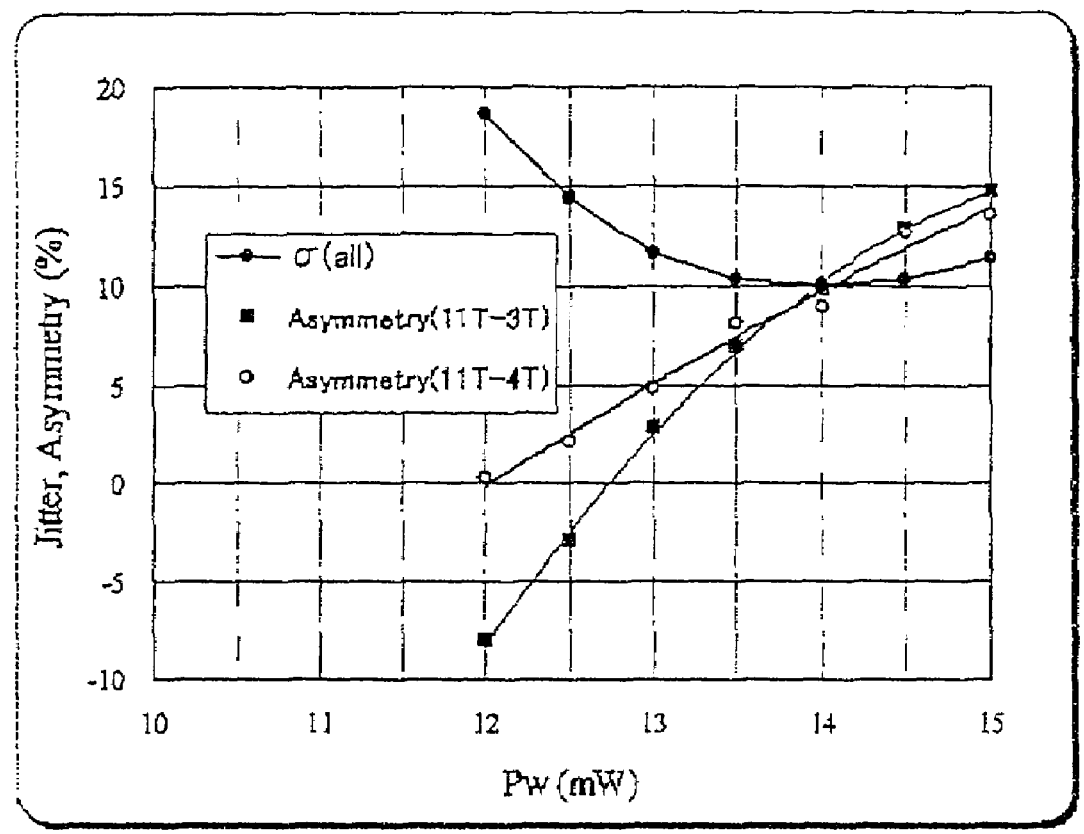
FIG. 23A is a diagram of variations of jitter "σ", a first asymmetry value "β1" between 11T and 3T, a second asymmetry value "β2" between 11T and 4T over recording power "Pw" at a top pulse width "Ttop" of 1.3T and the fixed pulse width "Tmp" of 0.7T.
Figure 23B:
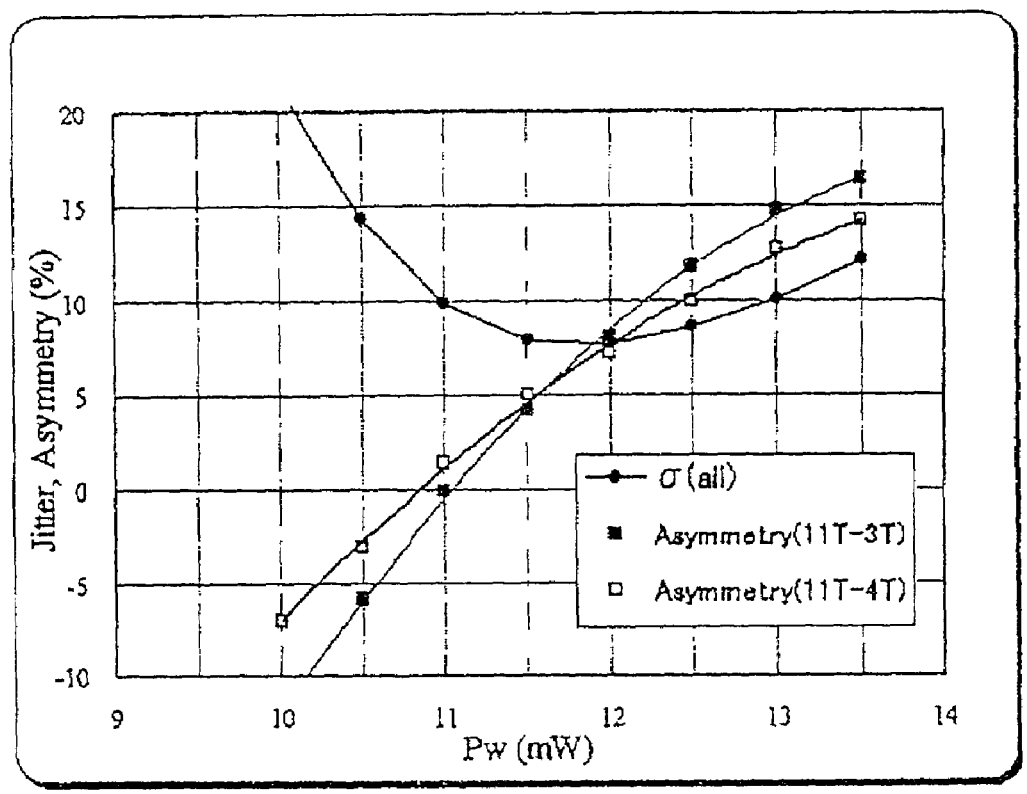
FIG. 23B is a diagram of variations of jitter "σ", a first asymmetry value "β1" between 11T and 3T, a second asymmetry value "β2" between 11T and 4T over recording power "Pw" at a top pulse width "Ttop" of 1.3T and the fixed pulse width "Tmp" of 0.7T.
Figure 23C:
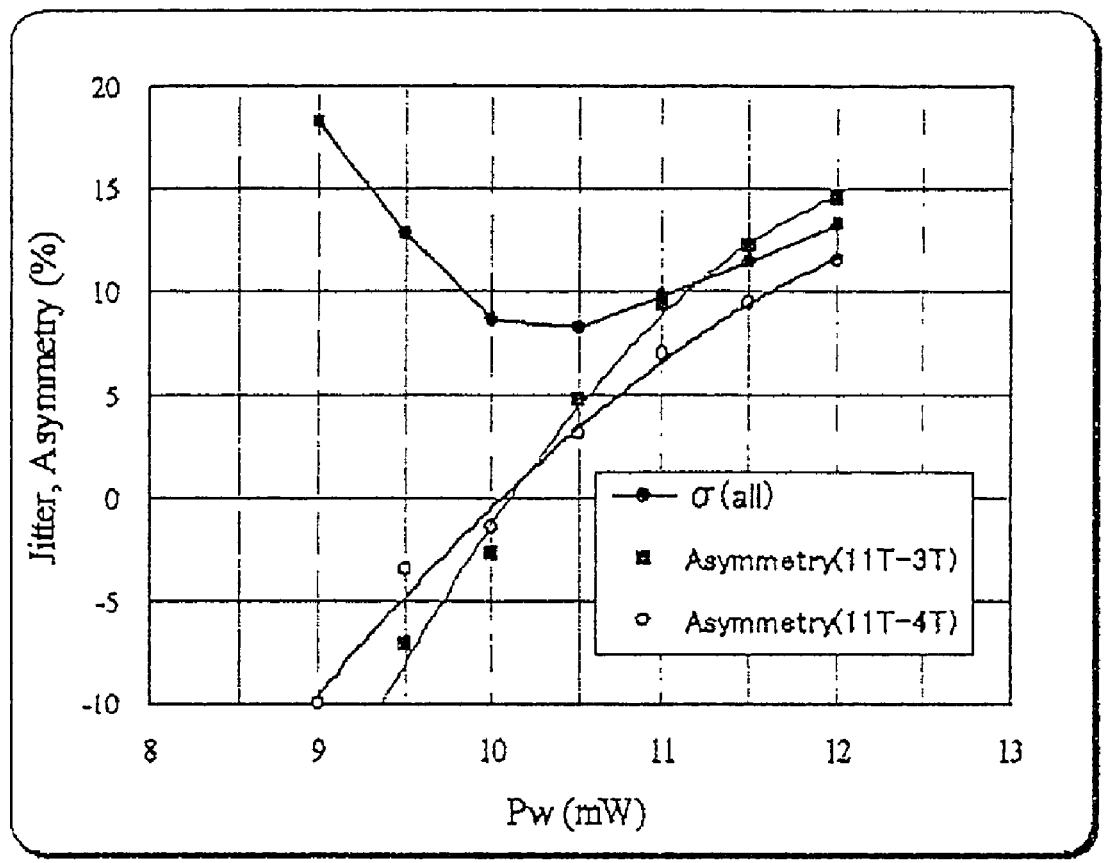
FIG. 23C is a diagram of variations of jitter "σ", a first asymmetry value "β1" between 11T and 3T, a second asymmetry value "β2" between 11T and 4T over recording power "Pw" at a top pulse width "Ttop" of 1.5T and the fixed pulse width "Tmp" of 0.7T.
Figure 23D:
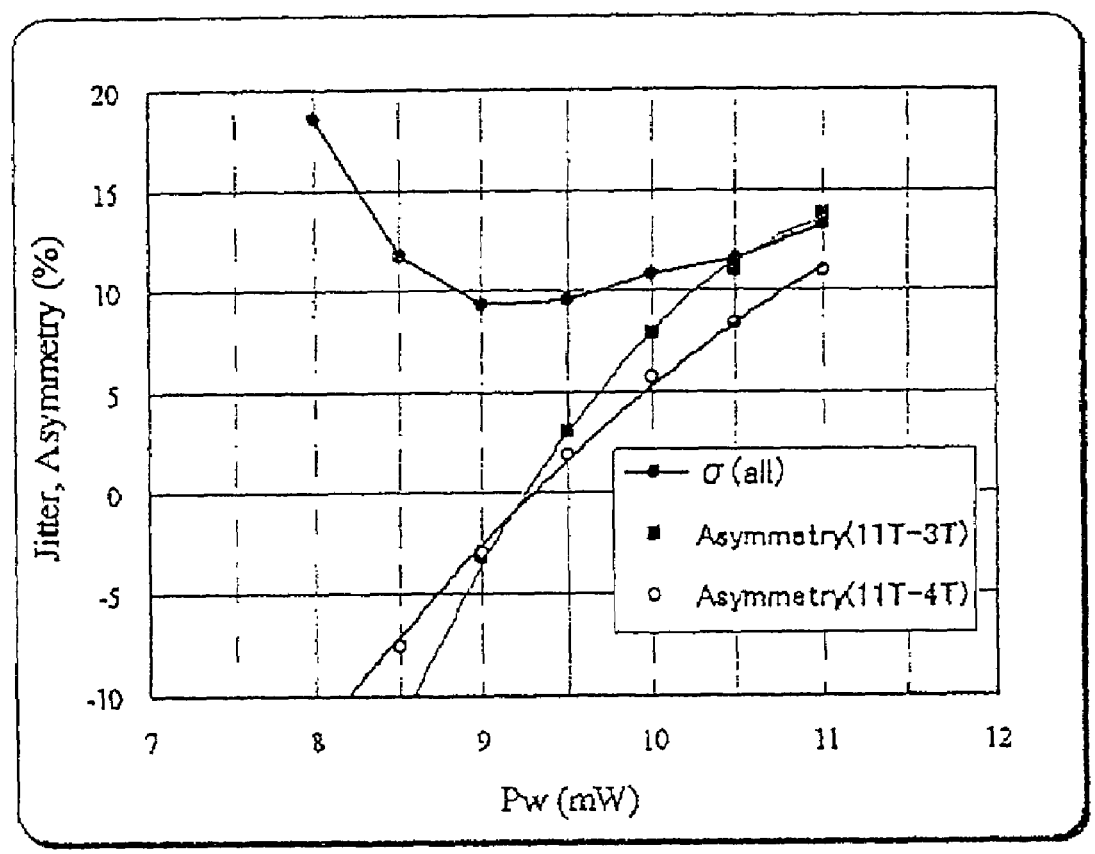
FIG. 23D is a diagram of variations of jitter "σ", a first asymmetry value "β1" between 11T and 3T, a second asymmetry value "β2" between 11T and 4T over recording power "Pw" at a top pulse width "Ttop" of 1.7T and the fixed pulse width "Tmp" of 0.7T.

FIG. 23A is a diagram of variations of jitter "σ", a first asymmetry value "β1" between 11T and 3T, a second asymmetry value "β2" between 11T and 4T over recording power "Pw" at a top pulse width "Ttop" of 1.1T and the fixed pulse width "Tmp" of 0.7T. FIG. 23B is a diagram of variations of jitter "σ", a first asymmetry value "β1" between 11T and 3T, a second asymmetry value "β2" between 11T and 4T over recording power "Pw" at a top pulse width "Ttop" of 1.3T and the fixed pulse width "Tmp" of 0.7T. FIG. 23C is a diagram of variations of jitter "σ", a first asymmetry value "β1" between 11T and 3T, a second asymmetry value "β2" between 11T and 4T over recording power "Pw" at a top pulse width "Ttop" of 1.5T and the fixed pulse width "Tmp" of 0.7T. FIG. 23D is a diagram of variations of jitter "σ", a first asymmetry value "β1" between 11T and 3T, a second asymmetry value "β2" between 11T and 4T over recording power "Pw" at a top pulse width "Ttop" of 1.7T and the fixed pulse width "Tmp" of 0.7T.

As shown in FIGS. 23A, 23B, 23C and 23D, it can be estimated that if the conditions that the first asymmetry value "β1" and the second asymmetry value "β2" are equal to each other are satisfied, then the jitter "σ" takes a minimum value.

Figure 24:
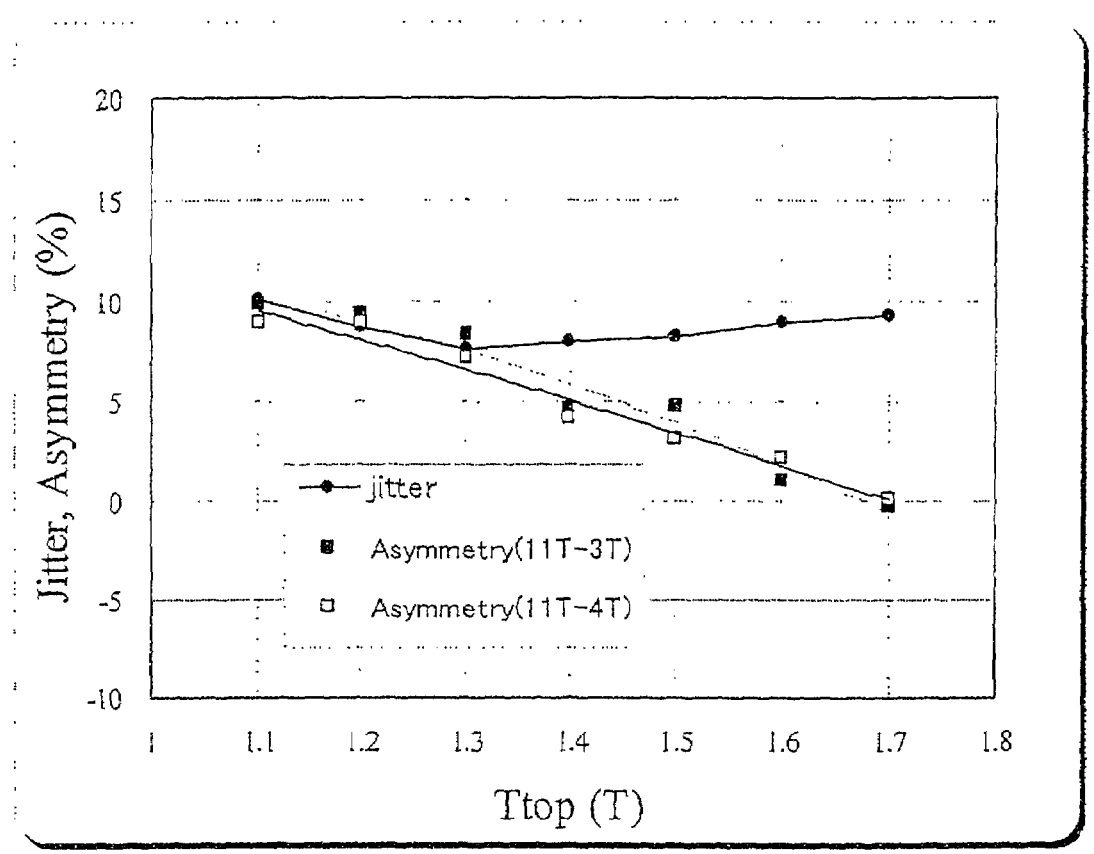
FIG. 24 is a diagram of variations of the minimum jitter value "σ", the first asymmetry value "β1" between 11T and 3T, and the second asymmetry value "β2" between 11T and 4T over top pulse width "Ttop" at the recording power "Pw" where the jitter value "σ" takes the minimum value under various recording strategies in FIGS. 23A, 23B, 23C and 23D.

FIG. 24 is a diagram of variations of the minimum jitter value "σ", the first asymmetry value "β1" between 11T and 3T, and the second asymmetry value "β2" between 11T and 4T over top pulse width "Ttop" at the recording power "Pw" where the jitter value "σ" takes the minimum value under various recording strategies in FIGS. 23A, 23B, 23C and 23D. Namely, in order to make it more easy to understand the results shown in FIGS. 23A, 23B, 23C and 23D.

FIG. 24 shows that as the jitter value "σ" takes the minimum value, the first and second asymmetry values "β1" and "β2" are substantially equal to each other. FIG. 24 also shows that if the first and second asymmetry values "β1" and "β2" are in the range of 0~10%, then the minimum value of the jitter "σ" is not higher than 10%.

From the above results, it can be understood that if the conditions that the first and second asymmetry values "β1" and "β2" are substantially equal to each other and in the range of 0~10% could be found by varying the recording power "Pw" and the recording strategy parameters, the acceptable small jitter "σ" of not higher than 10% can be obtained. The utilization of this phenomenon allows optimizations of the recording power "Pw" and the recording strategy by use of only the asymmetry values "β", which is easily measurable, without measuring the jitter "σ" itself, measurement of which is time-consuming and needs a large specific area over the disk. The novel adjustment method in accordance with the present invention utilizes the above phenomenon.

Figure 25:
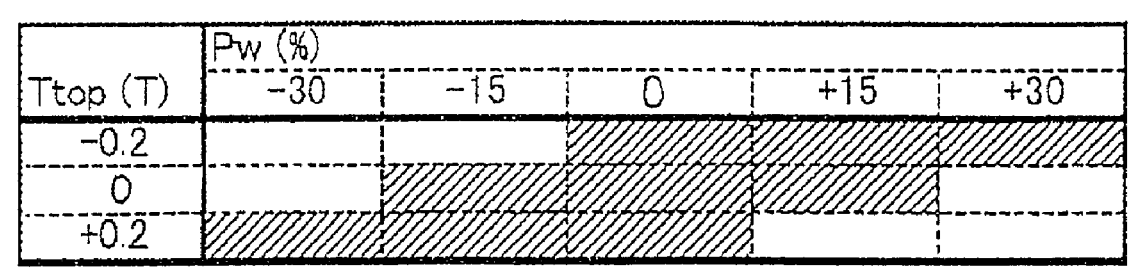

FIG. 25 is a table of the recording conditions adjusted in accordance with the novel method in the fifth embodiment in accordance with the present invention.

In the first step A01, the parameters are set, wherein the recording power "Pw" and other parameters other than the top pulse width "Ttop" are set similarly to the disk informations buried in the disk. As shown in FIG. 25, nine combinations of the recording power "Pw" and the top pulse width "Ttop" are set, which are represented by nine hatched-regions. The combinations shown in FIG. 25 is mere example, but which may be variable optionally.

Five levels of the recording powers "Pw" are set in the range of −30% to +30% of the disk information value. Three levels of the top pulse width "Ttop" are set in the range of −0.2T to +0.2T of the disk information value. The reason why the different recording pulse is used for each top pulse width "Ttop" is that the increase in the top pulse width "Ttop" increases the recording power "Pw" where the jitter "σ" takes the minimum value.

In the second step, cycle signals are recorded, wherein at least two kinds of cycle signals are recorded, for example, per one half of one cync-frame. In a specific pattern recording, 11T and 3T as well as 11T and 4T are recorded in one cync-frame. At least three cycle signals are, for example, 11T single cycle signal, 4T single cycle signal, and 3T single cycle signal. The cycle signals are recorded into a PCA area (power calibration area) of the disk. Since the nine combinations of the recording power "Pw" and the top pulse width "Ttop", the record is made to 18 sync-frames in total.

In the third step, a signal level is measured, wherein a β-value or an asymmetry value of the each cync-frame is measured. Nine cases of the first asymmetry value "β1" and nine cases of the second asymmetry value "β2" are measured respectively. The measured first and second asymmetry values "β1" and "β2" will be used for the subsequent condition-optimization process.

In the fourth step, an optimum recording power and an optimum pulse "Pw" width "Tmp" are derived for setting the optimum conditions.

In the fifth step, for each top pulse width "Ttop", the recording power as the zero-cross power and a corresponding zero-cross value "β" are calculated, wherein the first and second asymmetry values "β1" and "β2" are equal to each other.

The graph is made from the above measured values with reference to each top pulse width "Ttop", for which reason the zero-cross power and the zero-cross value "β" are derived. Three sets of the zero-cross power and the zero-cross value "β" are obtained for each top pulse width "Ttop". It is preferable to obtain the zero-cross power and the zero-cross value "β" by connecting measured points in accordance with the minimum mean-square approximation method and estimation based on the connection line. Alternatively, it is also available to so select the recording conditions that the difference in the zero-cross value "β" between the measured points is within the range of a predetermined range without making any estimation. Both the above former and later methods may also be applicable to the later process for optimization of the condition.

In the sixth step, based on the above obtained zero-cross values "β" for the respective top pulse widths "Ttop", a pulse width "Tmp", where the zero-cross value "β" takes a desired value, is calculated by using the graph of FIG. 24.

From FIG. 12, it is possible to estimate a desired pulse value "Tmp", where the zero-cross value "β" is 7.5%. The estimated width is the optimum pulse value "Tmp". The optimum condition is marked by a circle.

In the seventh step, the zero-cross power as the optimum recording power "Pw" at the optimum top pulse width value "Ttop" is found.

In the eighth step, the evaluation on the obtained conditions was made as follows. Through the above processes, the optimum recording power "Pw" and the optimum top pulse width value "Ttop" have been estimated.

The recording and reproducing operations were made under the above-obtained conditions including the optimum recording power "Pw" and the optimum top pulse width value "Ttop". It was confirmed that the first and second asymmetry values "β1" and "β2" were almost equal to each other. The evaluation on the conditions and the calculation processes were completed.

The above-described novel method for adjusting the conditions for recording and reproducing operations to the information storage medium provides the following effects and advantages.

The novel method allows the batch adjustments to both the recording power "Pw" and the recording strategy by taking a short time which corresponds to two cycles of the disk for the batch recording operation and the batch reproducing operation.

The used or necessary area is only the 18 sync-frames which is less than one physical sector which comprises the 26 sync-frames. Generally, In order to measure the jitter "σ" directly, at least 1 ECC block which comprises 16 physical sectors even for one recording condition. By contrast to this direct measurement method, however, in accordance with the present invention, the novel method needs less area. In the prior art, the first adjustment is made by carrying out 63 tests and the subsequent adjustment is made by carrying out 27 tests, namely, 90 tests were needed in total. The necessary area is tremendously larger, for example, 63+27=90 ECC block, as compared to the present invention.

The novel method in accordance with the present invention allows the quick and batch adjustments to the recording power "Pw" and the recording strategy by use of the small area.

Sixth Embodiment:

A sixth embodiment according to the present invention will be described in detail with reference to the drawings. The sequential processes to the DVD-R will be described in detail with reference again to FIG. 2, provided that not only the first asymmetry value between 11T and 3T and the second asymmetry value between 11T and 4T but also the third asymmetry value between 11T and 5T are referred for adjustment.

Figure 26A:
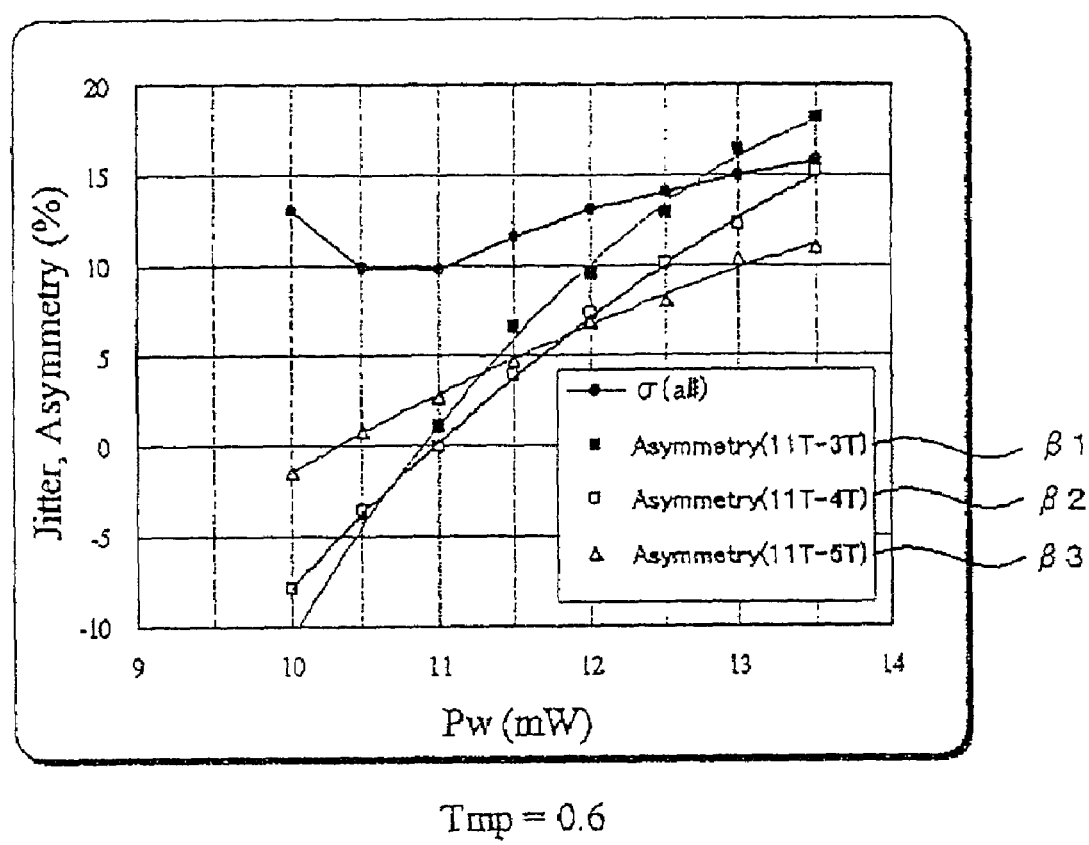
FIG. 26A is a diagram of variations of jitter "σ", a first asymmetry value "β1" between 11T and 3T, a second asymmetry value "β2" between 11T and 4T and a third asymmetry value "β3" between 11T and 5T over recording power "Pw" at a pulse width "Tmp" of 0.6T and a top pulse width "Ttop" of 1.4T in case of DVD-R.
Figure 26B:
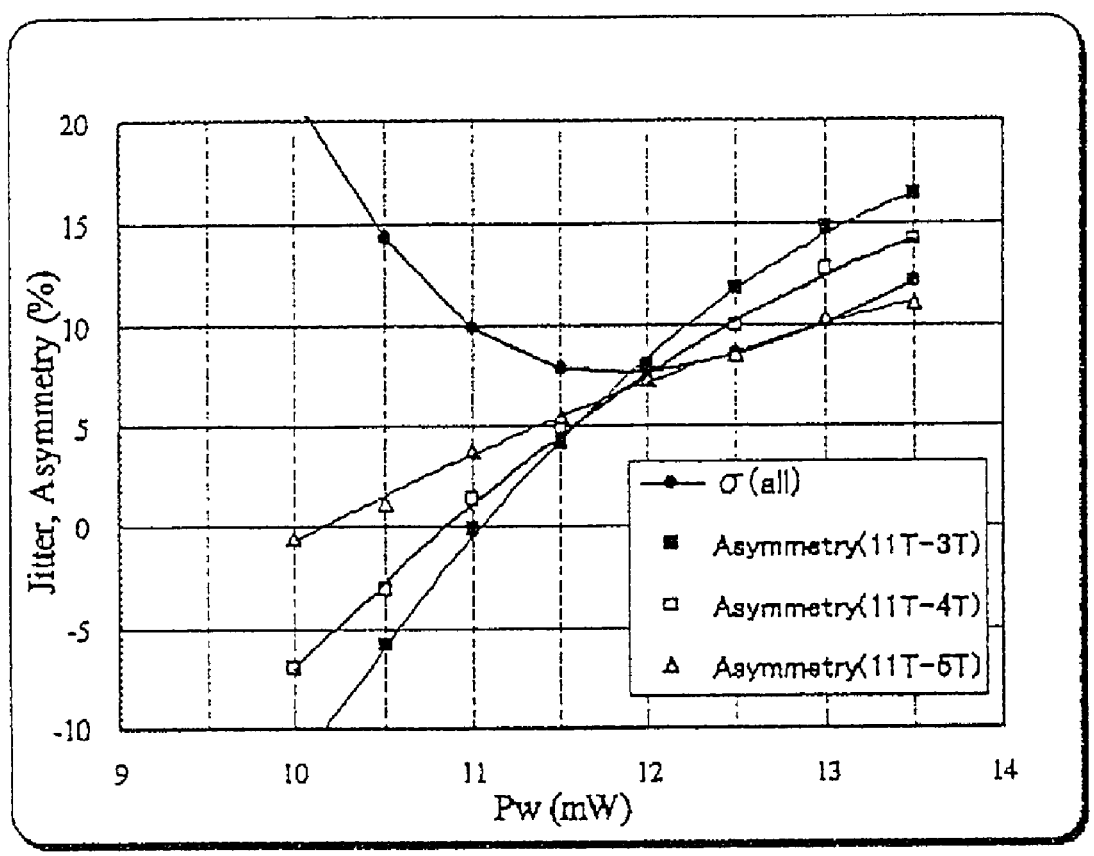
FIG. 26B is a diagram of variations of jitter "σ", a first asymmetry value "β1" between 11T and 3T, a second asymmetry value "β2" between 11T and 4T and a third asymmetry value "β3" between 11T and 5T over recording power "Pw" at a pulse width "Tmp" of 0.7T and a top pulse width "Ttop" of 1.4T in case of DVD-R.
Figure 26C:
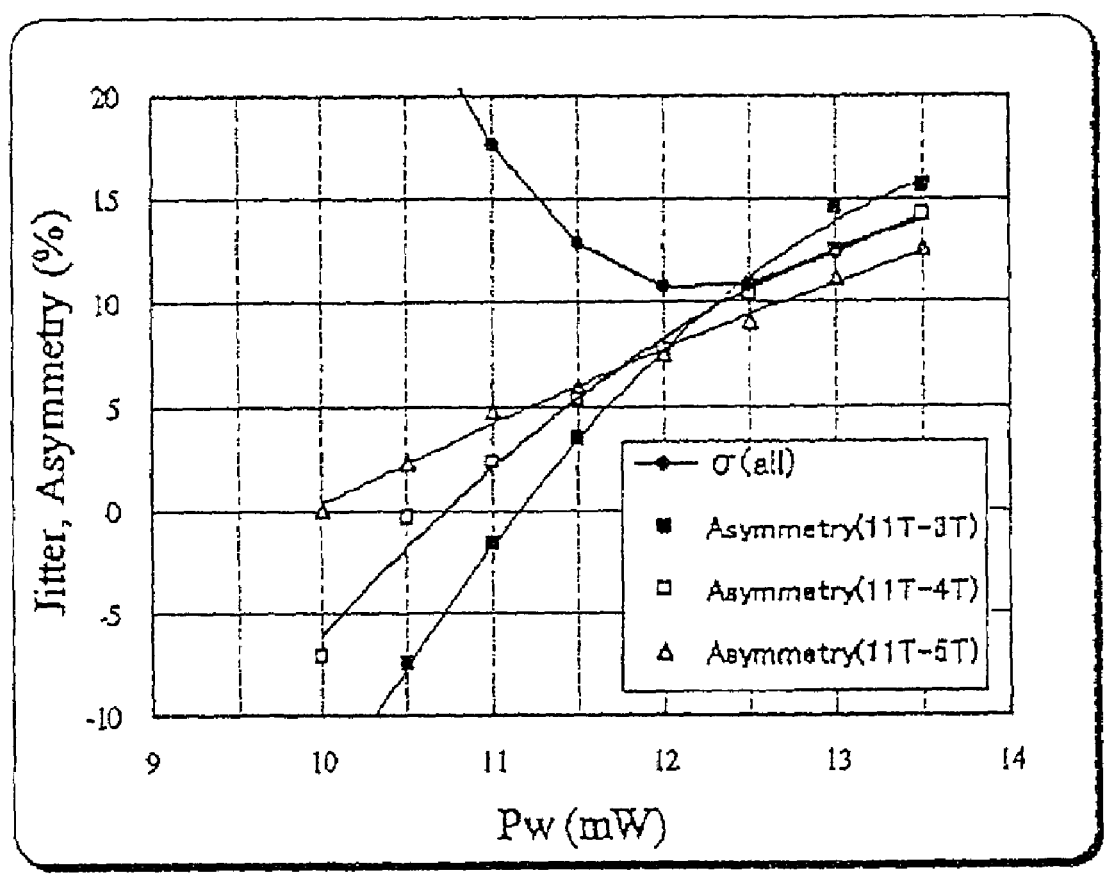
FIG. 26C is a diagram of variations of jitter "σ", a first asymmetry value "β1" between 11T and 3T, a second asymmetry value "β2" between 11T and 4T and a third asymmetry value "β3" between 11T and 5T over recording power "Pw" at a pulse width "Tmp" of 0.8T and a top pulse width "Ttop" of 1.4T in case of DVD-R.

FIG. 26A is a diagram of variations of jitter "σ", a first asymmetry value "β1" between 11T and 3T, a second asymmetry value "β2" between 11T and 4T and a third asymmetry value "β3" between 11T and 5T over recording power "Pw" at a pulse width "Tmp" of 0.6T and a top pulse width "Ttop" of 1.4T in case of DVD-R. FIG. 26B is a diagram of variations of jitter "σ", a first asymmetry value "β1" between 11T and 3T, a second asymmetry value "β2" between 11T and 4T and a third asymmetry value "β3" between 11T and 5T over recording power "Pw" at a pulse width "Tmp" of 0.7T and a top pulse width "Ttop" of 1.4T in case of DVD-R. FIG. 26C is a diagram of variations of jitter "σ", a first asymmetry value "β1" between 11T and 3T, a second asymmetry value "β2" between 11T and 4T and a third asymmetry value "β3" between 11T and 5T over recording power "Pw" at a pulse width "Tmp" of 0.8T and a top pulse width "Ttop" of 1.4T in case of DVD-R.

Subsequently described are concerned with the important regularity which may be obtained from a relationship among the recording strategy parameters, the recording power "Pw", the jitter "σ" and various analog characteristic values. As shown in FIGS. 26A, 26B, and 26C, it can be estimated that if the conditions that the first asymmetry value "β1", the second asymmetry value "β2" and the third asymmetry value "β3" are equal to each other are satisfied, then the jitter "σ" takes a minimum value.

Further, a first zero-cross value "K1" is set, wherein the first asymmetry value "β1" between 11T and 3T and the second asymmetry value "β2" between 11T and 4T are equal to each other. A second zero-cross value "K2" is also set, wherein the second asymmetry value "β2" between 11T and 4T and the third asymmetry value "β3" between 11T and 5T are equal to each other.

Figure 27:
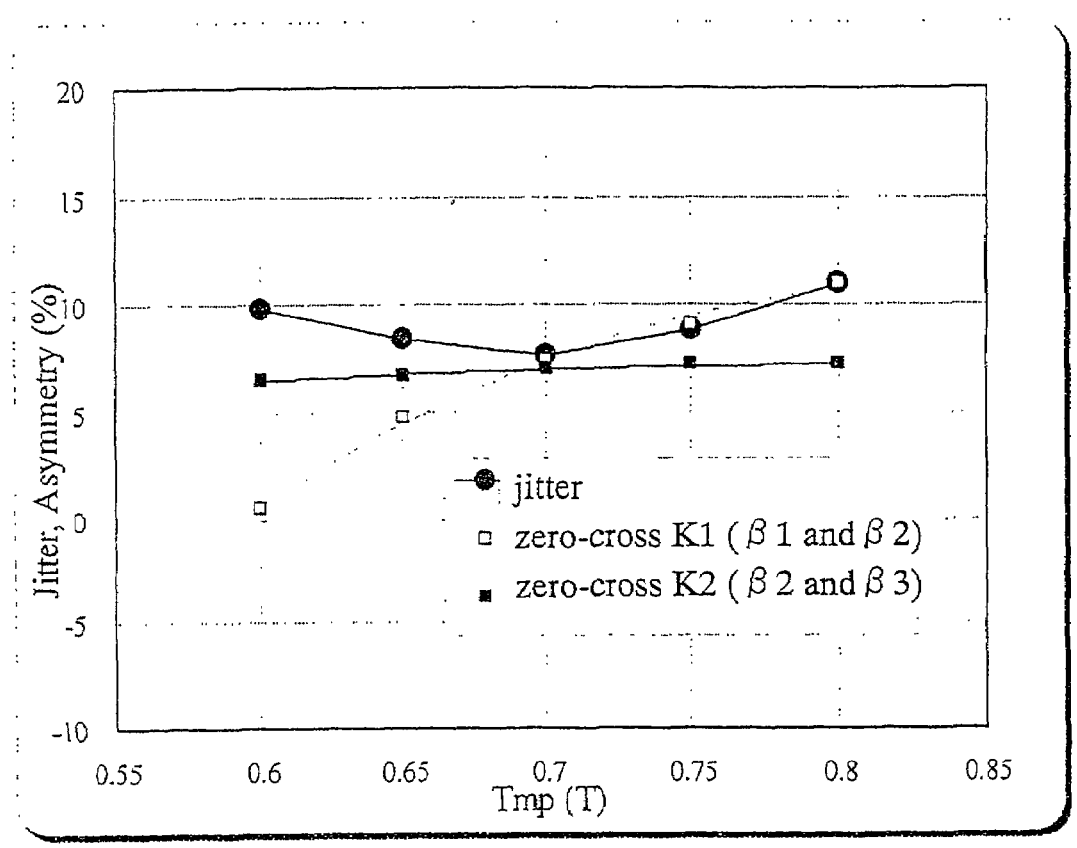
FIG. 27 is a diagram of variations of the minimum jitter value "σ", the first asymmetry value "β1" between 11T and 3T, the second asymmetry value "β2" between 11T and 4T and the third asymmetry value "β2" between 11T and 5T over pulse width "Tmp" at the recording power "Pw" where the jitter value "σ" takes the minimum value under various recording strategies in FIGS. 26A, 26B and 26C.

FIG. 27 is a diagram of variations of the minimum jitter value "σ", the first and second zero-cross values "K1" and "K2" over pulse width "Tmp". ● represents the jitter value "σ". □ represents the first zero-cross value "K1". ■ represents the second zero-cross value "K2". Comparison between the first and second zero-cross values "K1" and "K2" makes it possible to know the direction for variation of the pulse width "Tmp" from the optimum pulse width value. If the first zero-cross value "K1" is smaller than the second zero-cross value "K2", then this means that the pulse width "Tmp" is smaller than the optimum pulse width value. If the first zero-cross value "K1" is larger than the second zero-cross value "K2", then this means that the pulse width "Tmp" is larger than the optimum pulse width value. If the first zero-cross value "K1" is equal to the second zero-cross value "K2", then this means that the pulse width "Tmp" is equal to the optimum pulse width value, wherein the first, second and third asymmetry values "β1", "β2" and "β3" are substantially equal to each other.

FIG. 27 shows that as the jitter value "σ" takes the minimum value, then the first zero-cross value "K1" is equal to the second zero-cross value "K2", and the first, second and third asymmetry values "β1", "β2" and "β3" are substantially equal to each other. Referring to the three asymmetry values improves the accuracy in the optimization to the recording condition.

In this sixth embodiment, the same recording conditions as shown in FIG. 8 are used. The processes for adjustments to the conditions in this sixth embodiment are generally similar to the above-described processes shown in FIG. 2 in the first embodiment.

In the first step A01, the parameters are set, wherein the recording power "Pw" and other parameters other than the pulse width "Tmp" shown in FIGS. 1A, 1B, and 1C are set similarly to the disk informations buried in the disk. As shown in FIG. 8, nine combinations of the recording power "Pw" and the pulse width "Tmp" are set, which are represented by nine hatched-regions. The combinations shown in FIG. 8 is mere example, but which may be variable optionally.

In the second step A02, cycle signals are recorded, wherein at least two kinds of cycle signals are recorded, for example, per one half of one cync-frame. In a specific pattern recording, 11T–3T, 11T–4T, and 11T–5T are recorded in one cync-frame. At least four cycle signals are, for example, 11T single cycle signal, 5T single cycle signal, 4T single cycle signal, and 3T single cycle signal. The cycle signals are recorded into a PCA area (power calibration area) of the disk. Since the nine combinations of the recording power "Pw" and the pulse width "Tmp", the record is made to 27 sync-frames in total.

Figure 28:
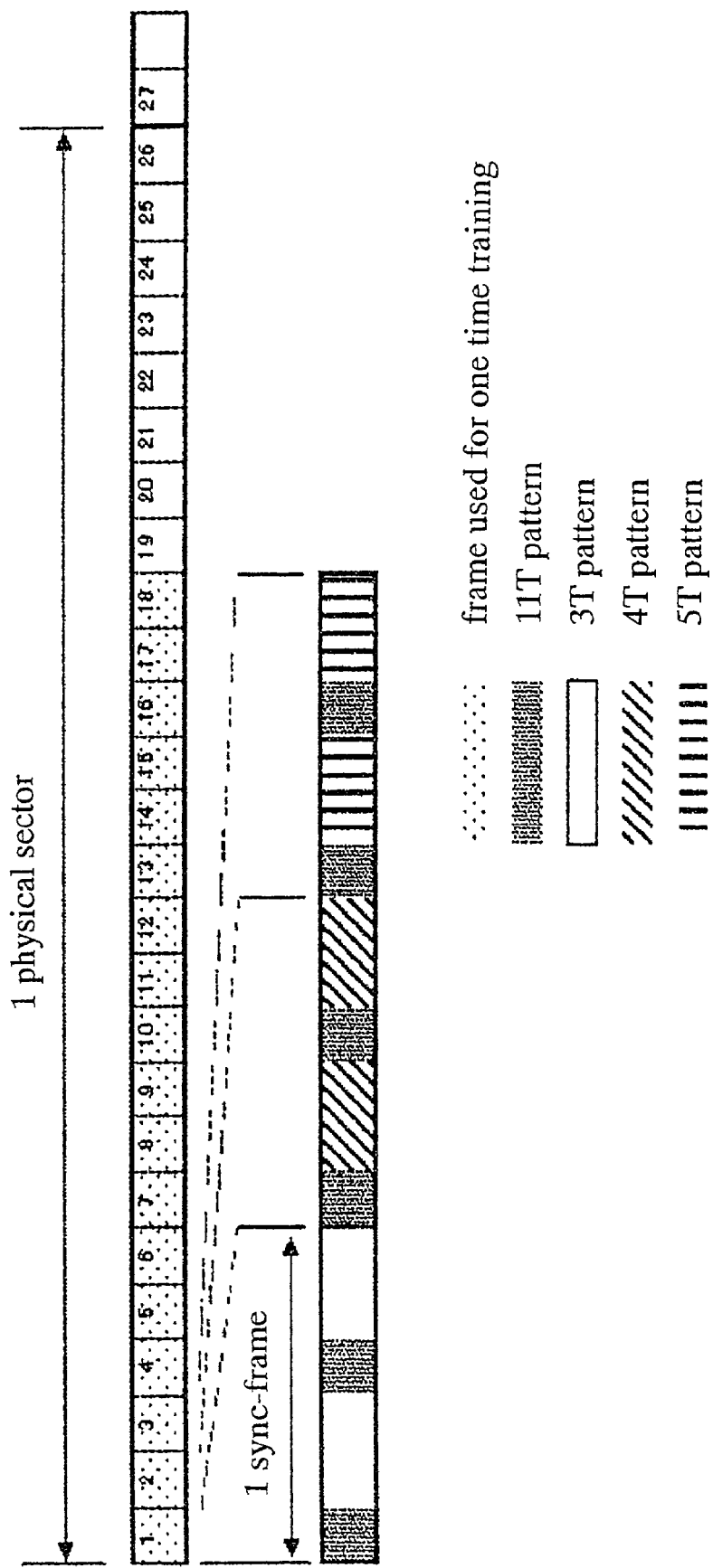
FIG. 28 is a diagram illustrative of one typical example of one physical sector including twenty six sync-frames.

FIG. 28 is a diagram illustrative of one typical example of one physical sector including twenty six sync-frames. One physical sector includes twenty six sync-frames. First to eighteenth sync-frames are used for one time training. A rear dotted region represents the sync-frames to be used for one time training. A dense dotted region represents a continuous pattern P02 of 11T. P01 represents a single sync-frame unit. A white region represents a continuous pattern P03 of 3T. An obliquely-hatched region represents a continuous pattern P04 of 4T. A vertically-hatched region represents a continuous pattern P05 of 5T. A first combination of 11T and 3T, a second combination of 11T and 4T and a third combination of 11T and 5T appear cyclically in adjacent three sync-frames. This cyclic appearances of the first, second and third combinations are not essential. The essential conditions are that 27 cases of the recordings are available under the 9 conditions.

In the third step A03, a signal level is measured, wherein a β-value or an asymmetry value of the each cync-frame is measured. Nine cases of the first asymmetry value "β1" and nine cases of the second asymmetry value "β2" as well as nine cases of the third asymmetry value "β3" are measured respectively. The measured first, second and third asymmetry values "β1", "β2" and "β3" will be used for the subsequent condition-optimization process.

Figure 29:
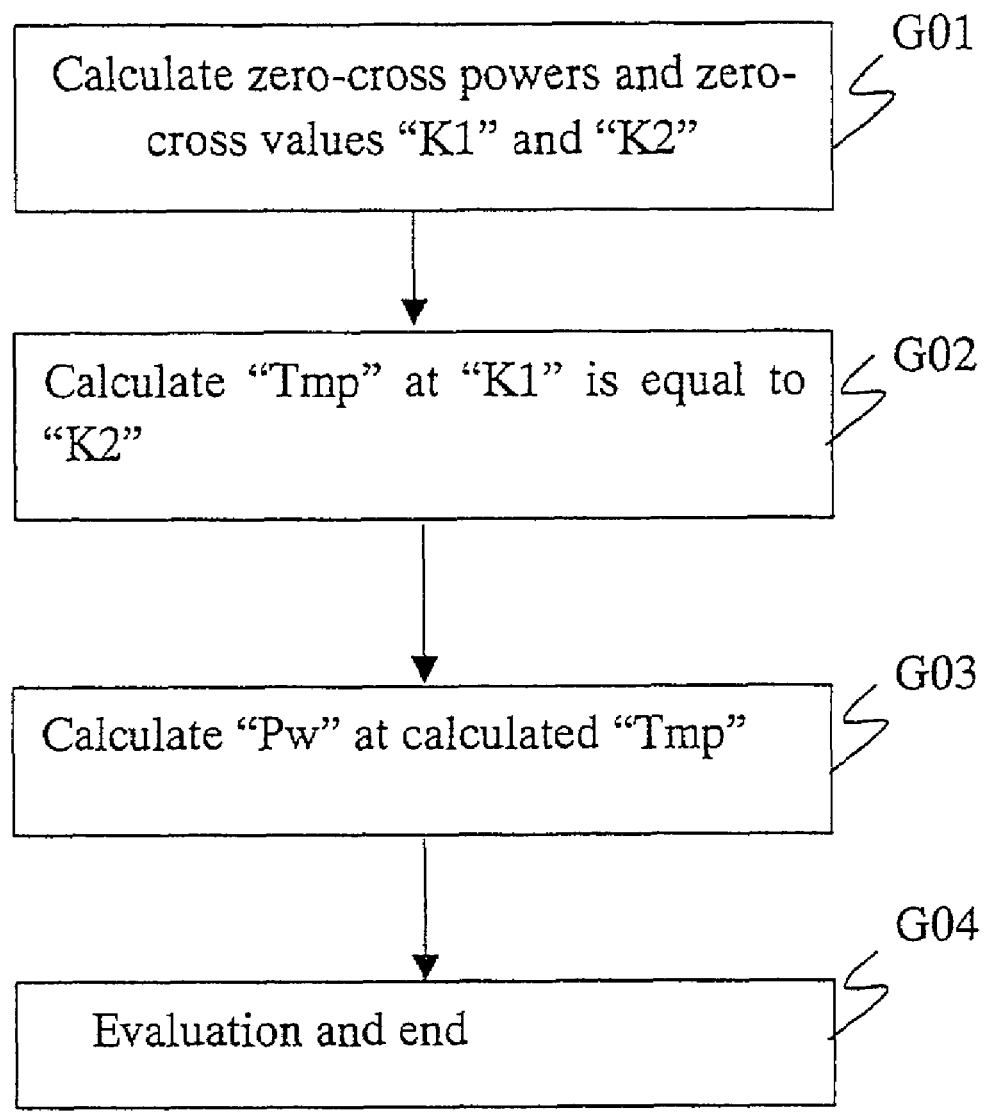
FIG. 29 is a flow chart illustrative of a process for derivation of the optimum recording condition included in the series of the processes shown in FIG. 2.
Figure 30:
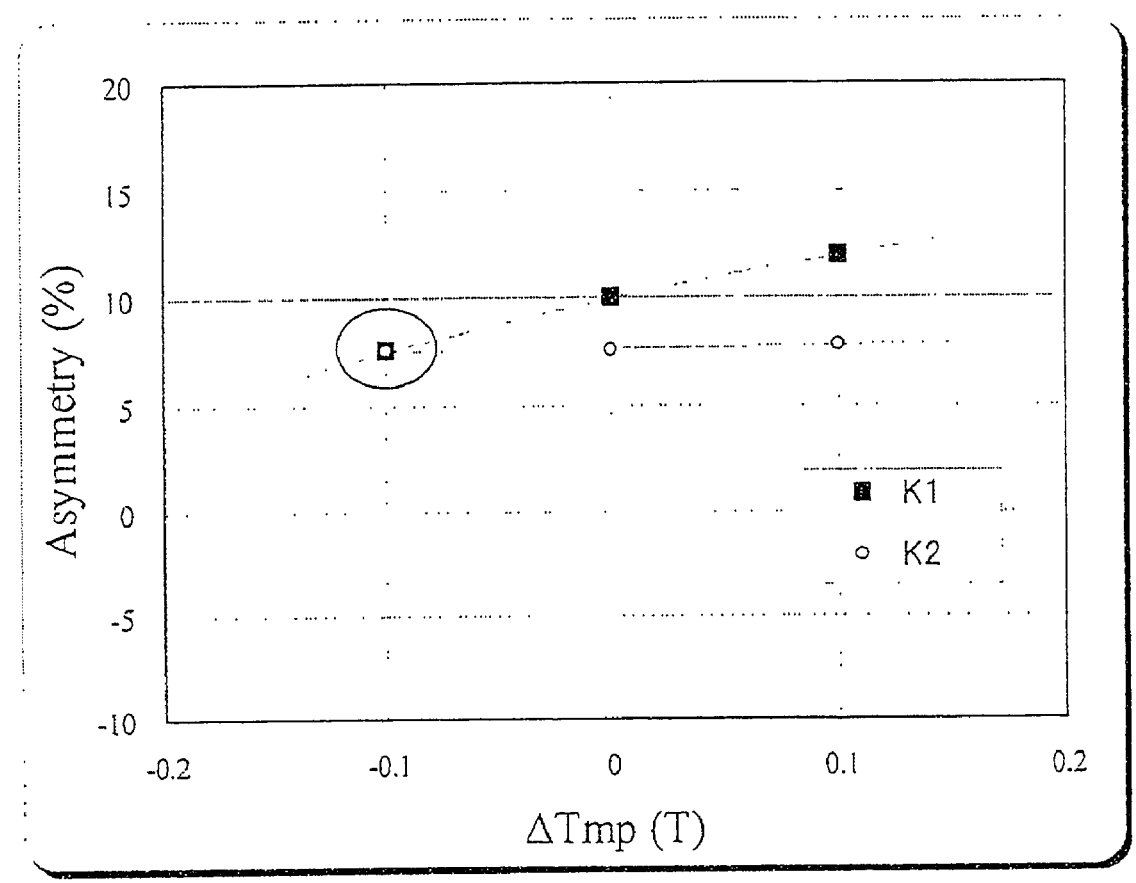
FIG. 30 is a diagram illustrative of one example of dependency of each of the first and second zero-cross values "K1" and "K2" upon the pulse width "Tmp" in connection with the optimization process shown in FIG. 29.

In the fourth step A04, an optimum recording power "Pw" and an optimum pulse width "Tmp" are derived for setting the optimum conditions. FIG. 29 is a flow chart illustrative of a process for derivation of the optimum recording condition included in the series of the processes shown in FIG. 2. FIG. 30 is a diagram illustrative of one example of dependency of each of the first and second zero-cross values "K1" and "K2" upon the pulse width "Tmp" in connection with the optimization process shown in FIG. 29.

In the first step G01, for each pulse width "Tmp", the first recording power as the first zero-cross power and a corresponding first zero-cross value "K1" are calculated, wherein the first and second asymmetry values "β1" and "β2" are equal to each other. Further, the second recording power as the second zero-cross power and a corresponding second zero-cross value "K2" are calculated, wherein the second and third asymmetry values "β2" and "β3" are equal to each other.

In the second step G02, as shown in FIG. 30, based on the above obtained first and second zero-cross values "K1" and "K2" for the respective pulse widths "Tmp", the above obtained first and second zero-cross values "K1" and "K2" are plotted in the vertical axis and the respective pulse width values of the pulse width "Tmp" are plotted in the horizontal axis. An optimum pulse width value of the pulse width "Tmp", where the first and second zero-cross values "K1" and "K2" are equal to each other, is calculated or found from the graph of FIG. 30.

It should be noted that the asymmetry value, where the first and second zero-cross values "K1" and "K2" are equal to each other, is equivalent to the desired zero-cross value "β" in the above-described first embodiment. In the first embodiment, the desired zero-cross value "β" is set at 7.5%. In this sixth embodiment, the desired zero-cross value "β" is obtained from the measurement. In FIG. 30, the optimum condition is marked by a circle.

In the third step G03, the zero-cross power as the optimum recording power "Pw" at the optimum pulse width value "Tmp" is found from the graph of FIG. 13 in the above-described first embodiment.

In the fourth step G04, the evaluation on the obtained conditions was made as follows. Through the above processes, the optimum recording power "Pw" and the optimum pulse width value "Tmp" have been estimated. The recording and reproducing operations were made under the above-obtained conditions including the optimum recording power "Pw" and the optimum pulse width value "Tmp". The jitter "σ" was about 8.5%. The evaluation on the conditions and the calculation processes were completed.

From FIGS. 26A, 26B and 26C, it can be understood that the second zero-cross value "K1", where the second and third asymmetry values "β2" and "β3" are substantially equal to each other, has a poor dependency upon the pulse width "Tmp". This means it available that only the second and third asymmetry values "β2" and "β3" are used to find the optimum recording power "Pw" before the pulse width "Tmp" is adjusted so that the first and second asymmetry values "β1" and "β2" are substantially equal to each other at the optimum recording power "Pw". This substantially corresponds to the first stage of the above-described second embodiment, wherein the adjustment was made with reference to the second and third asymmetry values "β2" and "β3". There may exist a large number of available method for adjusting the recording conditions with reference to at least two asymmetry values.

In this sixth embodiment, the four cycle signals, for example, 11T single cycle signal, 5T single cycle signal, 4T single cycle signal, and 3T single cycle signal are used. It is, however, possible as a modification to the sixth embodiment that only the three cycle signals, for example, 5T single cycle signal, 4T single cycle signal, and 3T single cycle signal are used. In this case, for example, there may be attempted to find out the conditions that an asymmetry value between 3T and 4T is zero, and further another asymmetry value between 5T and either 3T or 4T is also zero.

The above-described novel method for adjusting the conditions for recording and reproducing operations to the information storage medium provides the following effects and advantages.

The novel method allows the batch adjustments to both the recording power "Pw" and the recording strategy by taking a short time which corresponds to two cycles of the disk for the batch recording operation and the batch reproducing operation.

The novel method of the sixth embodiment in accordance with the present invention allows the quick and batch adjustments to the recording power "Pw" and the recording strategy by use of the small area. As compared to the first embodiment, the desired asymmetry value "β" is found from the measured results without any additional process for previously setting a desired asymmetry value "β". Further, the larger number of the asymmetry values are referred to improve the accuracy in the adjustment.

In this sixth embodiment, the three asymmetry values are referred in the same processes as in the first embodiment. It is, however, possible as further modifications to the sixth embodiment that the three asymmetry values are referred in the same processes as in the second, third, fourth or fifth embodiment.

Figure 31:
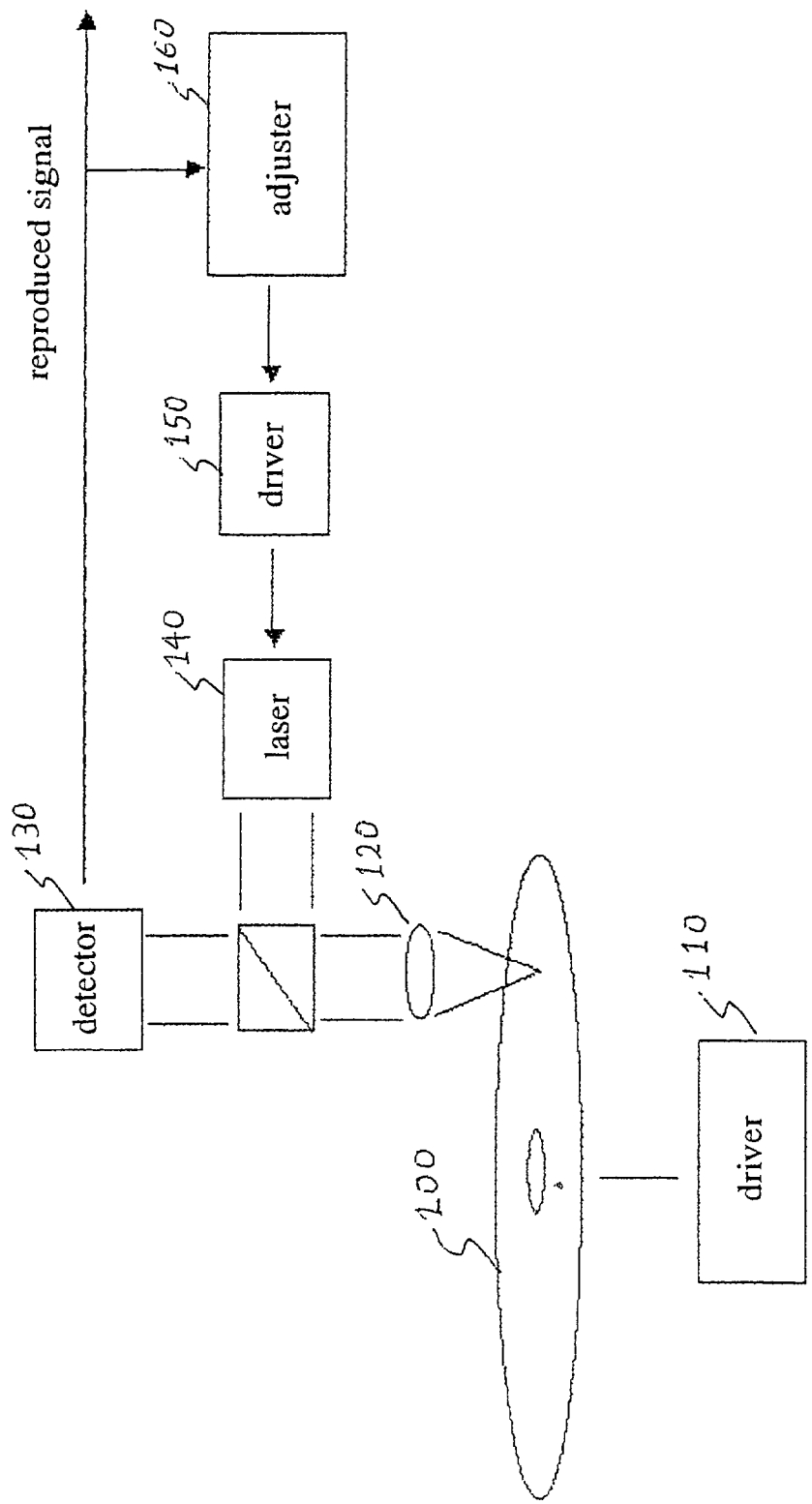
FIG. 31 is a block diagram illustrative of a typical example of an information recording/reproducing apparatus which is capable of adjusting recording/reproducing conditions in accordance with the novel method of the present invention.

Seventh Embodiment:

A seventh embodiment according to the present invention will be described in detail with reference to the drawings. FIG. 31 is a block diagram illustrative of a typical example of an information recording/reproducing apparatus which is capable of adjusting recording/reproducing conditions in accordance with the novel method of the present invention. The information recording/reproducing apparatus includes an optical disk 100, a spindle driver 110 for driving the optical disk 100, an objection lens 120, a photo-detector 130 for reproducing an information from the optical disk 100, a laser diode 140 for recording an information into the optical disk 100, a laser diode driver 150 for driving the laser diode 140 and a recording/reproducing condition adjuster 160 for adjusting the recording/reproducing condition.

The recording/reproducing condition adjuster 160 further includes a reproduced signal detecting unit for detecting a reproduced signal from the photo-detector 130, a recording/reproducing condition setting unit for setting the recording/reproducing condition based on the detected signal by the reproduced signal detecting unit, and an execution unit for executing the recording/reproducing condition set by the recording/reproducing condition setting unit.

The laser diode driver 150 drives the laser diode 140 based on the recording/reproducing condition set by the recording/reproducing condition adjuster 160, so that the laser diode 140 emits a laser beam which is irradiated through the objection lens 120 onto the optical disk 100 which is on the rotation by the spindle driver 110. The laser beam is reflected by the surface of the optical disk 100. The reflected beam is then transmitted through the objection lens 120 to the photo-detector 130. The photo-detector 130 detects the reflected beam and converts the same into the reproduced signal which is feed back to the recording/reproducing condition adjuster 160. The recording/reproducing condition adjuster 160 receives the reproduced signal from the photo-detector 130 and adjusts the recording/reproducing condition based on the reproduced signal in accordance with the above-described novel method of the present invention.

The adjustment processes to be executed by the recording/reproducing condition adjuster 160 may be realized by either any available hardware or software such as a computer program.

Figure 32:
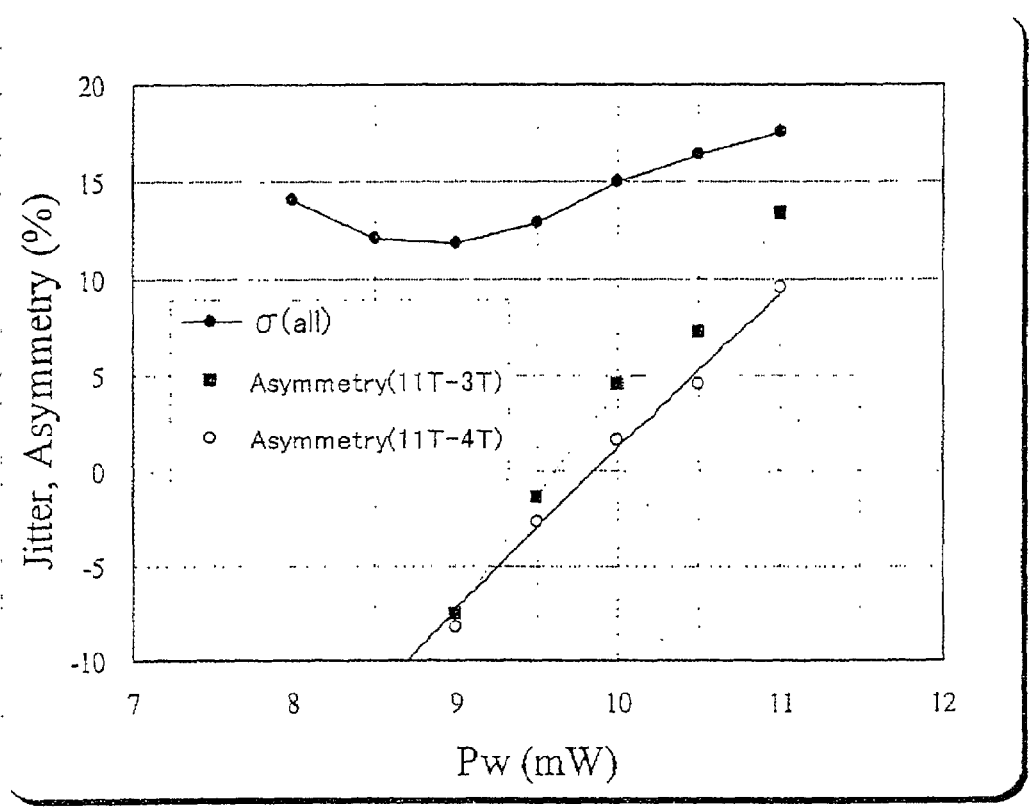
FIG. 32 is a diagram of variations of jitter "σ", a first asymmetry value "β1" between 11T and 3T, a second asymmetry value "β2" between 11T and 4T over recording power "Pw" in case that the disk information is directly used without any adjustment.

FIG. 32 is a diagram of variations of jitter "σ", a first asymmetry value "β1" between 11T and 3T, a second asymmetry value "β2" between 11T and 4T over recording power "Pw" in case that the DVD-R disk information is directly used without any adjustment. As shown in FIG. 32, The minimum value of the jitter "σ" is above 11%. This means that the recording strategy as the disk information is not available directly. The absolute values of the first and second asymmetry values "β1" and "β2" are largely out of the acceptable range of 0~10%. This demonstrates that the adjustment methods of the first to sixth embodiments are effective to suppress the jitter "σ".

In the foregoing embodiments, the DVD-R was selected as one typical example. The reproducing waveform is common to a variety of optical disk. Therefore, the above novel methods of the first to sixth embodiments may be applicable to not only DVD-R but also any other optical disks such as DVD-RW, DVD+RW, DVD-RAM, DVD-ROM, MO, CD, CD-R, and CD-RW.

In the foregoing embodiments, the asymmetry values are defined between 11T–3T, 11T–4T and 11T–5T. If in future, the recording density will be increased, then other signals 6T, 7T, 8T, 9T and 10T would also be available.

In accordance with the present invention, an optical head may be available which has a circle shape, a light wavelength in the range of 630–660 nm, a numerical aperture (NA) in the range of 0.6–0.65, and a beam diameter in the range of 0.8–0.9 micrometers. A channel clock may, for example, be 26.16 MHz. The disk may rotate at a line speed of 3.49 m/s. Under these conditions, the mark and space lengths of the signals 6T, 7T, 8T and 9T are almost equal to or larger than the beam diameter and thus are not available.

Under the conditions of the light wavelength in the range of 400–410 nm, the numerical aperture (NA) of 0.85, the beam diameter of 0.4 micrometers, the channel clock of 66 MHz, and the disk line speed of 5.28 m/s, the mark and space lengths of the signals 5T, 6T, 7T, 8T and 9T are almost equal to or larger than the beam diameter and thus are not available.

The upper limit of the mark and space length of the available signals depends on the beam diameter and the recording density. It is preferable to use the short mark and space signal for causing the interference between adjacent two of the marks or adjacent two of the spaces.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A method of adjusting a condition for at least one of a recording operation and a reproducing operation, said method including:

finding at least first and second asymmetry values, said first asymmetry value being defined based on a first signal combination selected from at least three signals different in cycle from each other, and said second asymmetry value being defined based on a second signal combination selected from said at least three signals, and said second signal combination being different from said first signal combination; and setting said condition with reference to said at least first and second asymmetry values.

2. The method as claimed in claim 1, wherein said condition is adjusted without measuring any jitter value.

3. The method as claimed in claim 1, wherein said step of setting said condition comprises a step of comparing said at least first and second asymmetry values to each other, to find desired values where said at least first and second asymmetry values have a difference from each other, and said difference is smaller than a predetermined reference value, and said at least first and second asymmetry values take said desired values.

4. The method as claimed in claim 1, wherein said step of setting said condition includes:

comparing said at least first and second asymmetry values to each other, to find a zero-cross value where said at least first and second asymmetry values are substantially equal to each other and takes said zero-cross value.

5. The method as claimed in claim 1, wherein said step of setting said condition includes:

comparing said at least first and second asymmetry values to each other, to find a zero-cross value where said at least first and second asymmetry values are substantially equal to each other and takes said zero-cross value; and evaluating whether said zero-cross value is within a predetermined zero-cross value range.

6. The method as claimed in claim 5, wherein said step of setting said condition further includes:

changing at least one of a recording power, a reproducing power, and parameters of said at least three signals, if said zero-cross value is out of said predetermined zero-cross value range; and repeating said finding, comparing, evaluating and changing steps, until it is verified that said zero-cross value is within a predetermined zero-cross value range.

7. The method as claimed in claim 1, wherein said step of setting said condition includes:

comparing said at least first and second asymmetry values to each other, to find a zero-cross parameter of said condition and a zero-cross value where said at least first and second asymmetry values are substantially equal to each other and takes said zero-cross value; and setting said condition with said zero-cross parameter only independent from said zero-cross value.

8. The method as claimed in claim 1, wherein said condition includes at least one of a recording power, a reproducing power, parameters of said at least three signals, a defocus, a radial tilt and a tangential tilt.

9. The method as claimed in claim 1, further including:
reproducing said at least three signals as reproducing signals from an information storage medium which is an object for said at least one of said recording operation and said reproducing operation before said step of finding said at least first and second asymmetry values.

10. The method as claimed in claim 1, wherein each of said at least first and second asymmetry values is found with reference to at least minimum and maximum voltage levels of corresponding one of said first and second signal combinations.

11. The method as claimed in claim 1, wherein each of said at least first and second asymmetry values is found with reference to averaged voltage levels and amplitudes of corresponding one of said first and second signal combinations.

12. The method as claimed in claim 1, further including the steps of:
making variable at least one of a recording power, a reproducing power, and parameters of said at least three signals, while fixing remainders of said recording power, said reproducing power, and said parameters; and
finding a desired value of said at least one being variable so that a difference between said at least first and second asymmetry values is smaller than a predetermined reference value.

13. The method as claimed in claim 1, further including the steps of:
making variable at least one of a recording power, a reproducing power, and parameters of said at least three signals, while fixing remainders of said recording power, said reproducing power, and said parameters; and
finding an optimum value of said at least one being variable so that said at least first and second asymmetry values are substantially equal to each other.

14. The method as claimed in claim 1, wherein said step of setting said condition comprises the steps of:
finding a first desired value of first one of a recording power, a reproducing power, and parameters of said at least three signals with reference to a first asymmetry value of said at least first and second asymmetry values; and
finding a second desired value of second one of said recording power, said reproducing power, and said parameters of said at least three signals with reference to a second asymmetry value of said at least first and second asymmetry values.

15. The method as claimed in claim 14, wherein said first desired value is found so that said first asymmetry value takes a first predetermined value, and said second desired value is found so that said second asymmetry value takes a second predetermined value, and said first and second predetermined values have a difference from each other within a predetermined range.

16. The method as claimed in claim 15, wherein said difference between said first and second predetermined values is zero.

17. The method as claimed in claim 1, wherein said step of finding said at least first and second asymmetry values comprises the step of finding said first asymmetry value, said second asymmetry value and a third asymmetry value being defined based on a third signal combination, and
wherein said step of setting said condition comprises setting said condition with reference to said first, second and third asymmetry values.

18. The method as claimed in claim 17, wherein said step of setting said condition further includes:
finding a first zero-cross value where said first and second asymmetry values are substantially equal to each other and take said first zero-cross value;
finding a second zero-cross value where said second and third asymmetry values are substantially equal to each other and take said second zero-cross value; and
comparing said first and second zero-cross values to each other to find desired values where said first and second zero-cross values have a difference from each other, and said difference is smaller than a predetermined reference value, and said first, second and third asymmetry values take said desired values.

19. The method as claimed in claim 17, wherein said step of setting said condition further includes:
finding a first zero-cross value where said first and second asymmetry values are substantially equal to each other and take said first zero-cross value;
finding a second zero-cross value where said second and third asymmetry values are substantially equal to each other and take said second zero-cross value; and
comparing said first and second zero-cross values to each other to find an optimum value where said first and second zero-cross values are substantially equal to each other, and said first, second and third asymmetry values take said optimum value.

20. The method as claimed in claim 19, further including:
evaluating whether said first and second zero-cross values are within a predetermined zero-cross value range.

21. The method as claimed in claim 20, further including:
changing at least one of a recording power, a reproducing power, and parameters of said at least three signals, if at least one of said first and second zero-cross values is out of said predetermined zero-cross value range; and
repeating said finding, comparing, evaluating and changing steps, until it is verified that both said first and second zero-cross values are within a predetermined zero-cross value range.

22. The method as claimed in claim 18, further including the steps of:
making variable at least one of a recording power, a reproducing power, and parameters of said at least three signals, while fixing remainders of said recording power, said reproducing power, and said parameters; and
finding a desired value of said at least one being variable so that a difference between said first and second zero-cross values is smaller than a predetermined reference value.

23. The method as claimed in claim 19, further including the steps of:
making variable at least one of a recording power, a reproducing power, and parameters of said at least three signals, while fixing remainders of said recording power, said reproducing power, and said parameters; and
finding an optimum value of said at least one being variable so that said first and second zero-cross values are substantially equal to each other.

24. The method as claimed in claim 17, wherein said step of setting said condition comprises the steps of:
   finding a first desired value of first one of a recording power, a reproducing power, and parameters of said at least three signals with reference to said first zero-cross value; and
   finding a second desired value of second one of said recording power, said reproducing power, and said parameters of said at least three signals with reference to said second zero-cross value.

25. The method as claimed in claim 24, wherein said first desired value is found so that said first zero-cross value takes a first predetermined value, and said second desired value is found so that said second zero-cross value takes a second predetermined value, and said first and second predetermined values have a difference from each other within a predetermined range.

26. The method as claimed in claim 25, wherein said difference between said first and second predetermined values is zero.

27. The method as claimed in claim 1, wherein said first and second signal combinations include:
   a first shortest signal which has a shortest mark and a shortest space; and
   a second shortest signal which has a second shorter mark and a second shorter space.

28. The method as claimed in claim 1, wherein said first and second signal combinations include:
   a first longest signal which has a longest mark and a longest space; and
   a second longest signal which has a second longer mark and a second longer space.

29. The method as claimed in claim 1, wherein said condition is for recording an information into an information storage medium.

30. The method as claimed in claim 1, wherein said condition is for reproducing an information from an information storage medium.

31. An apparatus for adjusting a condition for at least one of a recording operation and a reproducing operation, said apparatus including:
   a finding function block for finding at least first and second asymmetry values, said first asymmetry value being defined based on a first signal combination selected from at least three signals different in cycle from each other, and said second asymmetry value being defined based on a second signal combination selected from said at least three signals, and said second signal combination being different from said first signal combination; and
   a setting function block for setting said condition with reference to said at least first and second asymmetry values.

32. The apparatus as claimed in claim 31, wherein said condition is adjusted without measuring any jitter value.

33. The apparatus as claimed in claim 31, wherein said setting function block includes:
   a comparing function block for comparing said at least first and second asymmetry values to each other, to find desired values where said at least first and second asymmetry values have a difference from each other, and said difference is smaller than a predetermined reference value, and said at least first and second asymmetry values take said desired values.

34. The apparatus as claimed in claim 31, wherein said setting function block includes:
   a comparing function block for comparing said at least first and second asymmetry values to each other, to find a zero-cross value where said at least first and second asymmetry values are substantially equal to each other and takes said zero-cross value.

35. The apparatus as claimed in claim 31, wherein said setting function block includes:
   a comparing function block for comparing said at least first and second asymmetry values to each other, to find a zero-cross value where said at least first and second asymmetry values are substantially equal to each other and takes said zero-cross value; and
   an evaluating function block for evaluating whether said zero-cross value is within a predetermined zero-cross value range.

36. The apparatus as claimed in claim 35, wherein said setting function block further includes:
   a changing function block for changing at least one of a recording power, a reproducing power, and parameters of said at least three signals, if said zero-cross value is out of said predetermined zero-cross value range; and
   a repeating function block for repeating said finding, comparing, evaluating and changing operations, until it is verified that said zero-cross value is within a predetermined zero-cross value range.

37. The apparatus as claimed in claim 31, wherein said setting function block includes:
   a comparing function block for comparing said at least first and second asymmetry values to each other, to find a zero-cross parameter of said condition and a zero-cross value where said at least first and second asymmetry values are substantially equal to each other and takes said zero-cross value; and
   a setting function subblock for setting said condition with said zero-cross parameter only independent from said zero-cross value.

38. The apparatus as claimed in claim 31, wherein said condition includes at least one of a recording power, a reproducing power, parameters of said at least three signals, a defocus, a radial tilt and a tangential tilt.

39. The apparatus as claimed in claim 31, further including:
   a reproducing function block for reproducing said at least three signals as reproducing signals from an information storage medium which is an object for said at least one of said recording operation and said reproducing operation before finding said at least first and second asymmetry values.

40. The apparatus as claimed in claim 31, wherein each of said at least first and second asymmetry values is found with reference to at least minimum and maximum voltage levels of corresponding one of said first and second signal combinations.

41. The apparatus as claimed in claim 31, wherein each of said at least first and second asymmetry values is found with reference to averaged voltage levels and amplitudes of corresponding one of said first and second signal combinations.

42. The apparatus as claimed in claim 31, further including:
   a making function block for making variable at least one of a recording power, a reproducing power, and parameters of said at least three signals, while fixing remainders of said recording power, said reproducing power, and said parameters; and
   a finding function sub-block for finding a desired value of said at least one being variable so that a difference between said at least first and second asymmetry values is smaller than a predetermined reference value.

43. The apparatus as claimed in claim 31, further including:
a making function block for making variable at least one of a recording power, a reproducing power, and parameters of said at least three signals, while fixing remainders of said recording power, said reproducing power, and said parameters; and
a finding function sub-block for finding an optimum value of said at least one being variable so that said at least first and second asymmetry values are substantially equal to each other.

44. The apparatus as claimed in claim 31, wherein said setting function block includes:
a first finding function sub-block for finding a first desired value of first one of a recording power, a reproducing power, and parameters of said at least three signals with reference to a first asymmetry value of said at least first and second asymmetry values; and
a second finding function sub-block for finding a second desired value of second one of said recording power, said reproducing power, and said parameters of said at least three signals with reference to a second asymmetry value of said at least first and second asymmetry values.

45. The apparatus as claimed in claim 44, wherein said first desired value is found so that said first asymmetry value takes a first predetermined value, and said second desired value is found so that said second asymmetry value takes a second predetermined value, and said first and second predetermined values have a difference from each other within a predetermined range.

46. The apparatus as claimed in claim 45, wherein said difference between said first and second predetermined values is zero.

47. The apparatus as claimed in claim 31, wherein said finding function block finds said first asymmetry value, said second asymmetry value and a third asymmetry value being defined based on a third signal combination, and
wherein said setting function block sets said condition with reference to said first, second and third asymmetry values.

48. The apparatus as claimed in claim 47, wherein said setting function block further includes:
a first finding function sub-block for finding a first zero-cross value where said first and second asymmetry values are substantially equal to each other and take said first zero-cross value;
a second finding function sub-block for finding a second zero-cross value where said second and third asymmetry values are substantially equal to each other and take said second zero-cross value; and
a comparing function block for comparing said first and second zero-cross values to each other to find desired values where said first and second zero-cross values have a difference from each other, and said difference is smaller than a predetermined reference value, and said first, second and third asymmetry values take said desired values.

49. The apparatus as claimed in claim 47, wherein said setting function block further includes:
a first finding function sub-block for finding a first zero-cross value where said first and second asymmetry values are substantially equal to each other and take said first zero-cross value;
a second finding function sub-block for finding a second zero-cross value where said second and third asymmetry values are substantially equal to each other and take said second zero-cross value; and
a comparing function block for comparing said first and second zero-cross values to each other to find an optimum value where said first and second zero-cross values are substantially equal to each other, and said first, second and third asymmetry values take said optimum value.

50. The apparatus as claimed in claim 49, further including:
an evaluating function block for evaluating whether said first and second zero-cross values are within a predetermined zero-cross value range.

51. The apparatus as claimed in claim 50, further including:
a changing function block for changing at least one of a recording power, a reproducing power, and parameters of said at least three signals, if at least one of said first and second zero-cross values is out of said predetermined zero-cross value range; and
a repeating function block for repeating said finding, comparing, evaluating and changing operations, until it is verified that both said first and second zero-cross values are within a predetermined zero-cross value range.

52. The apparatus as claimed in claim 48, further including:
a making function block for making variable at least one of a recording power, a reproducing power, and parameters of said at least three signals, while fixing remainders of said recording power, said reproducing power, and said parameters; and
a finding function sub-block for finding a desired value of said at least one being variable so that a difference between said first and second zero-cross values is smaller than a predetermined reference value.

53. The apparatus as claimed in claim 49, further including:
a making function block for making variable at least one of a recording power, a reproducing power, and parameters of said at least three signals, while fixing remainders of said recording power, said reproducing power, and said parameters; and
a finding function sub-block for finding an optimum value of said at least one being variable so that said first and second zero-cross values are substantially equal to each other.

54. The apparatus as claimed in claim 47, wherein said setting function block includes:
a first finding function sub-block for finding a first desired value of first one of a recording power, a reproducing power, and parameters of said at least three signals with reference to said first zero-cross value; and
a second finding function sub-block for finding a second desired value of second one of said recording power, said reproducing power, and said parameters of said at least three signals with reference to said second zero-cross value.

55. The apparatus as claimed in claim 54, wherein said first desired value is found so that said first zero-cross value takes a first predetermined value, and said second desired value is found so that said second zero-cross value takes a second predetermined value, and said first and second predetermined values have a difference from each other within a predetermined range.

56. The apparatus as claimed in claim 55, wherein said difference between said first and second predetermined values is zero.

57. The apparatus as claimed in claim 31, wherein said first and second signal combinations include:
 a first shortest signal which has a shortest mark and a shortest space; and
 a second shortest signal which has a second shorter mark and a second shorter space.

58. The apparatus as claimed in claim 31, wherein said first and second signal combinations include:
 a first longest signal which has a longest mark and a longest space; and
 a second longest signal which has a second longer mark and a second longer space.

59. The apparatus as claimed in claim 31, wherein said condition is for recording an information into an information storage medium.

60. The apparatus as claimed in claim 31, wherein said condition is for reproducing an information from an information storage medium.

61. A recording/reproducing apparatus including:
 a recording unit for recording an information into an information storage medium;
 a reproducing unit for reproducing an information from said information storage medium;
 an adjusting unit for adjusting a condition for at least one of a recording operation by said recording unit and a reproducing operation by said reproducing unit in accordance with a method defined in claim 1.

62. A program storage medium readable by a computer, tangibly embodying a program of instructions executable by the computer to control the computer for implementing a method defined in claim 1.

* * * * *